(12) United States Patent
Laine et al.

(10) Patent No.: US 10,867,429 B2
(45) Date of Patent: Dec. 15, 2020

(54) QUERY-SPECIFIC BEHAVIORAL MODIFICATION OF TREE TRAVERSAL

(71) Applicant: NVIDIA Corporation, San Jose, CA (US)

(72) Inventors: Samuli Laine, Uusimaa (FI); Timo Aila, Uusimaa (FI); Tero Karras, Uusimaa (FI); Gregory Muthler, Austin, TX (US); William Parsons Newhall, Jr., Woodside, CA (US); Ronald Charles Babich, Jr., Murrysville, PA (US); Craig Kolb, Oakland, CA (US); Ignacio Llamas, Palo Alto, CA (US); John Burgess, Austin, TX (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 16/101,180

(22) Filed: Aug. 10, 2018

(65) Prior Publication Data

US 2020/0051315 A1 Feb. 13, 2020

(51) Int. Cl.
*G06T 15/06* (2011.01)
*G06T 15/00* (2011.01)

(52) U.S. Cl.
CPC .......... *G06T 15/06* (2013.01); *G06T 15/005* (2013.01)

(58) Field of Classification Search
CPC .................................................. G06T 15/06
See application file for complete search history.

(56) References Cited

U.S. PATENT DOCUMENTS

| 2008/0192054 | A1* | 8/2008 | Fowler | G06T 15/06 345/427 |
| 2010/0231589 | A1* | 9/2010 | Salsbury | G06T 15/06 345/426 |
| 2011/0316855 | A1* | 12/2011 | Mejdrich | G06T 15/06 345/420 |
| 2012/0050289 | A1* | 3/2012 | Park | G06T 15/06 345/426 |
| 2015/0089156 | A1* | 3/2015 | Clohset | G06T 1/60 711/141 |
| 2017/0103567 | A1* | 4/2017 | Peterson | G06T 15/06 |
| 2019/0035138 | A1* | 1/2019 | Fuetterling | G06T 15/06 |

* cited by examiner

*Primary Examiner* — Daniel F Hajnik
(74) *Attorney, Agent, or Firm* — Nixon & Vanderhye, P.C.

(57) ABSTRACT

Methods and systems are described in some examples for changing the traversal of an acceleration data structure in a highly dynamic query-specific manner, with each query specifying test parameters, a test opcode and a mapping of test results to actions. In an example ray tracing implementation, traversal of a bounding volume hierarchy by a ray is performed with the default behavior of the traversal being changed in accordance with results of a test performed using the test opcode and test parameters specified in the ray data structure and another test parameter specified in a node of the bounding volume hierarchy. In an example implementation a traversal coprocessor is configured to perform the traversal of the bounding volume hierarchy.

26 Claims, 33 Drawing Sheets

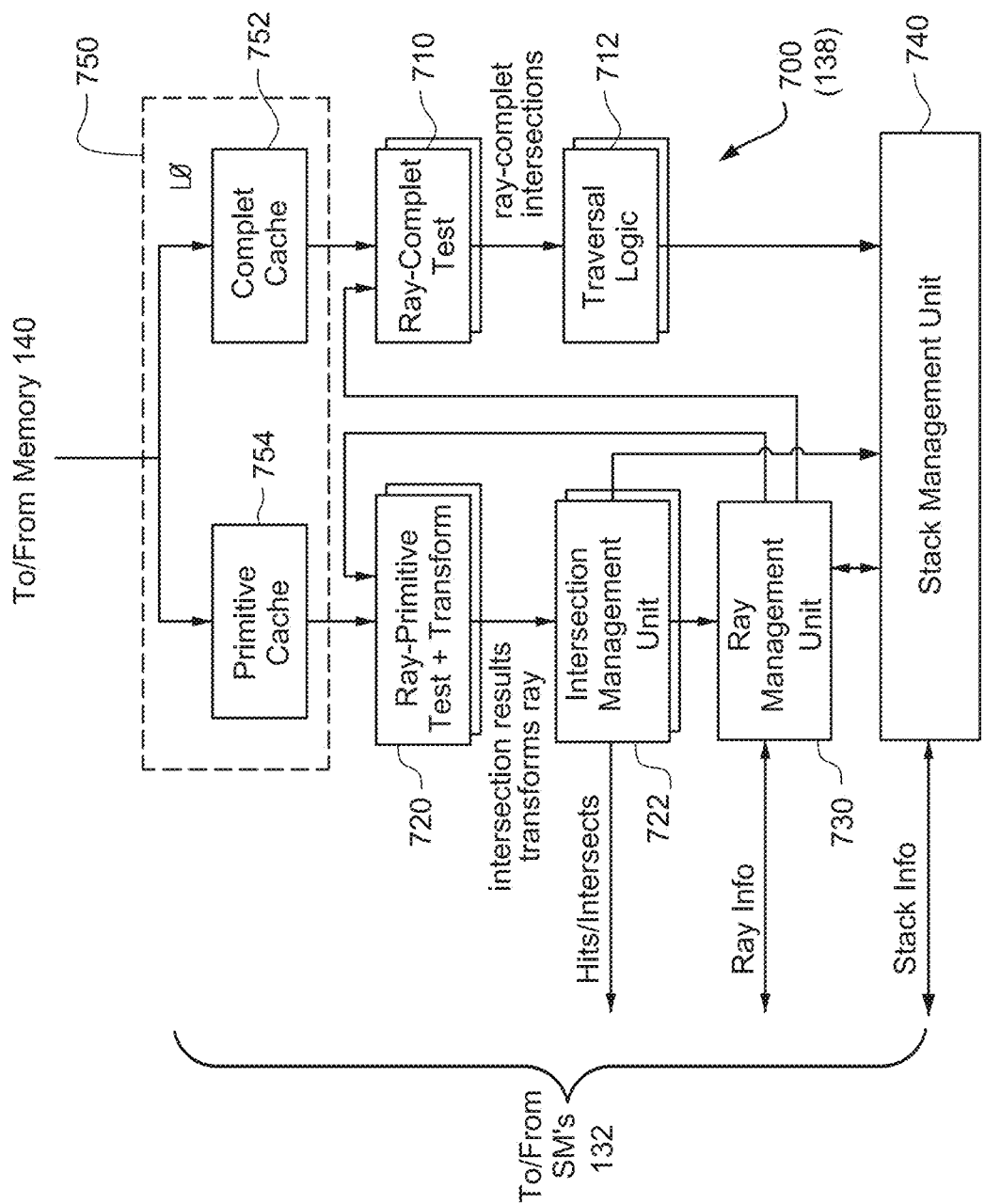
FIG. 9 TRAVERSAL COPROCESSOR

Example Ray Tracing Shading Pipeline

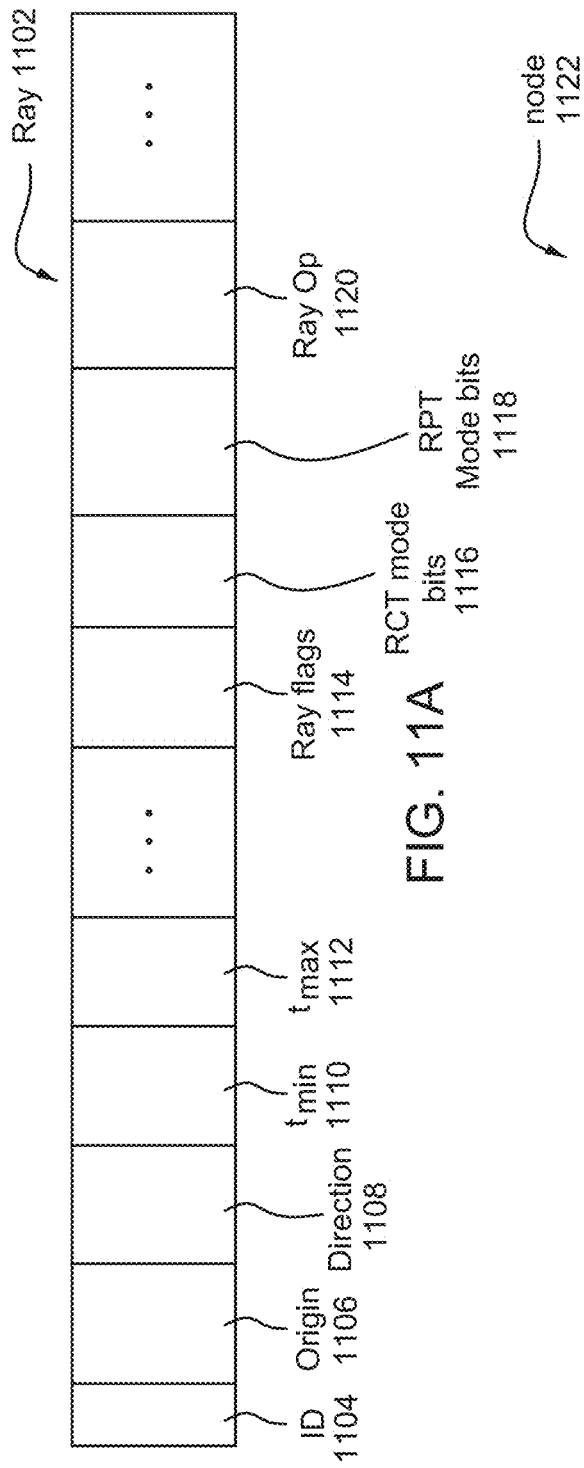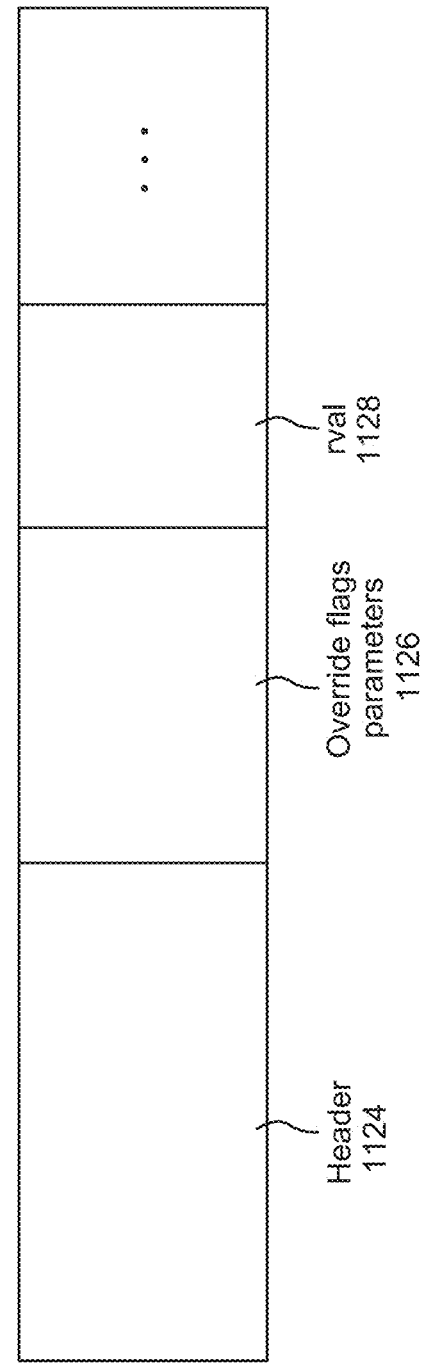

Example Parallel Processing Unit

Example Memory Partition Unit

Example General Processing Cluster

Example Streaming Multiprocessor

Example Streaming Multiprocessor

Graphics Processing Pipeline

QUERY-SPECIFIC BEHAVIORAL MODIFICATION OF TREE TRAVERSAL

CROSS-REFERENCE TO RELATED APPLICATIONS

This application is related to the following commonly-assigned US patents and patent applications, the entire contents of each of which are incorporated by reference: U.S. application Ser. No. 14/563,872 titled "Short Stack Traversal of Tree Data Structures" filed Dec. 8, 2014; U.S. Pat. No. 9,582,607 titled "Block-Based Bounding Volume Hierarchy"; U.S. Pat. No. 9,552,664 titled "Relative Encoding For A Block-Based Bounding Volume Hierarchy" as; U.S. Pat. No. 9,569,559 titled "Beam Tracing" filed Mar. 18, 2015; U.S. Pat. No. 10,025,879 titled "Tree Data Structures Based on a Plurality of Local Coordinate Systems"; U.S. application Ser. No. 14/737,343 titled "Block-Based Lossless Compression of Geometric Data" filed Jun. 11, 2015; and the following U.S. Applications filed concurrently herewith:

- U.S. patent application Ser. No. 16/101,066 filed Aug. 10, 2018, titled "Method for Continued Bounding Volume Hierarchy Traversal On Intersection Without Shader Intervention";
- U.S. patent application Ser. No. 16/101,109 filed Aug. 10, 2018, titled "Method for Efficient Grouping of Cache Requests for Datapath Scheduling";
- U.S. patent application Ser. No. 16/101,247 filed Aug. 10, 2018, titled "Robust, Efficient Multiprocessor-Coprocessor Interface";
- U.S. patent application Ser. No. 16/101,148 filed Aug. 10, 2019, titled "Conservative Watertight Ray Triangle Intersection";
- U.S. patent application Ser. No. 16/101,196 filed Aug. 10, 2018, titled "Method for Handling Out-of-Order Opaque and Alpha Ray/Primitive Intersections"; and
- U.S. patent application Ser. No. 16/101,232 filed Aug. 10, 2020, titled "Method for Forward Progress and Programmable Timeouts of Tree Traversal Mechanisms in Hardware".

FIELD

The present technology relates to computer graphics, and more particularly to ray tracers. More particularly, the technology relates to hardware acceleration of computer graphics processing including but not limited to ray tracing. Still more particularly, the example non-limiting technology herein relates to a hardware-based traversal coprocessor that efficiently traverses an acceleration data structure e.g., for real time ray tracing and query-specific modification of the coprocessor's traversal behavior.

BACKGROUND & SUMMARY

If you look around the visual scene before you, you will notice that some of the most interesting visual effects you see are produced by light rays interacting with surfaces. This is because light is the only thing we see. We don't see objects—we see the light that is reflected or refracted by the objects. Most of the objects we can see reflect light (the color of an object is determined by which parts of light the object reflects and which parts it absorbs). Shiny surfaces such as metallic surfaces, glossy surfaces, ceramics, the surfaces of liquids and a variety of others (even the corneas of the human eyes) act as mirrors that specularly reflect light. For example, a shiny metal surface will reflect light at the same angle as it hit the surface. An object can also cast shadows by preventing light from reaching other surfaces that are behind the object relative to a light source. If you look around, you will notice that the number and kinds of reflections and the number, kinds and lengths of shadows depend on many factors including the number and type of lights in the scene. A single point light such as a single faraway light bulb will produce single reflections and hard shadows. Area light sources such as windows or light panels produce different kinds of reflection highlights and softer shadows. Multiple lights will typically produce multiple reflections and more complex shadows (for example, three separated point light sources will produce three shadows which may overlap depending on the positions of the lights relative to an object).

If you move your head as you survey the scene, you will notice that the reflections change in position and shape (the shadows do the same). By changing your viewpoint, you are changing the various angles of the light rays your eyes detect. This occurs instantaneously—you move your head and the visual scene changes immediately.

The simple act of drinking a cup of tea is a complex visual experience. The various shiny surfaces of the glossy ceramic cup on the table before you reflect each light in the room, and the cup casts a shadow for each light. The moving surface of the tea in the cup is itself reflective. You can see small reflected images of the lights on the tea's surface, and even smaller reflections on the part of the tea's surface where the liquid curves up to meet the walls of the cup. The cup walls also cast shadows onto the surface of the liquid in the cup. Lifting the cup to your mouth causes these reflections and shadows to shift and shimmer as your viewpoint changes and as the surface of the liquid is agitated by movement.

We take these complexities of reflections and shadows for granted. Our brains are adept at decoding the positions, sizes and shapes of shadows and reflections and using them as visual cues. This is in part how we discern the position of objects relative to one another, how we distinguish one object from another and how we learn what objects are made of Different object surfaces reflect differently. Specular (mirror type) reflection of hard metal creates images of reflected objects, while diffuse reflection off of rough surfaces is responsible for color and lights up objects in a softer way. Shadows can be soft and diffuse or hard and distinct depending on the type of lighting, and the lengths and directions of the shadows will depend on the angle of the light rays relative to the object and our eyes.

Beginning artists typically don't try to show reflection or shadows. They tend to draw flat scenes that have no shadows and no reflections or highlights. The same was true with computer graphics of the past.

Real time computer graphics have advanced tremendously over the last 30 years. With the development in the 1980's of powerful graphics processing units (GPUs) providing 3D hardware graphics pipelines, it became possible to produce 3D graphical displays based on texture-mapped polygon primitives in real time response to user input. Such real time graphics processors were built upon a technology called scan conversion rasterization, which is a means of determining visibility from a single point or perspective. Using this approach, three-dimensional objects are modeled from surfaces constructed of geometric primitives, typically polygons such as triangles. The scan conversion process establishes and projects primitive polygon vertices onto a view plane and fills in the points inside the edges of the primitives. See e.g., Foley, Van Dam, Hughes et al, Computer Graphics: Principles and Practice (2d Ed. Addison-Wesley 1995 & 3d Ed. Addison-Wesley 2014).

Hardware has long been used to determine how each polygon surface should be shaded and texture-mapped and to rasterize the shaded, texture-mapped polygon surfaces for display. Typical three-dimensional scenes are often constructed from millions of polygons. Fast modern GPU hardware can efficiently process many millions of graphics primitives for each display frame (every $1/30^{th}$ or $1/60^{th}$ of a second) in real time response to user input. The resulting graphical displays have been used in a variety of real time graphical user interfaces including but not limited to augmented reality, virtual reality, video games and medical imaging. But traditionally, such interactive graphics hardware has not been able to accurately model and portray reflections and shadows.

Some have built other technologies onto this basic scan conversion rasterization approach to allow real time graphics systems to accomplish a certain amount of realism in rendering shadows and reflections. For example, texture mapping has sometimes been used to simulate reflections and shadows in a 3D scene. One way this is commonly done is to transform, project and rasterize objects from different perspectives, write the rasterized results into texture maps, and sample the texture maps to provide reflection mapping, environment mapping and shadowing. While these techniques have proven to be useful and moderately successful, they do not work well in all situations. For example, so-called "environment mapping" may often require assuming the environment is infinitely distant from the object. In addition, an environment-mapped object may typically be unable to reflect itself. See e.g., http://developer.download.nvidia.com/CgTutorial/cg_tutorial_chapter07.html. These limitations result because conventional computer graphics hardware—while sufficiently fast for excellent polygon rendering—does not perform the light visualization needed for accurate and realistic reflections and shadows. Some have likened raster/texture approximations of reflections and shadows as the visual equivalent of AM radio.

There is another graphics technology which does perform physically realistic visibility determinations for reflection and shadowing. It is called "ray tracing". Ray tracing was developed at the end of the 1960's and was improved upon in the 1980's. See e.g., Apple, "Some Techniques for Shading Machine Renderings of Solids" (SJCC 1968) pp. 27-45; Whitted, "An Improved Illumination Model for Shaded Display" Pages 343-349 Communications of the ACM Volume 23 Issue 6 (June 1980); and Kajiya, "The Rendering Equation", Computer Graphics (SIGGRAPH 1986 Proceedings, Vol. 20, pp. 143-150). Since then, ray tracing has been used in non-real time graphics applications such as design and film making. Anyone who has seen "Finding Dory" (2016) or other Pixar animated films has seen the result of the ray tracing approach to computer graphics—namely realistic shadows and reflections. See e.g., Hery et al, "Towards Bidirectional Path Tracing at Pixar" (2016).

Ray tracing is a primitive used in a variety of rendering algorithms including for example path tracing and Metropolis light transport. In an example algorithm, ray tracing simulates the physics of light by modeling light transport through the scene to compute all global effects (including for example reflections from shiny surfaces) using ray optics. In such uses of ray tracing, an attempt may be made to trace each of many hundreds or thousands of light rays as they travel through the three-dimensional scene from potentially multiple light sources to the viewpoint. Often, such rays are traced relative to the eye through the scene and tested against a database of all geometry in the scene. The rays can be traced forward from lights to the eye, or backwards from the eye to the lights, or they can be traced to see if paths starting from the virtual camera and starting at the eye have a clear line of sight. The testing determines either the nearest intersection (in order to determine what is visible from the eye) or traces rays from the surface of an object toward a light source to determine if there is anything intervening that would block the transmission of light to that point in space. Because the rays are similar to the rays of light in reality, they make available a number of realistic effects that are not possible using the raster based real time 3D graphics technology that has been implemented over the last thirty years. Because each illuminating ray from each light source within the scene is evaluated as it passes through each object in the scene, the resulting images can appear as if they were photographed in reality. Accordingly, these ray tracing methods have long been used in professional graphics applications such as design and film, where they have come to dominate over raster-based rendering.

The main challenge with ray tracing has generally been speed. Ray tracing requires the graphics system to compute and analyze, for each frame, each of many millions of light rays impinging on (and potentially reflected by) each surface making up the scene. In the past, this enormous amount of computation complexity was impossible to perform in real time.

One reason modern GPU 3D graphics pipelines are so fast at rendering shaded, texture-mapped surfaces is that they use coherence efficiently. In conventional scan conversion, everything is assumed to be viewed through a common window in a common image plane and projected down to a single vantage point. Each triangle or other primitive is sent through the graphics pipeline and covers some number of pixels. All related computations can be shared for all pixels rendered from that triangle. Rectangular tiles of pixels corresponding to coherent lines of sight passing through the window may thus correspond to groups of threads running in lock-step in the same streaming processor. All the pixels falling between the edges of the triangle are assumed to be the same material running the same shader and fetching adjacent groups of texels from the same textures. In ray tracing, in contrast, rays may start or end at a common point (a light source, or a virtual camera lens) but as they propagate through the scene and interact with different materials, they quickly diverge. For example, each ray performs a search to find the closest object. Some caching and sharing of results can be performed, but because each ray potentially can hit different objects, the kind of coherence that GPU's have traditionally taken advantage of in connection with texture mapped, shaded triangles is not present (e.g., a common vantage point, window and image plane are not there for ray tracing). This makes ray tracing much more computationally challenging than other graphics approaches—and therefore much more difficult to perform on an interactive basis.

Much research has been done on making the process of tracing rays more efficient and timely. See e.g., Glassner, An Introduction to Ray Tracing (Academic Press Inc., 1989). Because each ray in ray tracing is, by its nature, evaluated independently from the rest, ray tracing has been called "embarrassingly parallel." See e.g., Akenine-Möller et al., Real Time Rendering at Section 9.8.2, page 412 (Third Ed. CRC Press 2008). As discussed above, ray tracing involves effectively testing each ray against all objects and surfaces in the scene. An optimization called "acceleration data structure" and associated processes allows the graphics system to use a "divide-and-conquer" approach across the acceleration data structure to establish what surfaces the ray hits and what surfaces the ray does not hit. Each ray traverses the acceleration data structure in an individualistic way. This means that dedicating more processors to ray tracing gives a nearly linear performance increase. With increasing parallelism of graphics processing systems, some began envisioning the possibility that ray tracing could be performed in real time. For example, work at Saarland University in the mid-2000's produced an early special purpose hardware system for interactive ray tracing that provided some degree of programmability for using geometry, vertex and lighting shaders. See Woop et al., "RPU: A Programmable Ray Processing Unit for Real Time Ray Tracing" (ACM 2005). As another example, Advanced Rendering Technology developed "RenderDrive" based on an array of AR250/350 rendering processors derived from ARM1 and enhanced with custom pipelines for ray/triangle intersection and SIMD vector and texture math but with no fixed-function traversal logic. See e.g., http://www.graphicshardware.org/previous/www_2001/presentations/Hot3D_Daniel_Hall.pdf Then, in 2010, NVIDIA took advantage of the high degree of parallelism of NVIDIA GPUs and other highly parallel architectures to develop the OptiX™ ray tracing engine. See Parker et al., "OptiX: A General Purpose Ray Tracing Engine" (ACM Transactions on Graphics, Vol. 29, No. 4, Article 66, July 2010). In addition to improvements in API's (application programming interfaces), one of the advances provided by OptiX™ was improving the acceleration data structures used for finding an intersection between a ray and the scene geometry. Such acceleration data structures are usually spatial or object hierarchies used by the ray tracing traversal algorithm to efficiently search for primitives that potentially intersect a given ray. OptiX™ provides a number of different acceleration structure types that the application can choose from. Each acceleration structure in the node graph can be a different type, allowing combinations of high-quality static structures with dynamically updated ones.

The OptiX™ programmable ray tracing pipeline provided significant advances, but was still generally unable by itself to provide real time interactive response to user input on relatively inexpensive computing platforms for complex 3D scenes. Since then, NVIDIA has been developing hardware acceleration capabilities for ray tracing. See e.g., U.S. Pat. Nos. 9,582,607; 9,569,559; US 20160070820; and US 20160070767.

Given the great potential of a truly interactive real time ray tracing graphics processing system for rendering high quality images of arbitrary complexity in response for example to user input, further work is possible and desirable.

BRIEF DESCRIPTION OF THE DRAWINGS

FIG. 9 shows a simplified example non-limiting traversal co-processor comprising a tree traversal unit (TTU).
FIG. 11A illustrates an example query data structure, according to some embodiments.
FIG. 11B shows an example node data structure in the BVH, according to some embodiments.

DETAILED DESCRIPTION OF NON-LIMITING EMBODIMENTS

Figure 1:
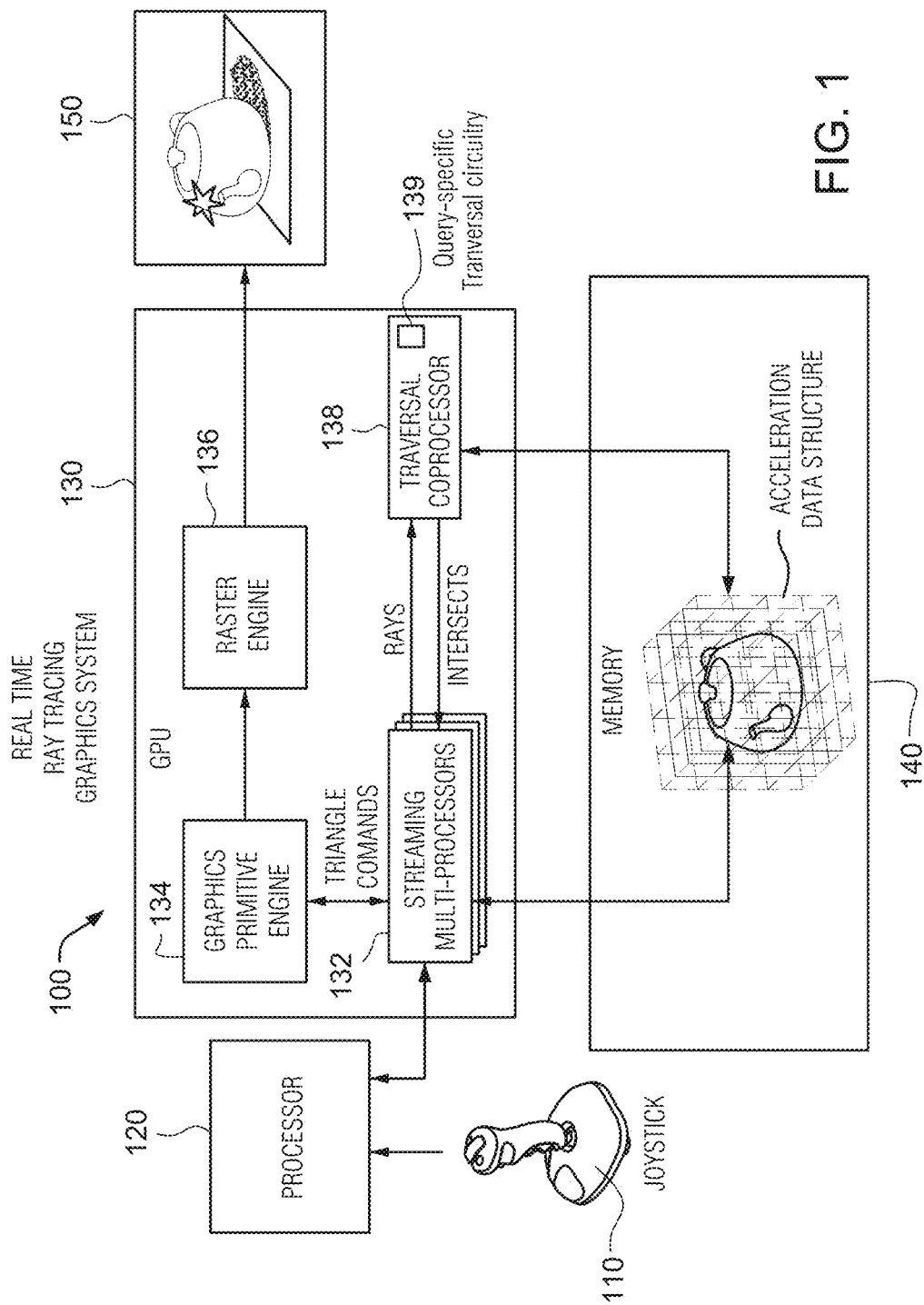
FIG. 1 illustrates an example non-limiting ray tracing graphics system.

The technology herein provides hardware capabilities that accelerate ray tracing to such an extent that it brings the power of ray tracing to games and other interactive real time computer graphics, initially enabling high effect quality in shadows and reflections and ultimately global illumination. In practice, this means accelerating ray tracing by a factor of up to an order of magnitude or more over what would be possible in software on the same graphics rendering system.
In more detail, the example non-limiting technology provides dedicated hardware to accelerate ray tracing. In non-limiting embodiments, a hardware co-processor (herein referred to as a "traversal coprocessor" or in some embodiments a "tree traversal unit" or "TTU") accelerates certain processes supporting interactive ray tracing including ray-bounding volume intersection tests, ray-primitive intersection tests and ray "instance" transforms.

In some non-limiting embodiments, the traversal co-processor performs queries on an acceleration data structure for processes running on potentially massively-parallel streaming multiprocessors (SMs). The traversal co-processor traverses the acceleration data structure to discover information about how a given ray interacts with an object the acceleration data structure describes or represents. For ray tracing, the traversal coprocessors are callable as opposed to e.g., fixed function units that perform an operation once between logical pipeline stages running different types of threads (e.g., vertex threads and pixel threads).

In some non-limiting embodiments, the acceleration data structure comprises a hierarchy of bounding volumes (bounding volume hierarchy or BVH) that recursively encapsulates smaller and smaller bounding volume subdivisions. The largest volumetric bounding volume may be termed a "root node." The smallest subdivisions of such hierarchy of bounding volumes ("leaf nodes") contain items. The items could be primitives (e.g., polygons such as triangles) that define surfaces of the object. Or, an item could be a sphere that contains a whole new level of the world that exists as an item because it has not been added to the BVH (think of the collar charm on the cat from "Men in Black" which contained an entire miniature galaxy inside of it). If the item comprises primitives, the traversal co-processor tests rays against the primitives to determine which object surfaces the rays intersect and which object surfaces are visible along the ray.

The traversal co-processor performs a test of each ray against a wide range of bounding volumes, and can cull any bounding volumes that don't intersect with that ray. Starting at a root node that bounds everything in the scene, the traversal co-processor tests each ray against smaller (potentially overlapping) child bounding volumes which in turn bound the descendent branches of the BVH. The ray follows the child pointers for the bounding volumes the ray hits to other nodes until the leaves or terminal nodes (volumes) of the BVH are reached. Once the traversal co-processor traverses the acceleration data structure to reach a terminal or "leaf" node that contains a geometric primitive, it performs an accelerated ray-primitive intersection test that determines whether the ray intersects that primitive (and thus the object surface that primitive defines). The ray-primitive test can provide additional information about primitives the ray intersects that can be used to determine the material properties of the surface required for shading and visualization. Recursive traversal through the acceleration data structure enables the traversal co-processor to discover all object primitives the ray intersects, or the closest (from the perspective of the viewpoint) primitive the ray intersects (which in some cases is the only primitive that is visible from the viewpoint along the ray).

The traversal co-processor also accelerates the transform of each ray from world space into object space to obtain finer and finer bounding box encapsulations of the primitives and reduce the duplication of those primitives across the scene. Objects replicated many times in the scene at different positions, orientations and scales can be represented in the scene as instance nodes which associate a bounding box and leaf node in the world space BVH with a transformation that can be applied to the world-space ray to transform it into an object coordinate space, and a pointer to an object-space BVH. This avoids replicating the object space BVH data multiple times in world space, saving memory and associated memory accesses. The instance transform increases efficiency by transforming the ray into object space instead of requiring the geometry or the bounding volume hierarchy to be transformed into world (ray) space and is also compatible with additional, conventional rasterization processes that graphics processing performs to visualize the primitives.

Certain presently disclosed non-limiting embodiments thus provide a traversal co-processor, a new subunit of one or a group of streaming multiprocessor SMs of a 3D graphics processing pipeline. In order to understand where the traversal co-processor fits in the overall picture, it may be helpful to understand a few fundamentals of the algorithm employed by most or all modern ray tracers. But it should be pointed out that the technology herein provides a generic capability to determine, for a thread running in a GPU, what the nearest visible thing is from a given point along a specified direction, or if anything lies between two points. A common use case for such capability will be in processes that start tracing rays from points that have already been rasterized on triangles using conventional scan conversion techniques. The disclosed technology can but does not necessarily replace or substitute for scan conversion technology, and may often augment it and be used in conjunction with scan conversion techniques to enhance images with photorealistic reflections, shadows and other effects.

Ray Tracing Techniques

Generally, ray tracing is a rendering method in which rays are used to determine the visibility of various elements in the scene. Ray tracing can be used to determine if anything is visible along a ray (for example, testing for occluders between a shaded point on a geometric primitive and a point on a light source) and can also be used to evaluate reflections (which may for example involve performing a traversal to determine the nearest visible surface along a line of sight so that software running on a streaming processor can evaluate a material shading function corresponding to what was hit—which in turn can launch one or more additional rays into the scene according to the material properties of the object that was intersected) to determine the light returning along the ray back toward the eye. In classical Whitted-style ray tracing, rays are shot from the viewpoint through the pixel grid into the scene, but other path traversals are possible. Typically, for each ray, the closest object is found. This intersection point can then be determined to be illuminated or in shadow by shooting a ray from it to each light source in the scene and finding if any objects are in between. Opaque objects block the light, whereas transparent objects attenuate it. Other rays can be spawned from an intersection point. For example, if the intersecting surface is shiny or specular, rays are generated in the reflection direction. The ray may accept the color of the first object intersected, which in turn has its intersection point tested for shadows. This reflection process is recursively repeated until a recursion limit is reached or the potential contribution of subsequent bounces falls below a threshold. Rays can also be generated in the direction of refraction for transparent solid objects, and again recursively evaluated. See Akenine-Möller et al., cited above. Ray tracing technology thus allows a graphics system to develop physically correct reflections and shadows that are not subject to the limitations and artifacts of scan conversion techniques.

Traversal Coprocessor

The basic task the traversal coprocessor performs is to test a ray against all primitives (commonly triangles in one embodiment) in the scene and report either the closest hit (according to distance measured along the ray) or simply the first (not necessarily closest) hit encountered, depending upon use case. The naïve algorithm would be an O(n) brute-force search. By pre-processing the scene geometry and building a suitable acceleration data structure in advance, however, it is possible to reduce the average-case complexity to O(log n). In ray tracing, the time for finding the closest (or for shadows, any) intersection for a ray is typically order O(log n) for n objects when an acceleration data structure is used. For example, bounding volume hierarchies (BVHs) of the type commonly used for modern ray tracing acceleration data structures typically have an O(log n) search behavior.

Bounding Volume Hierarchies

The acceleration data structure most commonly used by modern ray tracers is a bounding volume hierarchy (BVH) comprising nested axis-aligned bounding boxes (AABBs). The leaf nodes of the BVH contain the primitives (e.g., triangles) to be tested for intersection. The BVH is most often represented by a graph or tree structure data representation. In such instances, the traversal coprocessor may be called a "tree traversal unit" or "TTU".

Given a BVH, ray tracing amounts to a tree search where each node in the tree visited by the ray has a bounding volume for each descendent branch or leaf, and the ray only visits the descendent branches or leaves whose corresponding bound volume it intersects. In this way, only a small number of primitives must be explicitly tested for intersection, namely those that reside in leaf nodes intersected by the ray. In the example non-limiting embodiments, the traversal coprocessor accelerates both tree traversal (including the ray-volume tests) and ray-primitive tests. As part of traversal, the traversal coprocessor can also handle "instance transforms"—transforming a ray from world-space coordinates into the coordinate system of an instanced mesh (object space) e.g., in order to avoid the computational complexity of transforming the primitive vertices into world space. It can do so in a MIMD (multiple-instruction, multiple data) fashion, meaning that the rays are handled independently once inside the traversal coprocessor.

Example Non-Limiting Real Time Interactive Ray Tracing System

FIG. 1 illustrates an example real time ray interactive tracing graphics system 100 for generating images using three dimensional (3D) data of a scene or object(s). System 100 includes an input device 110, a processor(s) 120, a graphics processing unit(s) (GPU(s)) 130, memory 140, and a display(s) 150. The system shown in FIG. 1 can take on any form factor including but not limited to a personal computer, a smart phone or other smart device, a video game system, a wearable virtual or augmented reality system, a cloud-based computing system, a vehicle-mounted graphics system, a system-on-a-chip (SoC), etc.

The processor 120 may be a multicore central processing unit (CPU) operable to execute an application in real time interactive response to input device 110, the output of which includes images for display on display 150. Display 150 may be any kind of display such as a stationary display, a head mounted display such as display glasses or goggles, other types of wearable displays, a handheld display, a vehicle mounted display, etc. For example, the processor 120 may execute an application based on inputs received from the input device 110 (e.g., a joystick, an inertial sensor, an ambient light sensor, etc.) and instruct the GPU 130 to generate images showing application progress for display on the display 150.

Based on execution of the application on processor 120, the processor may issue instructions for the GPU 130 to generate images using 3D data stored in memory 140. The GPU 130 includes specialized hardware for accelerating the generation of images in real time. For example, the GPU 130 is able to process information for thousands or millions of graphics primitives (polygons) in real time due to the GPU's ability to perform repetitive and highly-parallel specialized computing tasks such as polygon scan conversion much faster than conventional software-driven CPUs. For example, unlike the processor 120, which may have multiple cores with lots of cache memory that can handle a few software threads at a time, the GPU 130 may include hundreds or thousands of processing cores or "streaming multiprocessors" (SMs) 132 running in parallel.

In one example embodiment, the GPU 130 includes a plurality of programmable streaming multiprocessors (SMs) 132, and a hardware-based graphics pipeline including a graphics primitive engine 134 and a raster engine 136. These components of the GPU 130 are configured to perform real-time image rendering using a technique called "scan conversion rasterization" to display three-dimensional scenes on a two-dimensional display 150. In rasterization, geometric building blocks (e.g., points, lines, triangles, quads, meshes, etc.) of a 3D scene are mapped to pixels of the display (often via a frame buffer memory).

The GPU 130 converts the geometric building blocks (i.e., polygon primitives such as triangles) of the 3D model into pixels of the 2D image and assigns an initial color value for each pixel. The graphics pipeline may apply shading, transparency, texture and/or color effects to portions of the image by defining or adjusting the color values of the pixels. The final pixel values may be anti-aliased, filtered and provided to the display 150 for display. Many software and hardware advances over the years have improved subjective image quality using rasterization techniques at frame rates needed for real-time graphics (i.e., 30 to 60 frames per second) at high display resolutions such as 4096×2160 pixels or more on one or multiple displays 150.

Traversal Coprocessor Addition to Architecture

To enable the GPU 130 to perform ray tracing in real time in an efficient manner, the GPU is provided with traversal coprocessor 138 coupled to one or more SMs 132. The traversal coprocessor 138 includes hardware components configured to perform operations commonly utilized in ray tracing algorithms A goal of the traversal coprocessor 138 is to accelerate operations used in ray tracing to such an extent that it brings the power of ray tracing to real-time graphics application (e.g., games), enabling high-quality shadows, reflections, and global illumination. Traversal coprocessor 138, in some example embodiments, includes query-specific traversal hardware 139 that enables query-specific programming of the traversal coprocessor's behavior to e.g., increase flexibility and responsiveness of ray tracing operations to dynamic changes and the like in a scene being rendered. As discussed in more detail below, the result of the traversal coprocessor 138 may be used together with or as an alternative to other graphics related operations performed in the GPU 130.

In the example architecture shown, the new hardware component called a "traversal coprocessor" 138 is used to accelerate certain tasks including but not limited to ray tracing. Ray tracing refers to casting a ray into a scene and determining whether and where that ray intersects the scene's geometry. This basic ray tracing visibility test is the fundamental primitive underlying a variety of rendering algorithms and techniques in computer graphics. For example, ray tracing can be used together with or as an alternative to rasterization and z-buffering for sampling scene geometry. It can also be used as an alternative to (or in combination with) environment mapping and shadow texturing for producing more realistic reflection, refraction and shadowing effects than can be achieved via texturing techniques or other raster "hacks". To overcome limitations in image quality that can be achieved with rasterization, system 100 can also generate entire images or parts of images using ray tracing techniques. Ray tracing may also be used as the basic primitive to accurately simulate light transport in physically-based rendering algorithms such as path tracing, photon mapping, Metropolis light transport, and other light transport algorithms.

More specifically, SMs 132 and the traversal coprocessor 138 may cooperate to cast rays into a 3D model and determine whether and where that ray intersects the model's geometry. Ray tracing directly simulates light traveling through a virtual environment or scene. The results of the ray intersections together with surface texture, viewing direction, and/or lighting conditions are used to determine pixel color values. Ray tracing performed by SMs 132 working with traversal coprocessor 138 allows for computer-generated images to capture shadows, reflections, and refractions in ways that can be indistinguishable from photographs or video of the real world. Since ray tracing techniques are even more computationally intensive than rasterization due in part to the large number of rays that need to be traced, the traversal coprocessor 138 is capable of accelerating in hardware certain of the more computationally-intensive aspects of that process.

In the example non-limiting technology herein, traversal coprocessor 138 accelerates both ray-box tests and ray-primitive tests. As part of traversal, it can also handle at least one level of instance transforms, transforming a ray from world-space coordinates into the coordinate system of an instanced mesh. In the example non-limiting embodiments, the traversal coprocessor 138 does all of this in MIMD fashion, meaning that rays are handled independently once inside the traversal coprocessor.

In the example non-limiting embodiments, the traversal coprocessor 138 operates as a servant (coprocessor) to the SMs (streaming multiprocessors) 132. In other words, the traversal coprocessor 138 in example non-limiting embodiments does not operate independently, but instead follows the commands of the SMs 132 to perform certain computationally-intensive ray tracing related tasks much more efficiently than the SMs 132 could perform themselves.

In the examples shown, the traversal coprocessor 138 receives commands via SM 132 instructions and writes results back to an SM register file. For many common use cases (e.g., opaque triangles with at most one level of instancing), the traversal coprocessor 138 can service the ray tracing query without further interaction with the SM 132. More complicated queries (e.g., involving alpha-tested triangles, primitives other than triangles, or multiple levels of instancing) may require multiple round trips. In addition to tracing rays, the traversal coprocessor 138 is capable of performing more general spatial queries where an AABB or the extruded volume between two AABBs (which we call a "beam") takes the place of the ray. Thus, while the traversal coprocessor 138 is especially adapted to accelerate ray tracing related tasks, it can also be used to perform tasks other than ray tracing.

In addition to the traversal coprocessor 138, the example non-limiting technology used to support the system 100 of FIG. 1 provides additional accelerated ray tracing enhancements to a number of units as well as a substantial effort devoted to BVH construction. BVH construction need not be hardware accelerated (although it may be in some non-limiting embodiments) but could instead be implemented using highly-optimized software routines running on SMs 132 and/or CPU 120 and/or other development systems e.g., during development of an application. The following exposition describes, among other things, software-visible behavior of the traversal coprocessor 138, interfaces to surrounding units (SMs 132 and the memory subsystem), and additional features that are part of a complete ray-tracing solution such as certain enhancements to the group of SMs 132 and the memory caching system.

As discussed above, the traversal coprocessor 138 allows for quick traversal of an acceleration data structure (e.g., a BVH) to determine which primitives (e.g., triangles used for generating a scene) in the data structure are intersected by a query data structure (e.g., a ray). Example embodiments enable further improvements, such as, capability to select the traversal behavior based on particular query (e.g., ray) characteristics and/or intersected node characteristics, improved responsiveness to dynamic changes in the scene, improved BVH traversal speeds etc., by providing techniques and systems for query-specific programming of the traversal process.

Traversing an Acceleration Data Structure

A good way to accelerate ray tracing is to use an acceleration data structure. The acceleration data structure represents the 3D model of an object or a scene in a manner that will help assist in quickly deciding which portion of the object a particular ray is likely to intersect and quickly rejecting large portions of the scene the ray will not intersect. A bounding volume hierarchy (BVH) data structure is one type of acceleration data structure which can help reduce the number of intersections to test. The BVH data structure represents a scene or object with a bounding volume and subdivides the bounding volume into smaller and smaller bounding volumes terminating in leaf nodes containing geometric primitives. The bounding volumes are hierarchical, meaning that the topmost level encloses the level below it, that level encloses the next level below it, and so on. In one embodiment, leaf nodes can potentially overlap other leaf nodes in the bounding volume hierarchy.

Figure 2A:
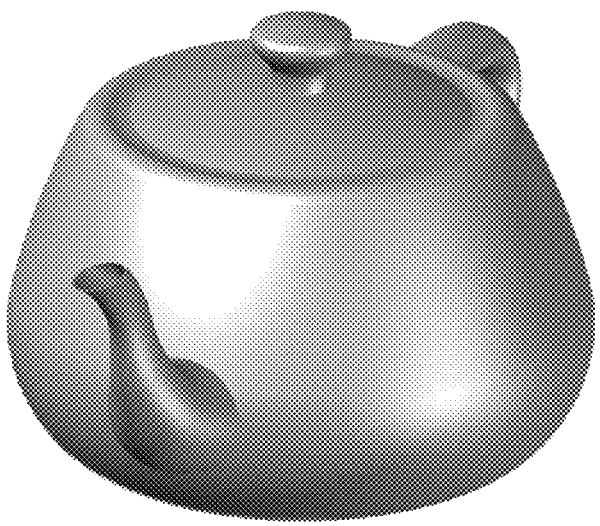
FIG. 2A shows an example specular object.
Figure 2B:
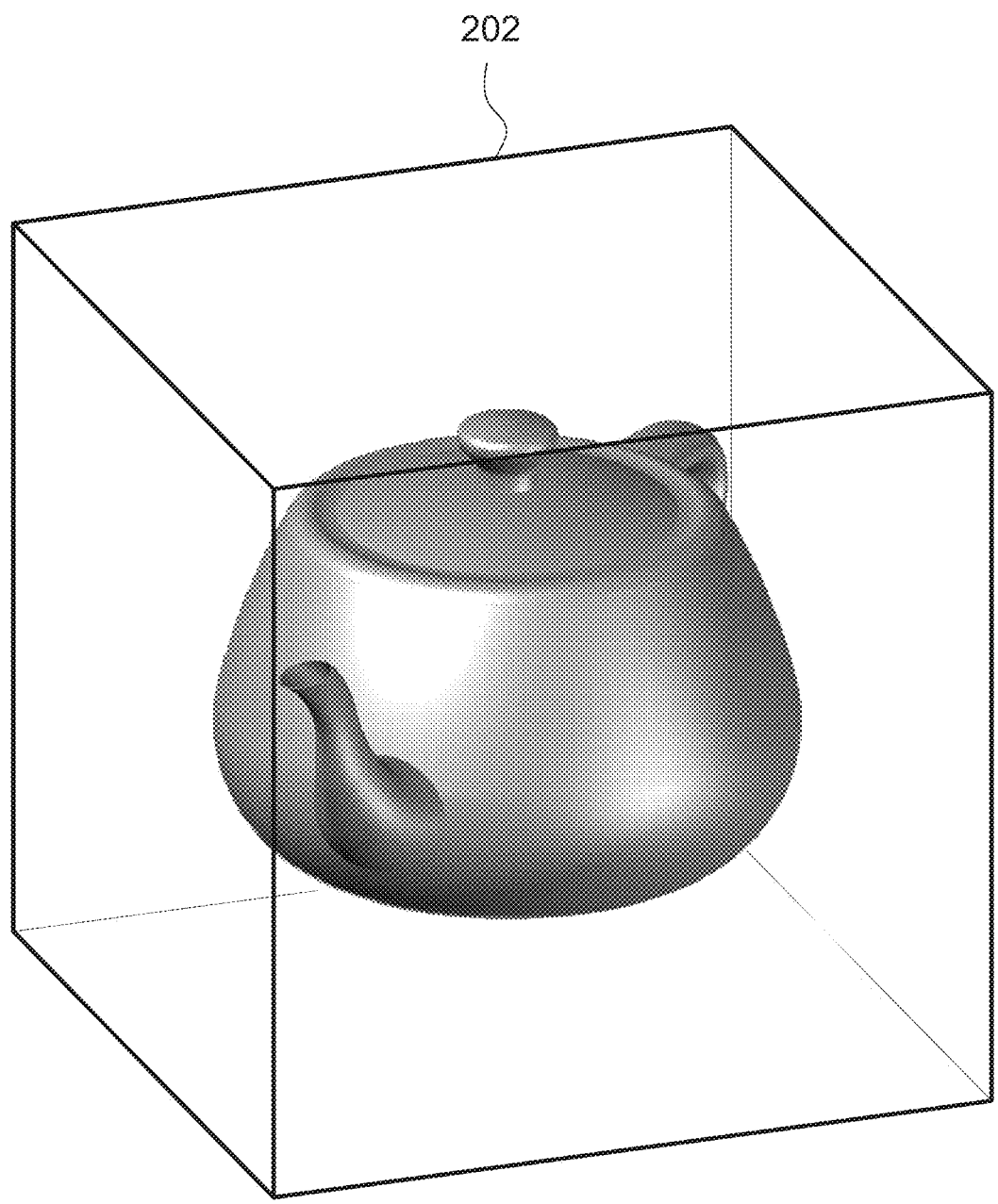
FIG. 2B shows the example object within a bounding volume.

To illustrate how a bounding volume hierarchy works, FIGS. 2A-2G show a teapot recursively subdivided into smaller and smaller hierarchical bounding volumes. FIG. 2A shows a teapot object, and FIG. 2B shows a bounding volume 202 (in this case a box, cube or rectangular parallelepiped) enclosing the whole teapot. The bounding volume 202, which can be efficiently defined by its vertices, provides an indication of the spatial location of the object and is typically dimensioned to be just slightly larger than the object.

The first stage in acceleration structure construction acquires the bounding boxes of the referenced geometry. This is achieved by executing for each geometric primitive in an object a bounding box procedure that returns a conservative axis-aligned bounding box for its input primitive such as box 202 shown in FIG. 2B. Using these bounding boxes as elementary primitives for the acceleration structures provides the necessary abstraction to trace rays against arbitrary user-defined geometry (including several types of geometry within a single structure). Because in FIG. 2B the bounding volume 202 is larger than and completely contains the teapot, a ray that does not intersect bounding volume cannot intersect the teapot, although a ray that does intersect the bounding volume may or may not intersect the teapot. Because the bounding volume 202 is readily defined by the x,y,z coordinates of its vertices in 3D space and a ray is defined by its x,y,z coordinates in 3D space, the ray-bounding volume test to determine whether a ray intersects the bounding volume 202 is straightforward (although some transform may be used to adjust to different coordinate systems, as will be explained below).

Figure 2C:
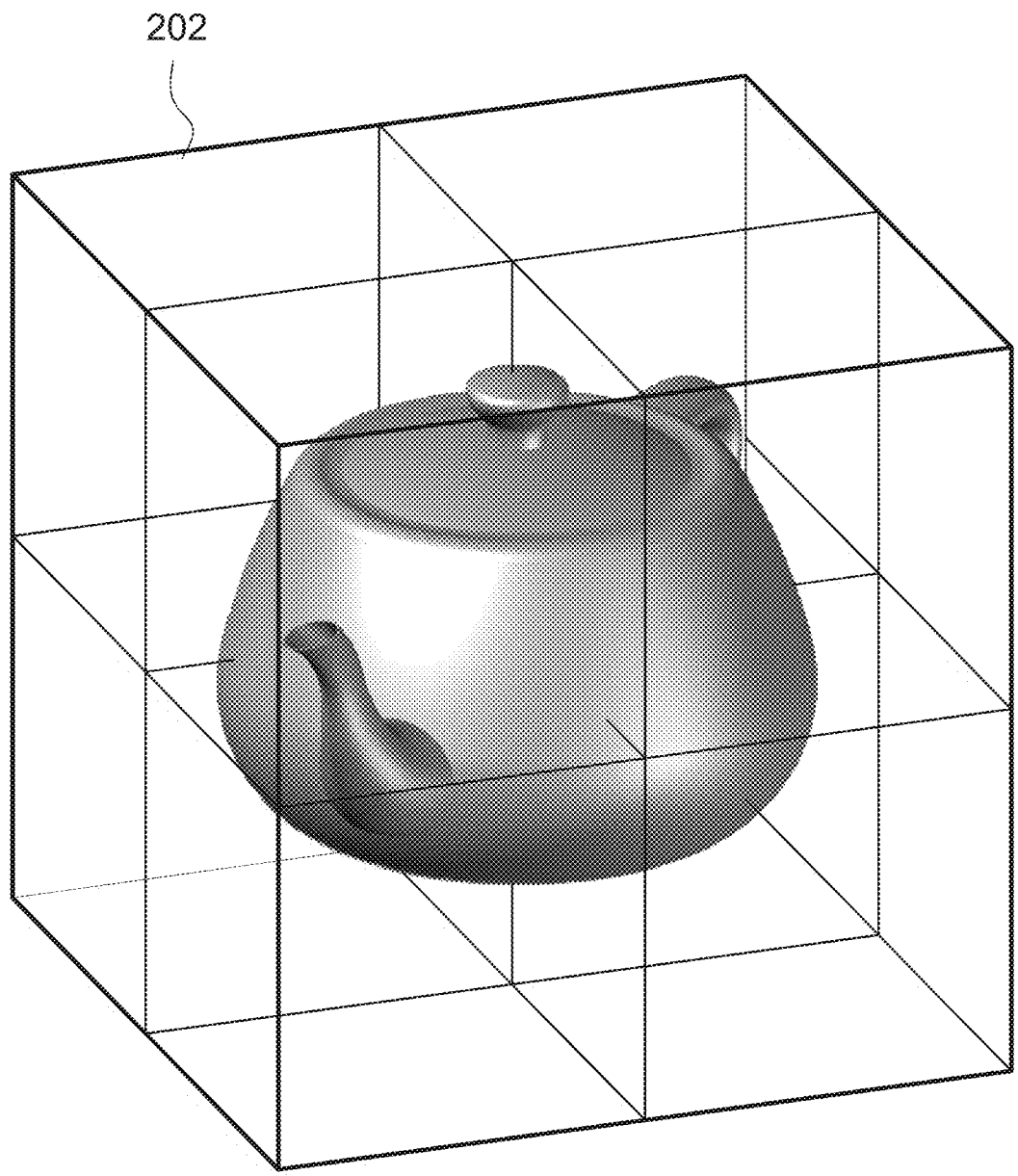
FIG. 2C shows an example volumetric subdividing of the FIG. 2B bounding volume.

FIG. 2C, shows the bounding volume 202 subdivided into smaller contained bounding volumes. While the subdivision scheme shown here for purposes of illustration is a so-called 8-ary subdivision or "octree" in which each volume is subdivided into eight smaller volumes of uniform size, many other spatial hierarchies and subdivision schemes are known such as a binary tree, a four-ary tree, a k-d tree, a binary space partitioning (BSP) tree, and a bounding volume hierarchy (BVH) tree. See e.g., U.S. Pat. No. 9,582,607.

Figure 2D:
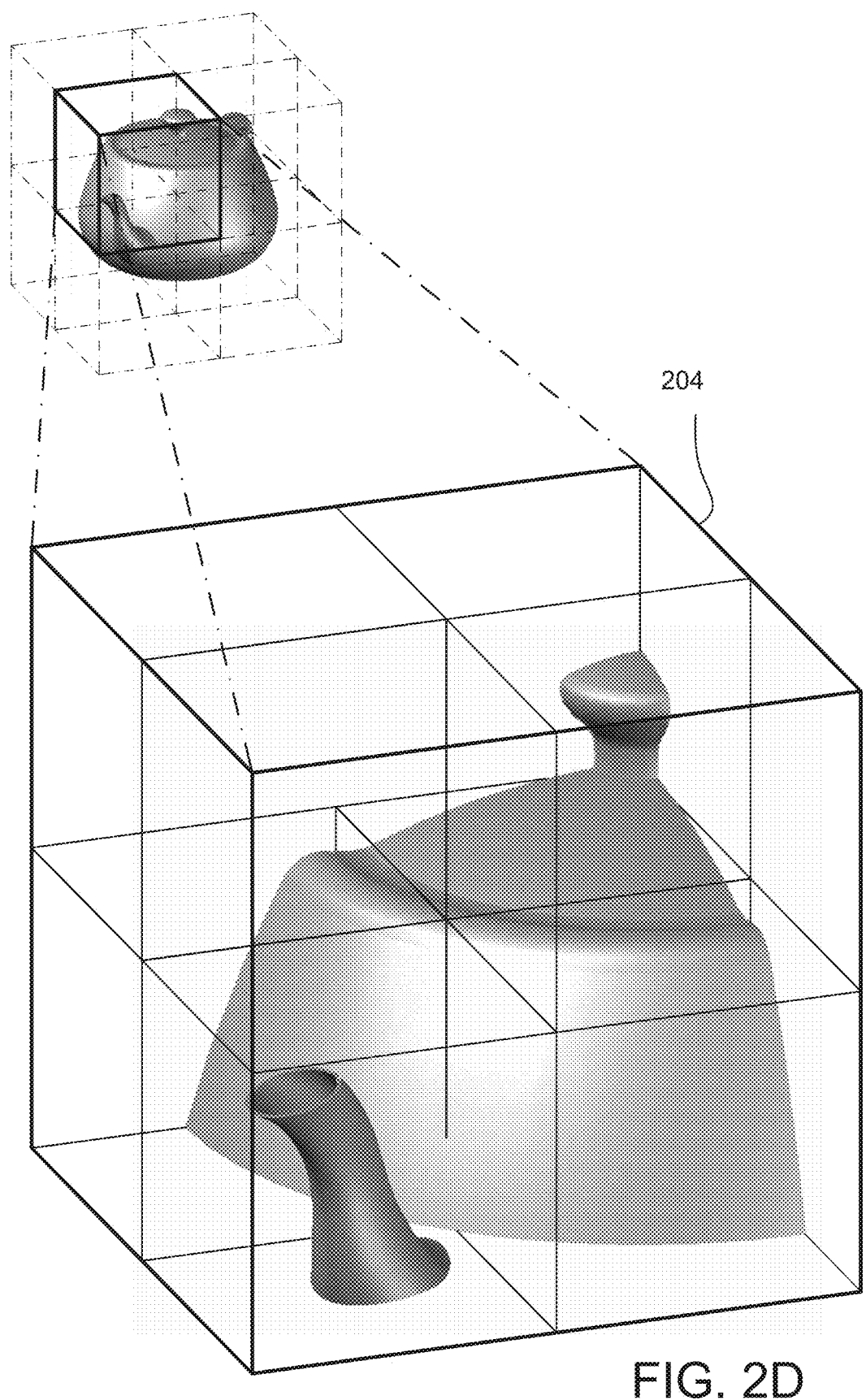
FIGS. 2D, 2E and 2F show example further levels of volumetric subdivision of the bounding volume to create a bounding volume hierarchy (BVH).

Each of the subdivided bounding volumes shown in FIG. 2C can be still further subdivided. FIG. 2D shows one of the subdivided volumes 204 of FIG. 2C being further subdivided to provide additional subdivided encapsulated bounding volumes. As shown in FIG. 2D, some of the subdivided bounding volumes include portions of the teapot and some do not. Volumes that do not contain a portion of the teapot are not further subdivided because the further subdivisions provide no further spatial information about the teapot. Already subdivided bounding volumes that do include at least one portion of the teapot can be still further recursively subdivided—like the emergence of each of a succession of littler and littler cats from the hats of Dr. Seuss's *The Cat In The Hat Comes Back* (1958). The portions of the space within bounding volume 202 that contain geometry are recursively subdivided to permit the traversal coprocessor 138 to use the volumetric subdivisions to efficiently discover where the geometry is located relative to any given ray. It can be noted that while a spatial or active subdivision of the volume is possible, many implementations will create the hierarchical structure defining volumes and subvolumes ahead of time. In such cases, the builder may often build the hierarchy up from individual triangles and not down from the whole scene. Building up means you do not need to determine if some subdivided volume contains anything since by definition it contains what is below it in a hierarchy of volumetric subdivisions.

Figure 2E:
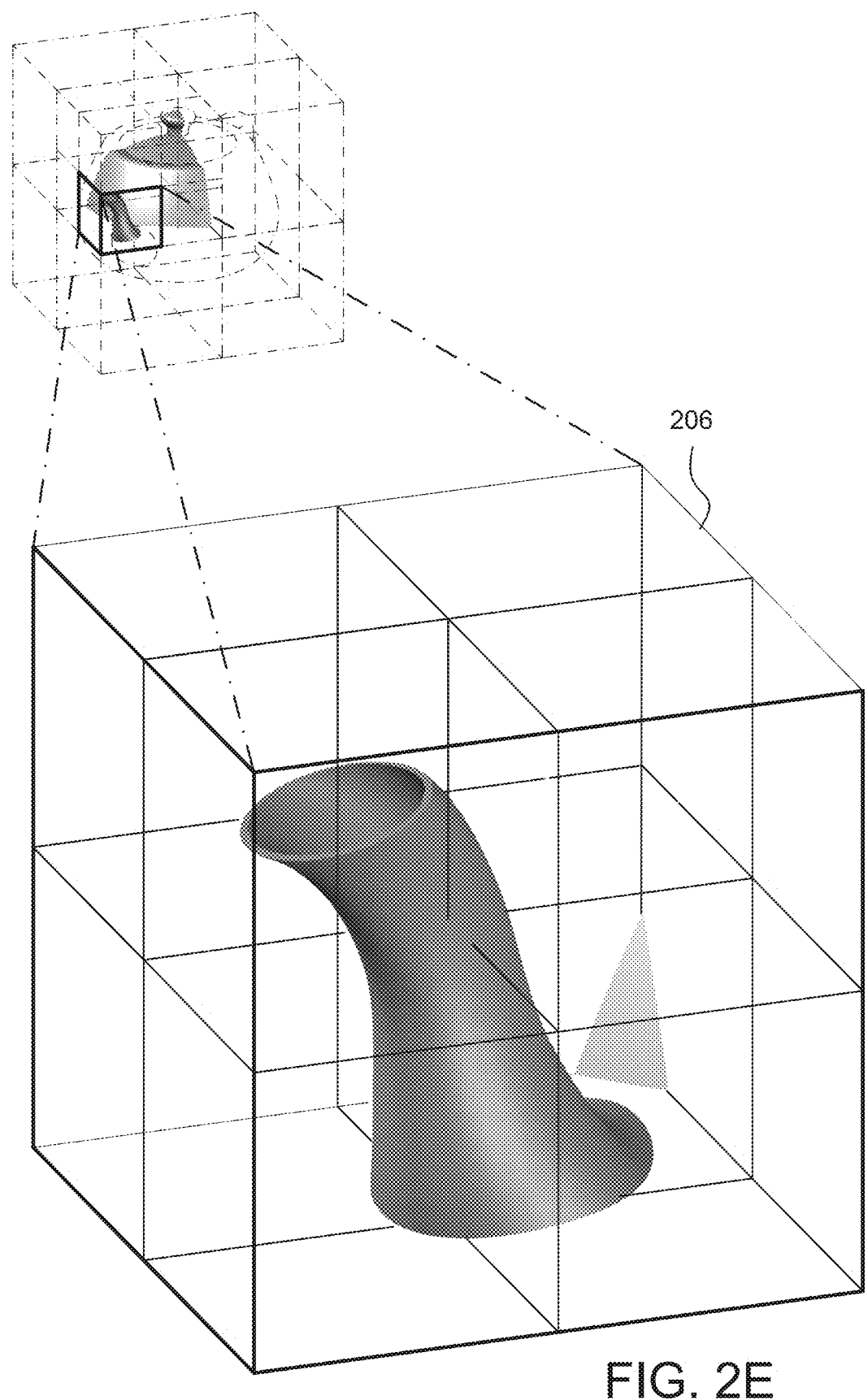
Figure 2F:
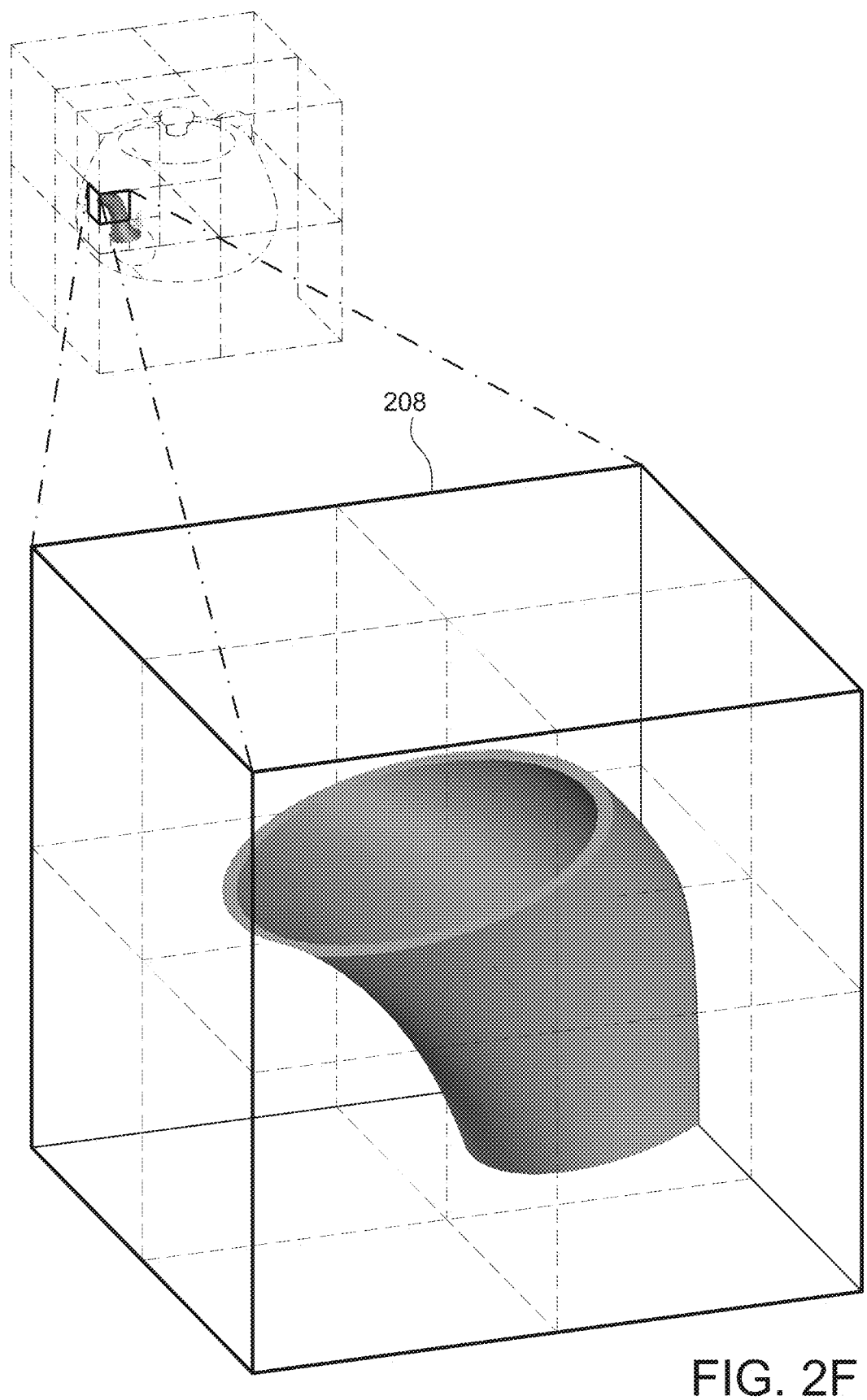

FIG. 2E shows a further such subdivision of bounding volume 204 into a further smaller contained bounding volume 206 containing in this example just the spout of the teapot plus another surface on the wall of the teapot, and FIG. 2F shows an additional subdivision of bounding volume 206 into still smaller contained subdivision 208 encapsulating the end of the teapot's spout. Depending on the way the BVH is constructed, bounding volume 208 can be further and further subdivided as desired—and traversal coprocessor 138 enables the FIG. 1 system 100 to efficiently traverse the BVH down to any arbitrary subdivision level. The number and configurations of recursive subdivisions will depend on the complexity and configuration of the 3D object being modeled as well as other factors such as desired resolution, distance of the object from the viewpoint, etc.

Figure 2G:
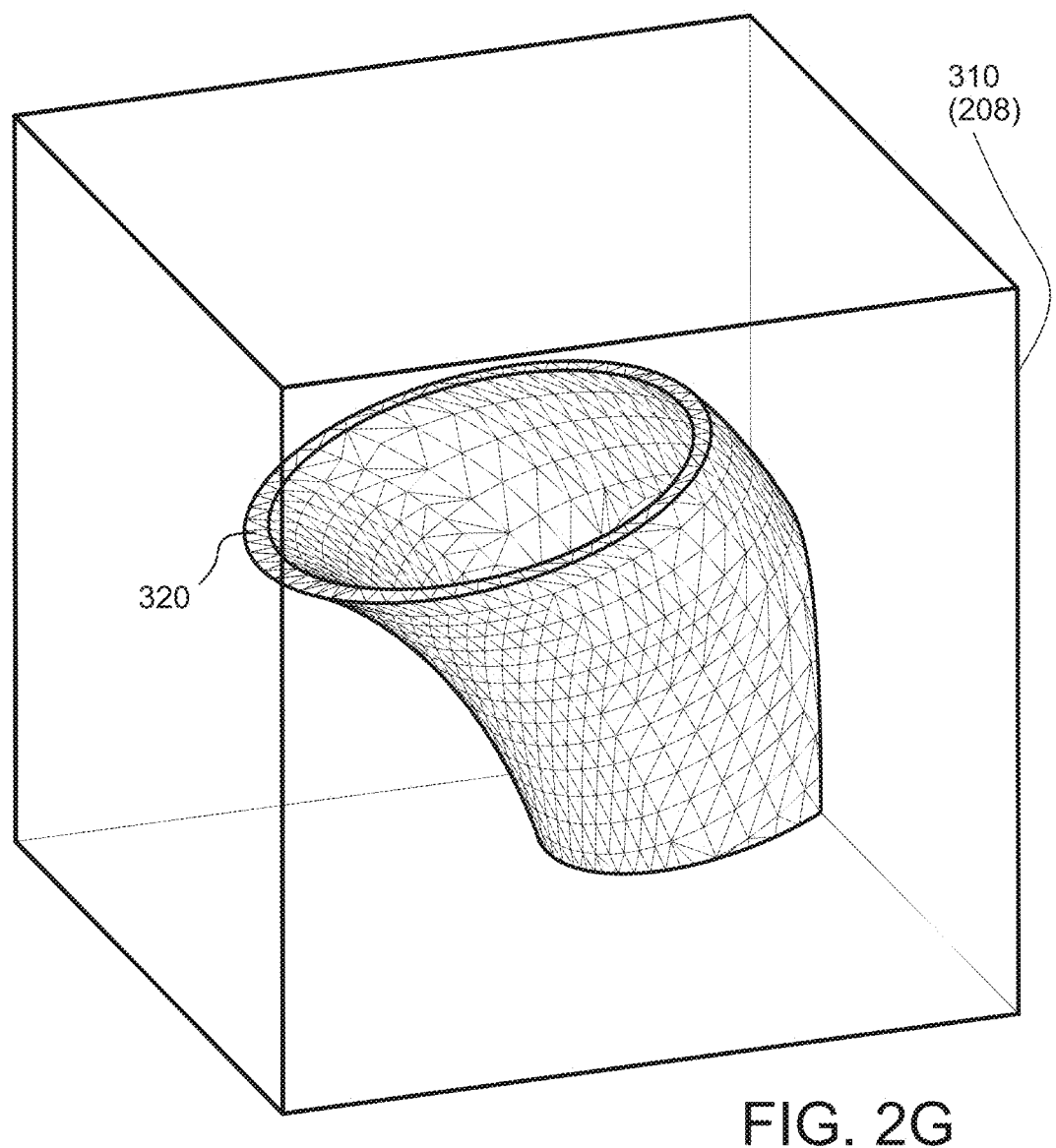
FIG. 2G shows an example portion of the object comprised of primitive surfaces, in this case triangles.

At some level of subdivision (which can be different levels for different parts of the BVH), the traversal coprocessor 138 encounters geometry making up the encapsulated object being modeled. Using the analogy of a tree, the successive volumetric subdivisions are the trunk, branches, boughs and twigs, and the geometric is finally revealed at the very tips of the tree, namely the leaves. In this case, FIG. 2G shows the surface of the teapot's spout defined by an example mesh of geometric primitives. The geometric primitives shown are triangles but other geometric primitives, such as quads, lines, rectangles, quadrics, patches, or other geometric primitives known to those familiar with the state of the art, may be used (in one embodiment, such other types of primitives may be expressed as or converted into triangles). The geometric primitives in the mesh represent the shape of the 3D surface of the object being modeled. The example shown here is a mesh, but bounded geometry can include discontinuous geometry such as particles that may not be connected. In the example non-limiting embodiments, the traversal coprocessor 138 also accelerates ray intersection tests with this geometry to quickly determine which triangles are hit by any given ray. Determining ray-primitive intersections involves comparing the spatial xyz coordinates of the vertices of each primitive with the xzy coordinates of the ray to determine whether the ray and the surface the primitive defines occupy the same space. The ray-primitive intersection test can be computationally intensive because there may be many triangles to test. For example, in the mesh shown in FIG. 2G, the spout of the teapot alone is made up of over a hundred triangles—although it may be more efficient in some implementations to further volumetrically subdivide and thereby limit the number of triangles in any such "leaf node" to something like 16 or fewer.

As discussed above, ray tracing procedures determine what geometric primitives of a scene are intersected by a ray. However, due to the large number of primitives in a 3D scene, it may not be efficient or feasible to test every geometric primitive for an intersection. Acceleration data structures, such as BVH, allow for quick determination as to which bounding volumes can be ignored, which bounding volumes may contain intersected geometric primitives, and which intersected geometric primitives matter for visualization and which do not.

Ray Intersection Testing

Figure 3A:
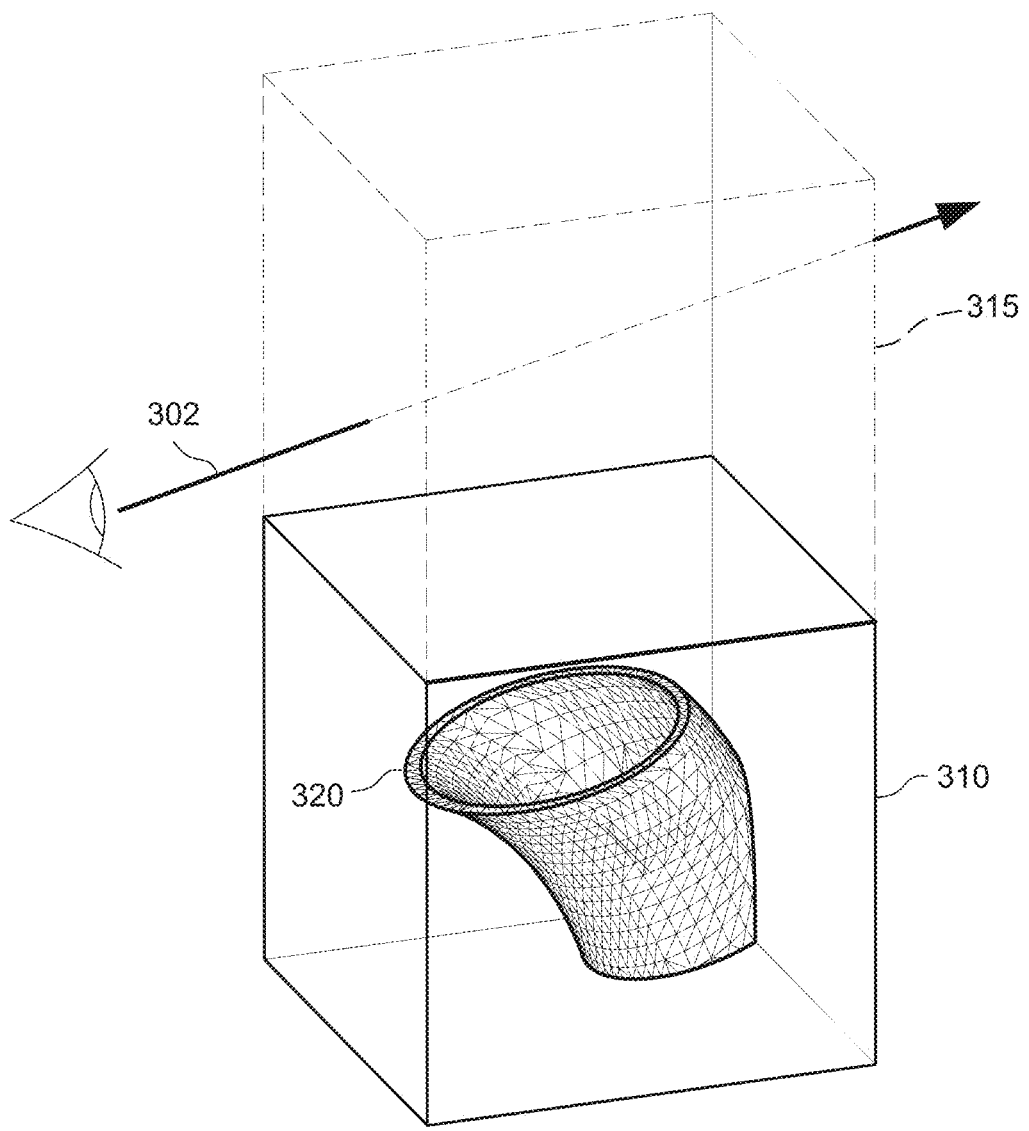
FIGS. 3A-3C show example simplified ray tracing tests to determine whether the ray passes through a bounding volume containing geometry and whether the ray intersects geometry.
Figure 3B:
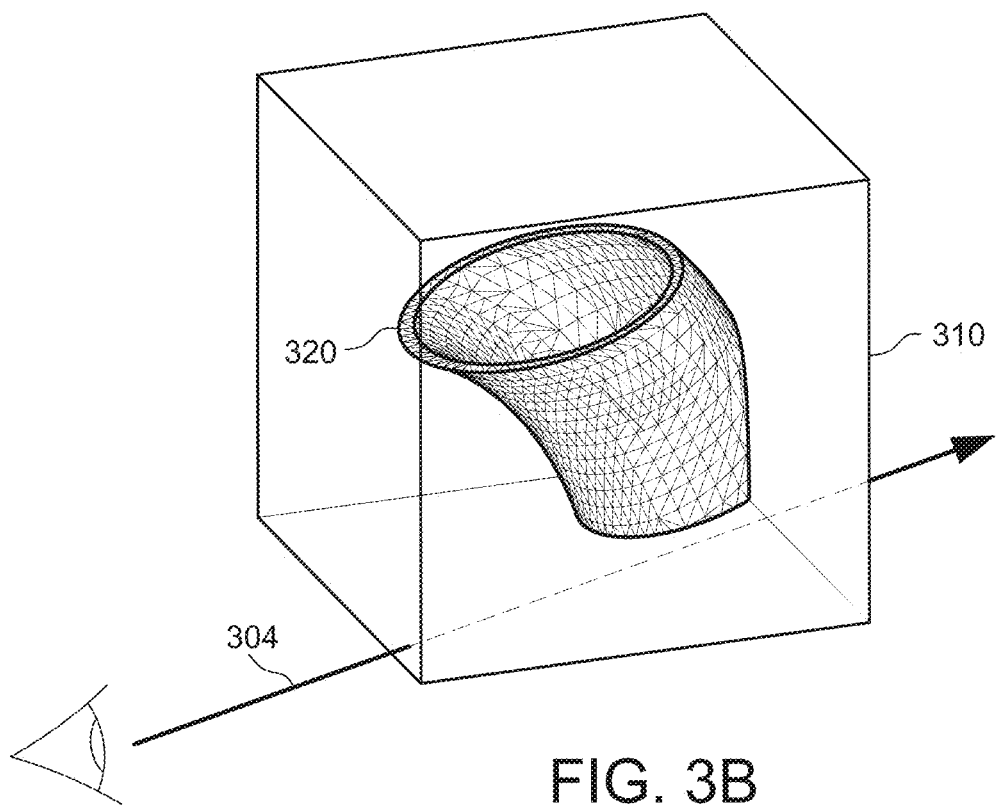
Figure 3C:
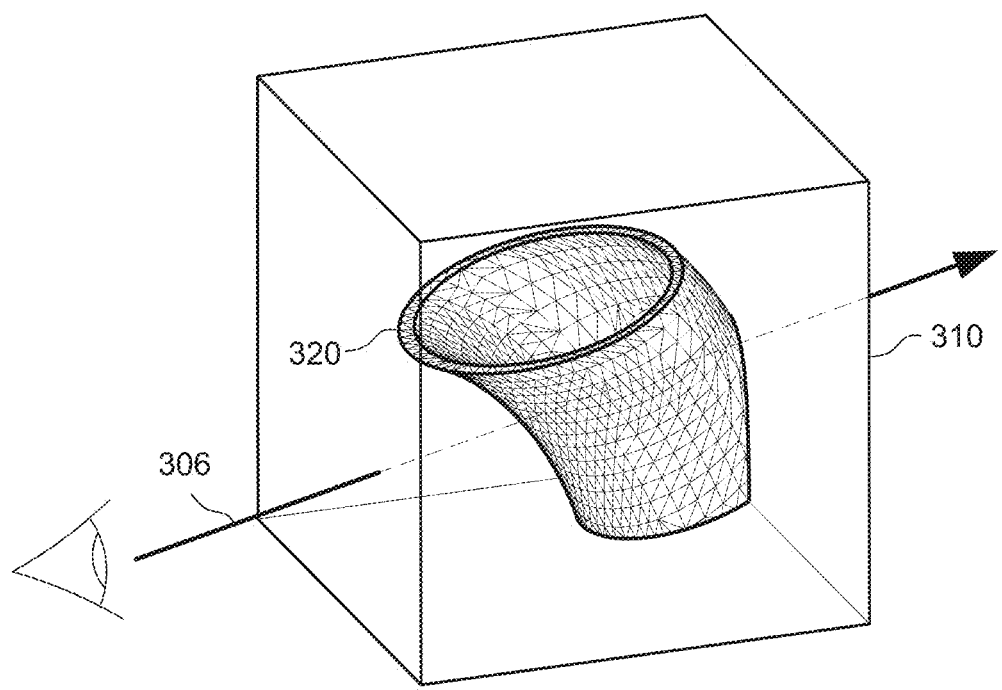

FIGS. 3A-3C illustrate ray tracing applied to the FIG. 2G bounding volume 208 including triangle mesh 320. FIG. 3A shows a ray 302 in a virtual space including bounding volumes 310 and 315. To determine whether the ray 302 intersects one or more triangles in the mesh 320, each triangle could be directly tested against the ray 302. But to accelerate the process (since the object could contain many thousands of triangles), the ray 302 is first tested against the bounding volumes 310 and 315. If the ray 302 does not intersect a bounding volume, then it does not intersect any triangles inside of the bounding volume and all triangles inside the bounding volume can be ignored for purposes of that ray. Because in FIG. 3A the ray 302 misses bounding volume 310, the triangles of mesh 320 within that bounding volume need not be tested for intersection. While bounding volume 315 is intersected by the ray 302, bounding volume 315 does not contain any geometry and so no further testing is required.

On the other hand, if a ray such as ray 304 shown in FIG. 3B intersects a bounding volume 310 that contains geometry, then the ray may or may not intersect the geometry inside of the bounding volume so further tests need to be performed on the geometry itself to find possible intersections. Because the rays 304, 306 in FIGS. 3B and 3C intersect a bounding volume 310 that contains geometry, further tests need to be performed to determine whether any (and which) of the primitives inside of the bounding volume are intersected. In FIG. 3B, further testing of the intersections with the primitives would indicate that even though the ray 304 passes through the bounding volume 310, it does not intersect any of the primitives the bounding volume encloses (alternatively, as mentioned above, bounding volume 310 could be further volumetrically subdivided so that a bounding volume intersection test could be used to reveal that the ray does not intersect any geometry or more specifically which primitives the ray may intersect).

FIG. 3C shows a situation in which the bounding volume 310 intersected by ray 306 and contains geometry that ray 306 intersects. Traversal coprocessor 138 tests the intersections between the ray 306 and the individual primitives to determine which primitives the ray intersects.

Ray Tracing Operations

Figure 4:
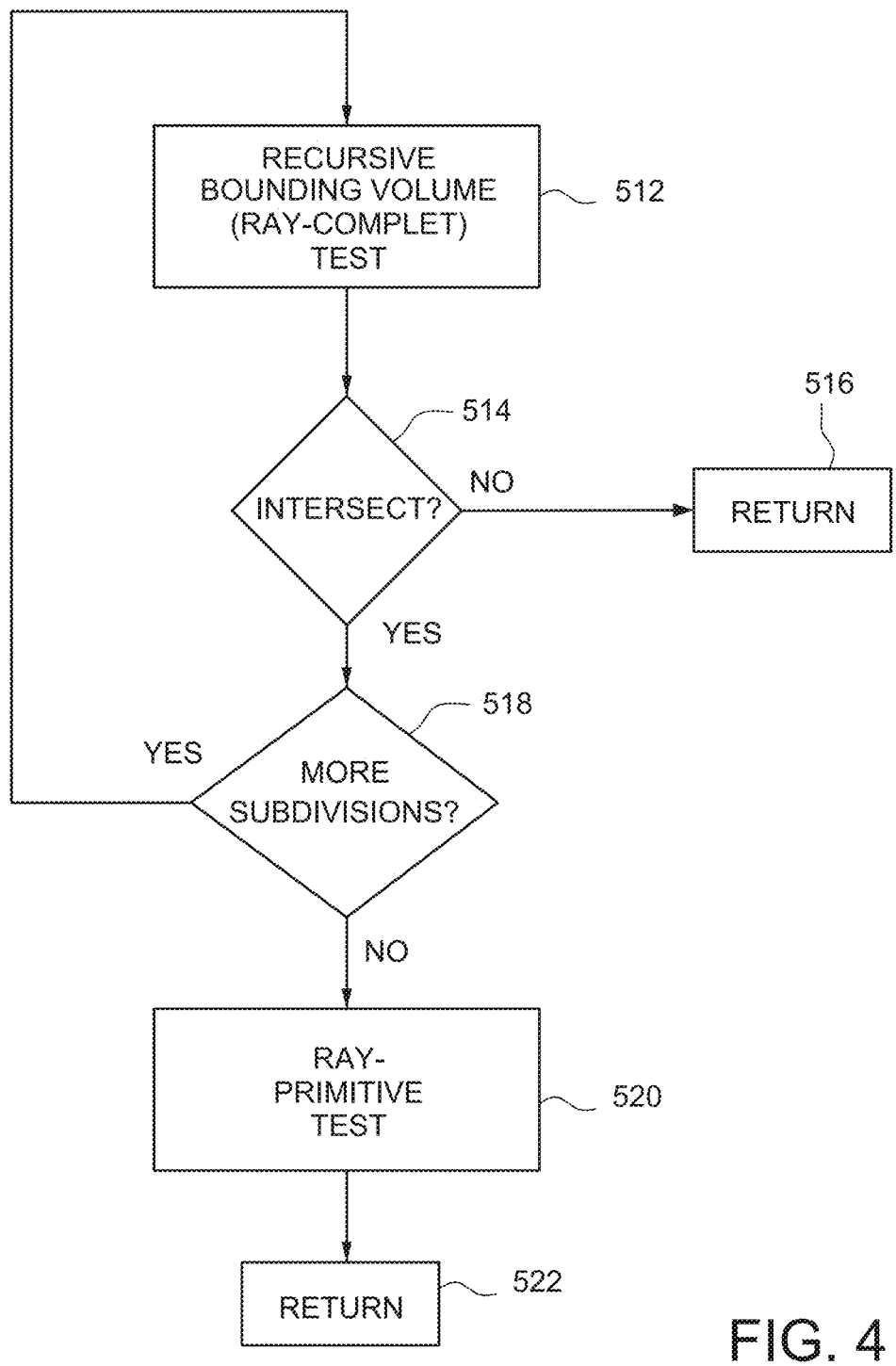
FIG. 4 illustrates an example ray tracing flowchart.

FIG. 4 is a flowchart summarizing example ray tracing operations the traversal coprocessor 138 performs as described above in cooperation with SM(s) 132. The FIG. 4 operations are performed by traversal coprocessor 138 in cooperation with its interaction with an SM 132. The traversal coprocessor 138 may thus receive the identification of a ray from the SM 132 and traversal state enumerating one or more nodes in one or more BVH's that the ray must traverse. The traversal coprocessor 138 determines which bounding volumes of a BVH data structure the ray intersects (the "ray-complet" test 512) and subsequently whether the ray intersects one or more primitives in the intersected bounding volumes and which triangles are intersected (the "ray-primitive test" 520). In example non-limiting embodiments, "complets" (compressed treelets) specify root or interior nodes (i.e., volumes) of the bounding volume hierarchy with children that are other complets or leaf nodes of a single type per complet.

First, the traversal coprocessor 138 inspects the traversal state of the ray. If a stack the traversal coprocessor 138 maintains for the ray is empty, then traversal is complete. If there is an entry on the top of the stack, the traversal co-processor 138 issues a request to the memory subsystem to retrieve that node. The traversal co-processor 138 then performs a bounding box test 512 to determine if a bounding volume of a BVH data structure is intersected by a particular ray the SM 132 specifies (step 512, 514). If the bounding box test determines that the bounding volume is not intersected by the ray ("No" in step 514), then there is no need to perform any further testing for visualization and the traversal coprocessor 138 can return this result to the requesting SM 132. This is because if a ray misses a bounding volume (as in FIG. 3A with respect to bounding volume 310), then the ray will miss all other smaller bounding volumes inside the bounding volume being tested and any primitives that bounding volume contains.

If the bounding box test performed by the traversal coprocessor 138 reveals that the bounding volume is intersected by the ray ("Yes" in Step 514), then the traversal coprocessor determines if the bounding volume can be subdivided into smaller bounding volumes (step 518). In one example embodiment, the traversal coprocessor 138 isn't necessarily performing any subdivision itself. Rather, each node in the BVH has one or more children (where each child is a leaf or a branch in the BVH). For each child, there is a bounding volume and a pointer that leads to a branch or a leaf node. When a ray processes a node using traversal coprocessor 138, it is testing itself against the bounding volumes of the node's children. The ray only pushes stack entries onto its stack for those branches or leaves whose representative bounding volumes were hit. When a ray fetches a node in the example embodiment, it doesn't test against the bounding volume of the node—it tests against the bounding volumes of the node's children. The traversal coprocessor 138 pushes nodes whose bounding volumes are hit by a ray onto the ray's traversal stack in an order determined by ray configuration. For example, it is possible to push nodes onto the traversal stack in the order the nodes appear in memory, or in the order that they appear along the length of the ray, or in some other order. If there are further subdivisions of the bounding volume ("Yes" in step 518), then those further subdivisions of the bounding volume are accessed and the bounding box test is performed for each of the resulting subdivided bounding volumes to determine which subdivided bounding volumes are intersected by the ray and which are not. In this recursive process, some of the bounding volumes may be eliminated by test 514 while other bounding volumes may result in still further and further subdivisions being tested for intersection by traversal coprocessor 138 recursively applying steps 512-518.

Once the traversal coprocessor 138 determines that the bounding volumes intersected by the ray are leaf nodes ("No" in step 518), the traversal coprocessor performs a primitive (e.g., triangle) intersection test 520 to determine whether the ray intersects primitives in the intersected bounding volumes and which primitives the ray intersects. The traversal coprocessor 138 thus performs a depth-first traversal of intersected descendent branch nodes until leaf nodes are reached. The traversal coprocessor 138 processes the leaf nodes. If the leaf nodes are primitive ranges, the traversal coprocessor 138 tests them against the ray. If the leaf nodes are instance nodes, the traversal coprocessor 138 applies the instance transform. If the leaf nodes are item ranges, the traversal coprocessor 138 returns them to the requesting SM 132. In the example non-limiting embodiments, the SM 132 can command the traversal coprocessor 138 to perform different kinds of ray-primitive intersection tests and report different results depending on the SMs needs. For example, the SM 132 can command the traversal coprocessor 138 to report the nearest visible primitive revealed by the intersection test, or to report all primitives the ray intersects irrespective of whether they are the nearest visible primitive. The SM 132 can use these different results for different kinds of visualization. Once the traversal coprocessor 138 is done processing the leaf nodes, there may be other branch nodes (pushed earlier onto the ray's stack) to test.

Multiple Intersections

In more detail, as shown in FIG. 3C, any given ray may intersect multiple primitives within a bounding volume. Whether the ray intersection within a given primitive matters for visualization depends on the properties and position of that primitive as well as the visualization procedures the SM 132 is performing. For example, primitives can be opaque, transparent or partially transparent (i.e., translucent). Opaque primitives will block a ray from passing through the primitive because the eye cannot see through the primitive's opaque surface. Transparent primitives will allow the ray to pass through (because the eye can see through the transparent primitive) but the situation may be more complex. For example, transparent primitives may have specular properties that cause some portion of the ray to reflect (think of reflection from a window pane) and the rest of the ray to pass through. Other transparent primitives are used to provide a surface onto which a texture is mapped. For example, each individual leaf of a tree may be modeled by a transparent primitive onto which an image of the leaf is texture mapped.

Figure 5A:
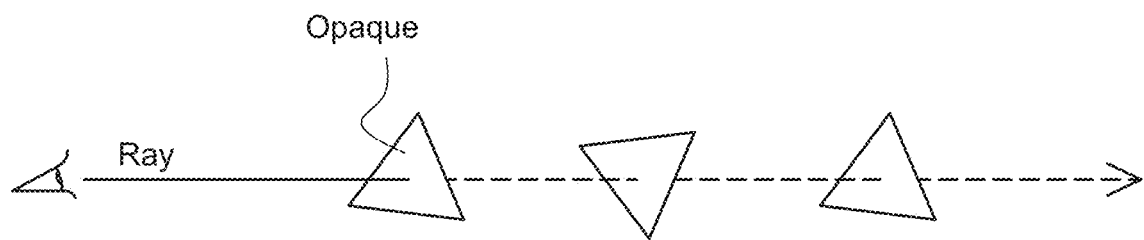
FIGS. 5A-5C show example different ray-primitive intersection scenarios.
Figure 5B:
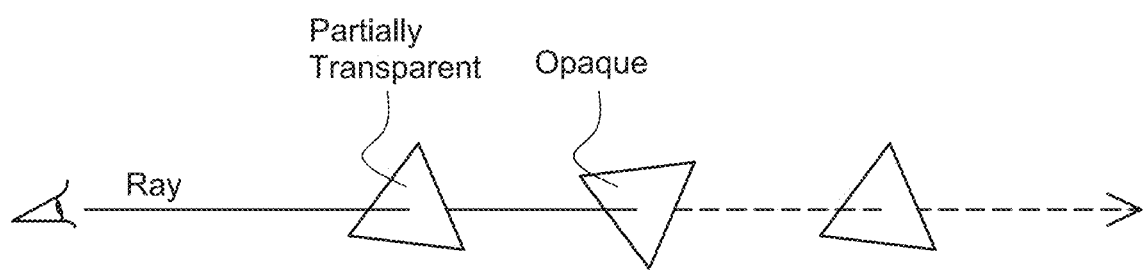
Figure 5C:
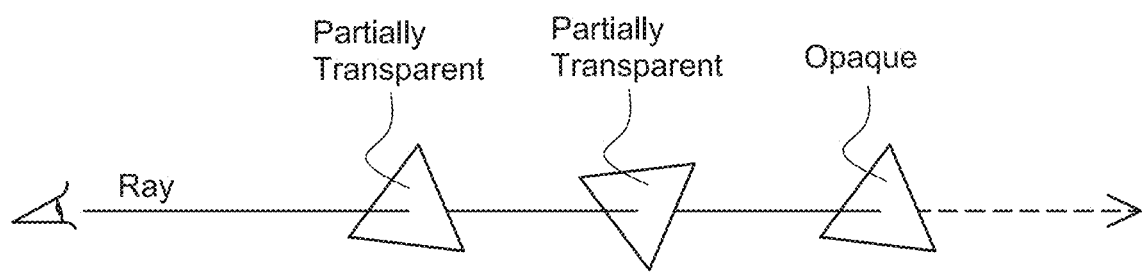

FIGS. 5A-5C illustrate some of these scenarios using an example of three triangles assumed to be in the same bounding volume and each intersected by a ray. FIG. 5A illustrates a ray directed towards these three triangles, with the first triangle the ray encounters relative to the viewpoint being opaque. Because the "front" (from the standpoint of the direction of the ray from the eye) intersected triangle is opaque, that triangle will block the ray so the ray will not reach the other triangles even through it spatially intersects them. In this example, the triangles "behind" the opaque triangle from the viewpoint can be ignored (culled) after the intersection of the opaque triangle is identified because the "front", opaque triangle hides the other triangles from the user's view along the ray. Culling is indicated by dotted lines in FIGS. 5A-5C. In this case, the traversal coprocessor 138 may only need to report the identification of the first, opaque triangle to the SM 132.

FIG. 5B illustrates a ray directed towards the same three triangles but now the nearest visible triangle is partially transparent rather than opaque. Because the nearest visible intersected triangle is at least partially transparent, the ray may pass through it to hit the opaque triangle behind it. In this case, the opaque triangle will be visible through the partially transparent triangle but will block the user's view of the third triangle along the ray. Here, the traversal coprocessor 138 may report the identification of both front triangles to the SM 132 but not report the third, culled triangle even though the ray spatially intersects that third triangle. Order of discovery may matter here. In the case of an alpha and opaque triangle, if the opaque was found first, the traversal coprocessor 138 returns the opaque triangle to the SM 132 with traversal state that will resume testing at the alpha triangle. While there is an implication here that the alpha means transparent, it really means "return me to the SM 132 and let the SM determine how to handle it." For example, an alpha triangle might be trimmed according to a texture or function so that portions of the triangle are cut away (i.e., absent, not transparent). The traversal coprocessor 138 does not know how the SM 132 will handle the alpha triangles (i.e., it does not handle transparent triangles differently from trimmed triangles). Thus, alpha triangles may or may not block or tint the light arriving from points beyond them along the ray, and in example embodiments, they require SM 132 intervention to handle/determine those things.

FIG. 5C illustrates a scenario in which the first two triangles the ray encounters are partially transparent. Because the first and second intersected triangles are at least partially transparent, the ray will pass through the first and second triangles to impinge upon the also-intersecting third opaque triangle. Because third intersected triangle is opaque, it will block the ray, and the ray will not impinge upon any other triangles behind the third triangle even though they may be spatially intersected by it. In this case, the traversal coprocessor 138 may report all three triangles to the SM 132 but need not report any further triangles behind the opaque triangle because the opaque triangle blocks the ray from reaching those additional triangles.

In some modes, however, the SM 132 may need to know the identities of all triangles the ray intersects irrespective of whether they are opaque or transparent. In those modes, the traversal coprocessor 138 can simply perform the intersection test and return the identities of all triangles the ray spatially intersects (in such modes, the traversal coprocessor will return the same intersection results for all three scenarios shown in FIGS. 5A-5C) and allow the SM 132 to sort it out—or in some cases command the traversal coprocessor 138 to do more tests on these same triangles.

As will be discussed in more detail below, when a ray intersects an opaque triangle, the traversal coprocessor 138 can in certain operations be programmed to reduce the length of the ray being tested to the location of the opaque triangle intersection so it will not report any triangles "behind" the intersected triangle. When a partially transparent triangle is determined to be intersected by a ray, the traversal coprocessor 138 will return a more complete list of triangles the ray impinges upon for purposes of visualization, and the requesting SM 132 may perform further processing to determine whether, based for example any texture or other properties of the triangle, the ray will be blocked, passed or partially passed and partially reflected. In example embodiments, the traversal coprocessor 138 does not have access to texture properties of triangles and so does not attempt to determine visualization with respect to those properties.

Textures or Other Surface Modifications

Figure 6A:
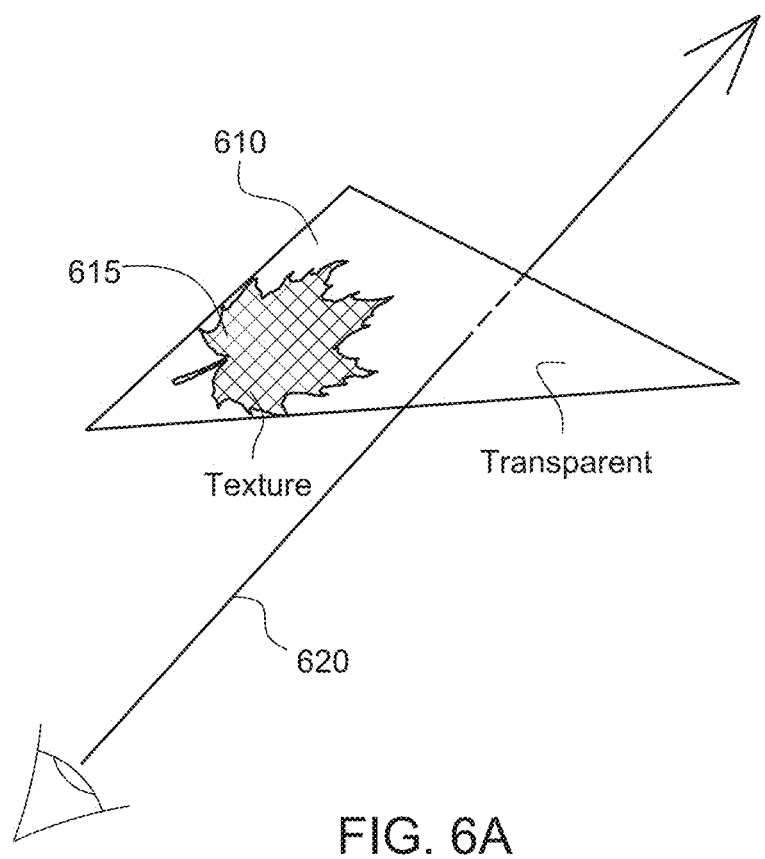
FIGS. 6A and 6B show an example of how texture mapping can impact ray-primitive intersection results.
Figure 6B:
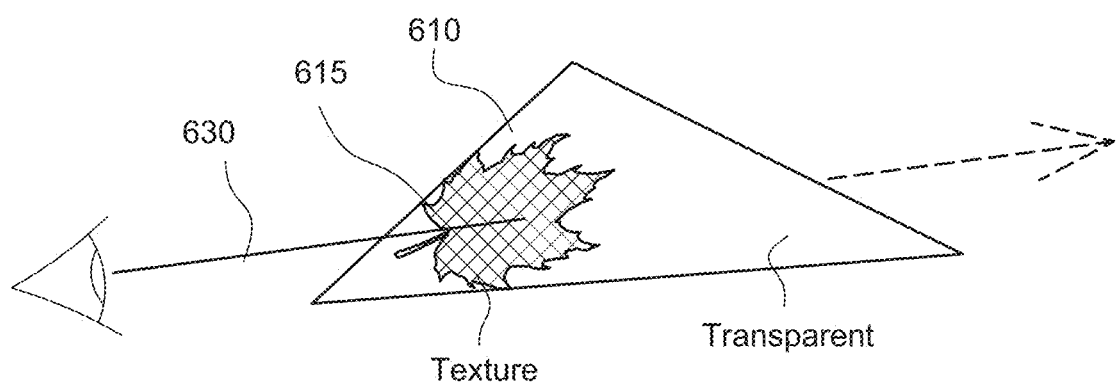

For example, FIGS. 6A and 6B show a transparent triangle 610 with a texture 615 of a leaf applied to the triangle. One could think of a triangle made of Plexiglas with a decal of a leaf applied to it. As shown in FIG. 6A, the ray 620 intersects the transparent triangle 610 at a point that is outside the applied texture 615. Because the ray 620 intersects the triangle outside the applied texture 615, the texture will not block the ray 620 and the ray will pass through the transparent triangle 610 without obstruction. This is like being able to see through the parts of the Plexiglas triangle that are not covered by the leaf decal. Note that in one example embodiment, the SM 132 makes the visibility determination since the traversal coprocessor 138 does not necessarily have access to information concerning the leaf decal. The traversal coprocessor 138 helps the SM 132 by returning to the SM the identification of the triangle that the ray intersects along with information concerning the properties of that triangle.

In FIG. 6B, the ray 630 intersects the transparent triangle where the texture 615 is applied. SM 132 will determine whether subsequent traversal by the traversal coprocessor 138 is necessary or not based on whether the texture 615 will block the ray 630 or allow the ray 630 to pass through. If the ray 630 is blocked by the texture 615, other triangles behind the transparent triangle 610, which may have otherwise been intersected by the ray 630, will be obstructed by the texture and not contribute to visualization along the ray. In the example non-limiting embodiments herein, the traversal coprocessor 138 does not have access to texture information and so it does not attempt to accelerate this determination. Traversal coprocessor 138 may for example return to the requesting SM 132 all intersections between the ray and the various triangles within the object, and the SM may then use the graphics primitive engine 134 to make further ray tracing visualization determinations. In other example embodiments, traversal coprocessor 138 could accelerate some or all of these tests by interacting with the texture mapping unit and other portions of the 3D graphics pipeline within graphics primitive engine 134 to make the necessary visualization determinations.

Coordinate Transforms

FIGS. 2A-3C involve only a single object, namely a teapot. Just as the room you are in right now contains multiple objects, most 3D scenes contain many objects. For example, a 3D scene containing a teapot will likely also contain a cup, a saucer, a milk pitcher, a spoon, a sugar bowl, etc. all sitting on a table. In 3D graphics, each of these objects is typically modeled independently. The graphics system 100 then uses commands from the processor 120 to put all the models together in desired positions, orientations and sizes into the common scene for purposes of visualization (just as you will set and arrange the table for serving tea). What this means is that the SM 132 may command traversal processor 138 to analyze the same ray with respect to multiple objects in the scene. However, the fact that each of these objects will be transformed in position, orientation and size when placed into the common scene is taken into account and accelerated by the traversal coprocessor 138. In non-limiting example embodiments, the transform from world-to-object space is stored in the world space BVH along with a world-space bounding box. The traversal coprocessor 138 accelerates the transform process by transforming the ray from world (scene) space into object space for purposes of performing the tests shown in FIG. 4. In particular, since the transformation of the geometry from object space into world (scene) space is computationally intensive, that transformation is left to the graphics pipeline graphics primitive engine 134 and/or raster engine 136 to perform as part of rasterization. The traversal coprocessor 138 instead transforms a given ray from world space to the coordinate system of each object defined by an acceleration data structure and performs its tests in object space.

Figure 7A:
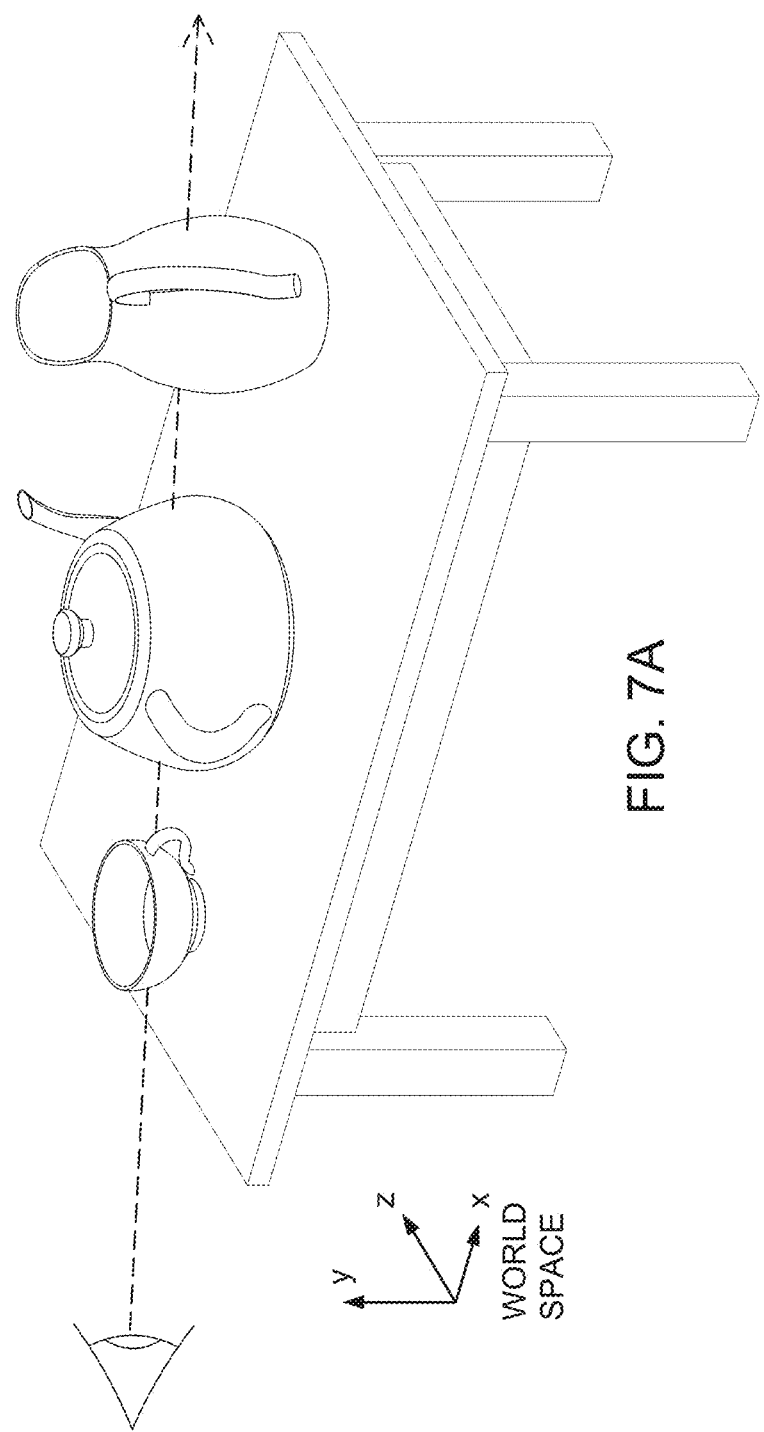
FIGS. 7A and 7B illustrate ray instance transforms.
Figure 7B:
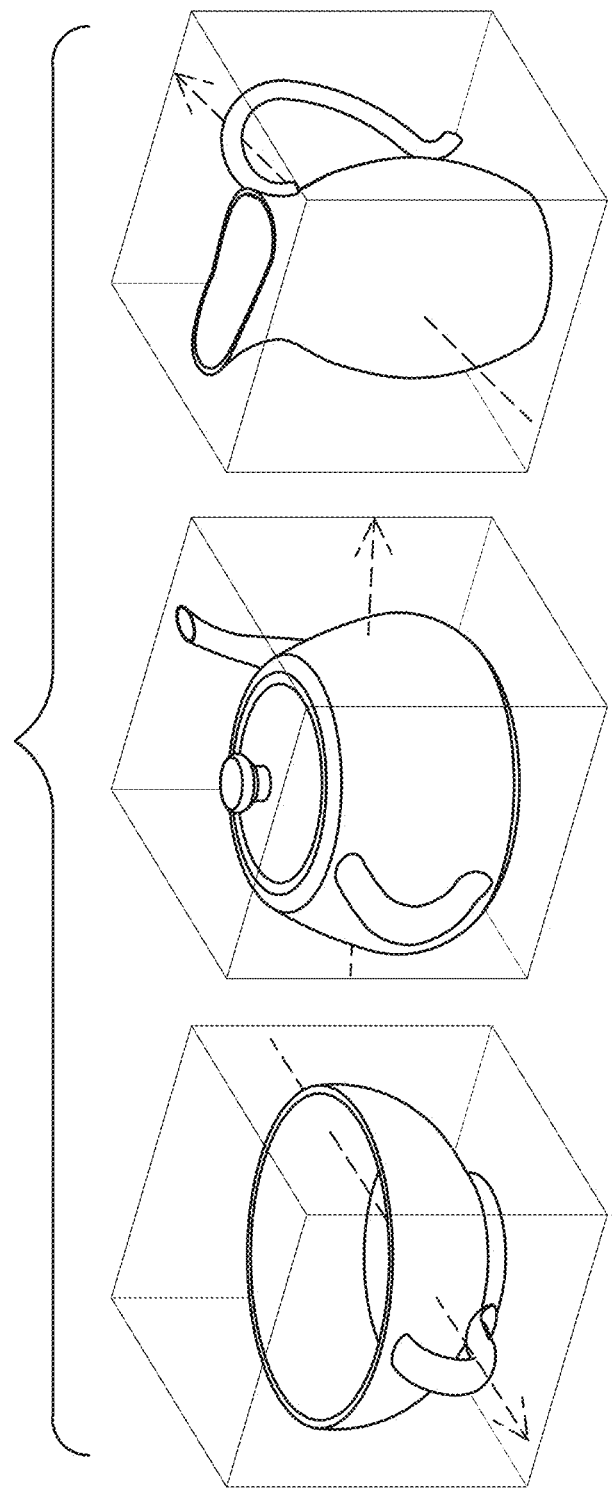

FIGS. 7A and 7B illustrates how the traversal coprocessor 138 transforms same ray into three different object spaces. FIG. 7A shows three objects on a table: a cup, a teapot and a pitcher. These three objects and a table comprise a scene, which exists in world space. A ray that also is defined in world space emanates from the viewpoint and intersects each of the three objects.

FIG. 7B shows each of the three objects as defined in object spaces. Each of these three objects is defined by a respective model that exists in a respective object space. The traversal coprocessor 138 in example non-limiting embodiments transforms the ray into the object space of each object before performing the intersection tests for that object. This "instance transform" saves the computational effort of transforming the geometry of each object and the associated volumetric subdivisions of the acceleration data structure from object space to world space for purposes of the traversal coprocessor 138 performing intersection tests.

Figure 8A:
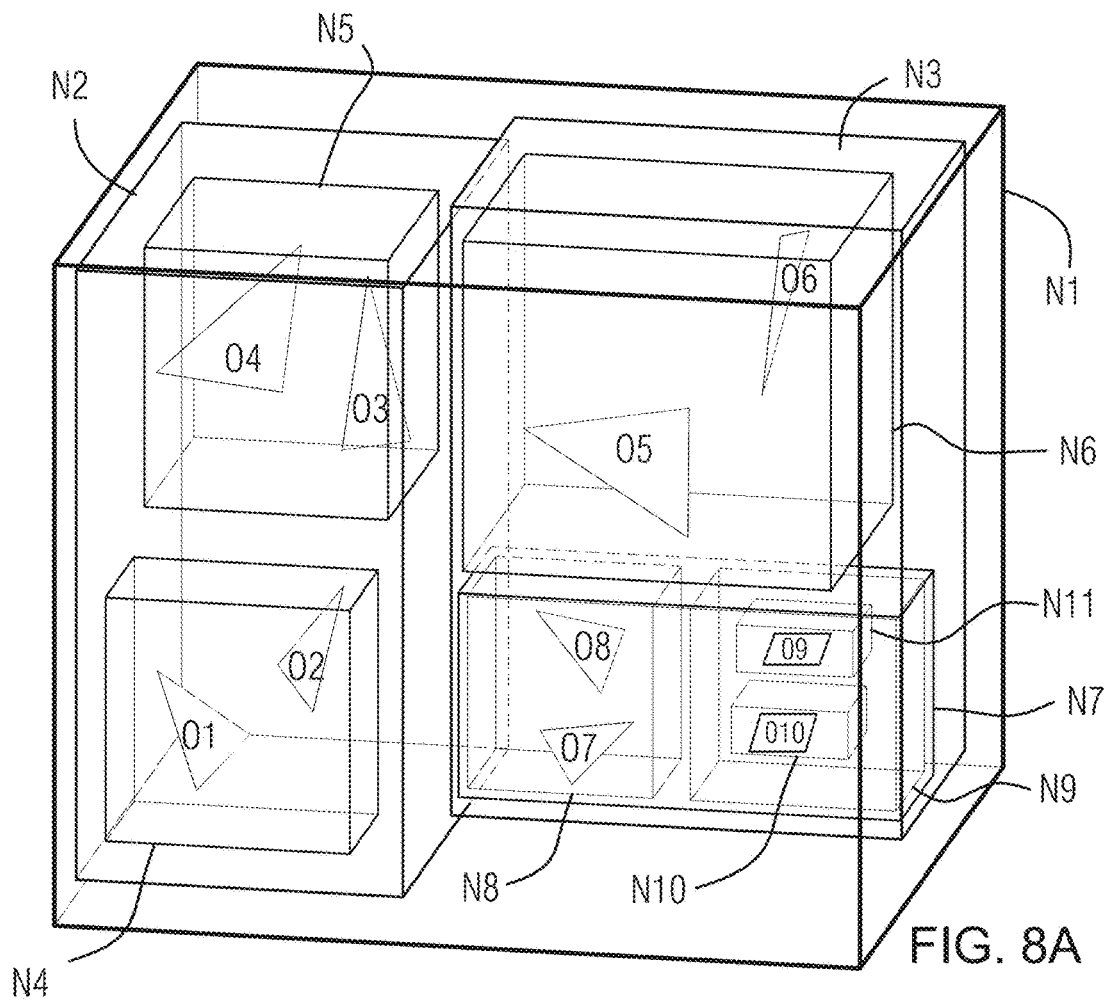
FIG. 8A illustrates an example non-limiting bounding volume hierarchy (BVH).
Figure 8B:
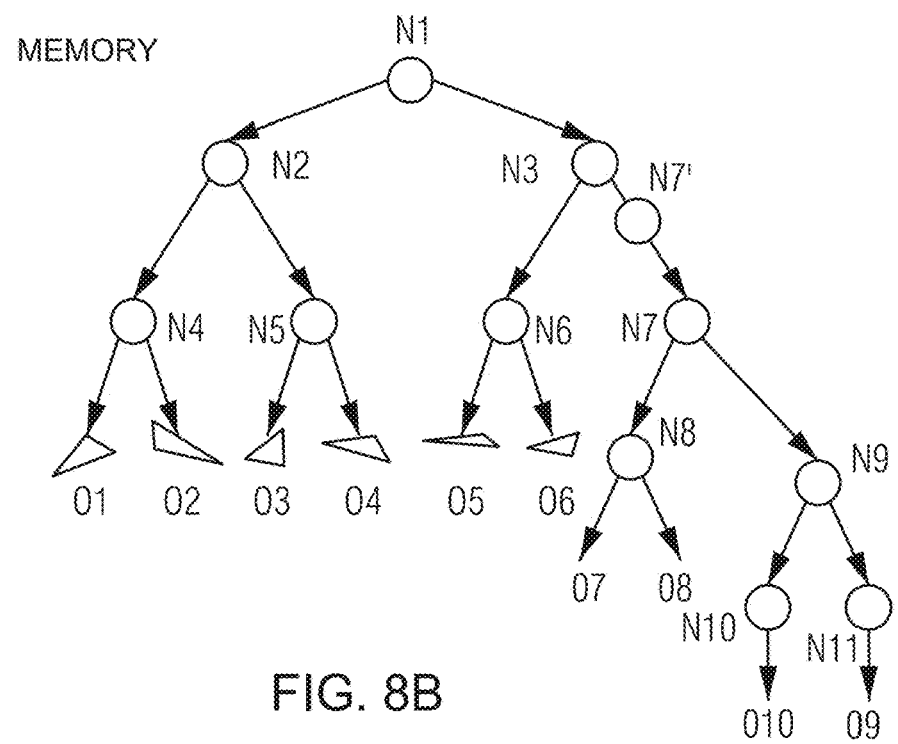
FIG. 8B shows an example acceleration data structure in the form of a graph or tree.

The requesting SM 132 keeps track of which objects are in front of which other objects with respect to each individual ray and resolves visibility in cases where one object hides another object, casts a shadow on another object, and/or reflects light toward another object. The requesting SM 132 can use the traversal processor 138 to accelerate each of these tests.
Example Tree BVH Acceleration Data Structure FIGS. 8A and 8B show a recursively-subdivided bounding volume of a 3D scene (FIG. 8A) and a corresponding tree data structure (FIG. 8B) that may be accessed by the traversal coprocessor 138 and used for hardware-accelerated operations performed by traversal coprocessor. The division of the bounding volumes may be represented in a hierarchical tree data structure with the large bounding volume shown in FIG. 2B represented by a parent node of the tree and the smaller bounding volumes represented by children nodes of the tree that are contained by the parent node. The smallest bounding volumes are represented as leaf nodes in the tree and identify one or more geometric primitives contained within these smallest bounding volumes.

The tree data structure may be stored in memory outside of the traversal coprocessor 138 and retrieved based on queries the SMs 132 issue to the traversal coprocessor 138. The tree data structure includes a plurality of nodes arranged in a hierarchy. The root nodes N1 of the tree structure correspond to bounding volume N1 enclosing all of the triangles O1-O8. The root node N1 may identify the vertices of the bounding volume N1 and children nodes of the root node.

In FIG. 8A, bounding volume N1 is subdivided into bounding volumes N2 and N3. Children nodes N2 and N3 of the tree structure of FIG. 8B correspond to and represent the bounding volumes N2 and N3 shown in FIG. 8A. The children nodes N2 and N3 in the tree data structure identify the vertices of respective bounding volumes N2 and N3 in space. Each of the bounding volumes N2 and N3 is further subdivided in this particular example. Bounding volume N2 is subdivided into contained bounding volumes N4 and N5. Bounding volume N3 is subdivided into contained bounding volumes N6 and N7. Bounding volume N7 include two bounding volumes N8 and N9. Bounding volume N8 includes the triangles O7 and O8, and bounding volume N9 includes leaf bounding volumes N10 and N11 as its child bounding volumes. Leaf bounding volume N10 includes a primitive range (e.g., triangle range) O10 and leaf bounding volume N11 includes an item range O9. Respective children nodes N4, N5, N6, N8, N10 and N11 of the FIG. 8B tree structure correspond to and represent the FIG. 8A bounding volumes N4, N5, N6, N8, N10 and N11 in space.

The FIG. 8B tree is only three to six levels deep so that volumes N4, N5, N6, N8, N10 and N11 constitute "leaf nodes"—that is, nodes in the tree that have no child nodes. FIG. 8A shows that each of leaf node bounding volumes N4, N5, N6, and N8, contains two triangles of the geometry in the scene. For example, volumetric subdivision N4 contains triangles O1 & O2; volumetric subdivision N5 contains triangles O3 & O4; volumetric subdivision N6 contains trials O5 & O6; and volumetric subdivision N8 contains triangles O7 & O8. The tree structure shown in FIG. 8B represents these leaf nodes N4, N5, N6, and N7 by associating them with the appropriate ones of triangles O1-O8 of the scene geometry. To access this scene geometry, the traversal coprocessor 138 traverses the tree data structure of FIG. 8B down to the leaf nodes. In general, different parts of the tree can and will have different depths and contain different numbers of triangles. Leaf nodes associated with volumetric subdivisions that contain no geometry need not be explicitly represented in the tree data structure (i.e., the tree is "trimmed").

According to some embodiments, the subtree rooted at N7 may represent a set of bounding volumes or BVH that is defined in a different coordinate space than the bounding volumes corresponding to nodes N1-N3. When bounding volume N7 is in a different coordinate space from its parent bounding volume N3, an instance node N7' which provides the ray transformation necessary to traverse the subtree rooted at N7, may connect the rest of the tree to the subtree rooted at N7. Instance node N7' connects the bounding volume or BVH corresponding to nodes N1-N3, with the bounding volumes or BVH corresponding to nodes N7 etc. by defining the transformation from the coordinate space of N1-N3 (e.g., world space) to the coordinate space of N7 etc. (e.g., object space).
The Internal Structure and Operation of Traversal Coprocessor 138

FIG. 9 shows an example simplified block diagram of traversal coprocessor 138 including hardware configured to perform accelerated traversal operations as described above (a still more detailed implementation of this traversal coprocessor 138 is described below). Because the traversal coprocessor 138 shown in FIG. 9 is adapted to traverse tree-based acceleration data structures such as shown in FIGS. 8A, 8B, it may also be called a "tree traversal unit" or "TTU" 700

(the 700 reference number is used to refer to the more detailed non-limiting implementation of traversal coprocessor 138 shown in FIG. 1). Tree traversal operations may include, for example, determining whether a ray intersects bounding volumes and/or primitives of a tree data structure (e.g., a BVH tree), which tests may involve transforming the ray into object space.

The TTU 700 includes dedicated hardware to determine whether a ray intersects bounding volumes and dedicated hardware to determine whether a ray intersects primitives of the tree data structure. In some embodiments, the TTU 700 may perform a depth-first traversal of a bounding volume hierarchy using a short stack traversal with intersection testing of supported leaf node primitives and mid-traversal return of alpha primitives and unsupported leaf node primitives (items). The intersection of primitives will be discussed with reference to triangles, but other geometric primitives may also be used.

In more detail, TTU 700 includes an intersection management block 722, a ray management block 730 and a stack management block 740. Each of these blocks (and all of the other blocks in FIG. 9) may constitute dedicated hardware implemented by logic gates, registers, hardware-embedded lookup tables or other combinatorial logic, etc.

The ray management block 730 is responsible for managing information about and performing operations concerning a ray specified by an SM 132 to the ray management block. The stack management block 740 works in conjunction with traversal logic 712 to manage information about and perform operations related to traversal of a BVH acceleration data structure. Traversal logic 712 is directed by results of a ray-complet test block 710 that tests intersections between the ray indicated by the ray management block 730 and volumetric subdivisions represented by the BVH, using instance transforms as needed. The ray-complet test block 710 retrieves additional information concerning the BVH from memory 140 via an L0 complet cache 752 that is part of the TTU 700. The results of the ray-complet test block 710 informs the traversal logic 712 as to whether further recursive traversals are needed. The stack management block 740 maintains stacks to keep track of state information as the traversal logic 712 traverses from one level of the BVH to another, with the stack management block pushing items onto the stack as the traversal logic traverses deeper into the BVH and popping items from the stack as the traversal logic traverses upwards in the BVH. The stack management block 740 is able to provide state information (e.g., intermediate or final results) to the requesting SM 132 at any time the SM requests.

The intersection management block 722 manages information about and performs operations concerning intersections between rays and primitives, using instance transforms as needed. The ray-primitive test block 720 retrieves information concerning geometry from memory 140 on an as-needed basis via an L0 primitive cache 754 that is part of TTU 700. The intersection management block 722 is informed by results of intersection tests the ray-primitive test and transform block 720 performs. Thus, the ray-primitive test and transform block 720 provides intersection results to the intersection management block 722, which reports geometry hits and intersections to the requesting SM 132.

A Stack Management Unit 740 inspects the traversal state to determine what type of data needs to be retrieved and which data path (complet or primitive) will consume it. The intersections for the bounding volumes are determined in the ray-complet test path of the TTU 700 including one or more ray-complet test blocks 710 and one or more traversal logic blocks 712. A complet specifies root or interior nodes of a bounding volume. Thus, a complet may define one or more bounding volumes for the ray-complet test. The ray-complet test path of the TTU 700 identifies which bounding volumes are intersected by the ray. Bounding volumes intersected by the ray need to be further processed to determine if the primitives associated with the intersected bounding volumes are intersected. The intersections for the primitives are determined in the ray-primitive test path including one or more ray-primitive test and transform blocks 720 and one or more intersection management blocks 722.

The TTU 700 receives queries from one or more SMs 132 to perform tree traversal operations. The query may request whether a ray intersects bounding volumes and/or primitives in a BVH data structure. The query may identify a ray (e.g., origin, direction, and length of the ray) and a BVH data structure and traversal state (e.g., short stack) which includes one or more entries referencing nodes in one or more Bounding Volume Hierarchies that the ray is to visit. The query may also include information for how the ray is to handle specific types of intersections during traversal. The ray information may be stored in the ray management block 730. The stored ray information (e.g., ray length) may be updated based on the results of the ray-primitive test.

The TTU 700 may request the BVH data structure identified in the query to be retrieved from memory outside of the TTU 700. Retrieved portions of the BVH data structure may be cached in the level-zero (L0) cache 750 within the TTU 700 so the information is available for other time-coherent TTU operations, thereby reducing memory 140 accesses. Portions of the BVH data structure needed for the ray-complet test may be stored in a L0 complet cache 752 and portions of the BVH data structure needed for the ray-primitive test may be stored in an L0 primitive cache 754.

After the complet information needed for a requested traversal step is available in the complet cache 752, the ray-complet test block 710 determines bounding volumes intersected by the ray. In performing this test, the ray may be transformed from the coordinate space of the bounding volume hierarchy to a coordinate space defined relative to a complet. The ray is tested against the bounding boxes associated with the child nodes of the complet. In the example non-limiting embodiment, the ray is not tested against the complet's own bounding box because (1) the TTU 700 previously tested the ray against a similar bounding box when it tested the parent bounding box child that referenced this complet, and (2) a purpose of the complet bounding box is to define a local coordinate system within which the child bounding boxes can be expressed in compressed form. If the ray intersects any of the child bounding boxes, the results are pushed to the traversal logic to determine the order that the corresponding child pointers will be pushed onto the traversal stack (further testing will likely require the traversal logic 712 to traverse down to the next level of the BVH). These steps are repeated recursively until intersected leaf nodes of the BVH are encountered The ray-complet test block 710 may provide ray-complet intersections to the traversal logic 612. Using the results of the ray-complet test, the traversal logic 712 creates stack entries to be pushed to the stack management block 740. The stack entries may indicate internal nodes (i.e., a node that includes one or more child nodes) that need to be further tested for ray intersections by the ray-complet test block 710 and/or triangles identified in an intersected leaf node that need to be tested for ray intersections by the ray-primitive test and transform block 720. The ray-complet test block 710 may repeat the traversal on internal nodes identified in the stack to determine all leaf nodes in the BVH that the ray intersects. The precise tests the ray-complet test block 710 performs will in the example non-limiting embodiment be determined by mode bits, ray operations (see below) and culling of hits, and the TTU 700 may return intermediate as well as final results to the SM 132.

The intersected leaf nodes identify primitives that may or may not be intersected by the ray. One option is for the TTU 700 to provide e.g., a range of geometry identified in the intersected leaf nodes to the SM 132 for further processing. For example, the SM 132 may itself determine whether the identified primitives are intersected by the ray based on the information the TTU 700 provides as a result of the TTU traversing the BVH. To offload this processing from the SM 132 and thereby accelerate it using the hardware of the TTU 700, the stack management block 740 may issue requests for the ray-primitive and transform block 720 to perform a ray-primitive test for the primitives within intersected leaf nodes the TTU's ray-complet test block 710 identified. In some embodiments, the SM 132 may issue a request for the ray-primitive test to test a specific range of primitives and transform block 720 irrespective of how that geometry range was identified.

After making sure the primitive data needed for a requested ray-primitive test is available in the primitive cache 754, the ray-primitive and transform block 710 may determine primitives that are intersected by the ray using the ray information stored in the ray management block 730. The ray-primitive test block 720 provides the identification of primitives determined to be intersected by the ray to the intersection management block 722.

The intersection management block 722 can return the results of the ray-primitive test to the SM 132. The results of the ray-primitive test may include identifiers of intersected primitives, the distance of intersections from the ray origin and other information concerning properties of the intersected primitives. In some embodiments, the intersection management block 722 may modify an existing ray-primitive test (e.g., by modifying the length of the ray) based on previous intersection results from the ray-primitive and transform block 710.

The intersection management block 722 may also keep track of different types of primitives. For example, the different types of triangles include opaque triangles that will block a ray when intersected and alpha triangles that may or may not block the ray when intersected or may require additional handling by the SM. Whether a ray is blocked or not by a transparent triangle may for example depend on texture(s) mapped onto the triangle, area of the triangle occupied by the texture (see FIGS. 6A and 6B) and the way the texture modifies the triangle. For example, transparency (e.g., stained glass) in some embodiments requires the SM 132 to keep track of transparent object hits so they can be sorted and shaded in ray-parametric order, and typically don't actually block the ray. Meanwhile, alpha "trimming" allows the shape of the primitive to be trimmed based on the shape of a texture mapped onto the primitive—for example, cutting a leaf shape out of a triangle. (Note that in raster graphics, transparency is often called "alpha blending" and trimming is called "alpha test"). In other embodiments, the TTU 700 can push transparent hits to queues in memory for later handling by the SM 132 and directly handle trimmed triangles by sending requests to the texture unit. Each triangle may include a designator to indicate the triangle type. The intersection management block 722 is configured to maintain a result queue for tracking the different types of intersected triangles. For example, the result queue may store one or more intersected opaque triangle identifiers in one queue and one or more transparent triangle identifiers in another queue.

For opaque triangles, the ray intersection can be fully determined in the TTU 700 because the area of the opaque triangle blocks the ray from going past the surface of the triangle. For transparent triangles, ray intersections cannot in some embodiments be fully determined in the TTU 700 because TTU 700 performs the intersection test based on the geometry of the triangle and may not have access to the texture of the triangle and/or area of the triangle occupied by the texture (in other embodiments, the TTU may be provided with texture information by the texture mapping block of the graphics pipeline). To fully determine whether the triangle is intersected, information about transparent triangles the ray-primitive and transform block 710 determines are intersected may be sent to the SM 132, for the SM to make the full determination as to whether the triangle affects visibility along the ray.

The SM 132 can resolve whether or not the ray intersects a texture associated with the transparent triangle and/or whether the ray will be blocked by the texture. The SM 132 may in some cases send a modified query to the TTU 700 (e.g., shortening the ray if the ray is blocked by the texture) based on this determination.

In one embodiment, the TTU 700 may be configured to return all triangles determined to intersect the ray to the SM 132 for further processing. Because returning every triangle intersection to the SM 132 for further processing is costly in terms of interface and thread synchronization, the TTU 700 may be configured to hide triangles which are intersected but are provably capable of being hidden without a functional impact on the resulting scene. For example, because the TTU 700 is provided with triangle type information (e.g., whether a triangle is opaque or transparent), the TTU 700 may use the triangle type information to determine intersected triangles that are occluded along the ray by another intersecting opaque triangle and which thus need not be included in the results because they will not affect the visibility along the ray. As discussed above with reference to FIGS. 5A-5C, if the TTU 700 knows that a triangle is occluded along the ray by an opaque triangle, the occluded triangle can be hidden from the results without impact on visualization of the resulting scene.

The intersection management block 722 may include a result queue for storing hits that associate a triangle ID and information about the point where the ray hit the triangle. When a ray is determined to intersect an opaque triangle, the identity of the triangle and the distance of the intersection from the ray origin can be stored in the result queue. If the ray is determined to intersect another opaque triangle, the other intersected opaque triangle can be omitted from the result if the distance of the intersection from the ray origin is greater than the distance of the intersected opaque triangle already stored in the result queue. If the distance of the intersection from the ray origin is less than the distance of the intersected opaque triangle already stored in the result queue, the other intersected opaque triangle can replace the opaque triangle stored in the result queue. After all of the triangles of a query have been tested, the opaque triangle information stored in the result queue and the intersection information may be sent to the SM 132.

In some embodiments, once an opaque triangle intersection is identified, the intersection management block 722 may shorten the ray stored in the ray management block 730 so that bounding volumes (which may include triangles) behind the intersected opaque triangle (along the ray) will not be identified as intersecting the ray.

The intersection management block 722 may store information about intersected transparent triangles in a separate queue. The stored information about intersected transparent triangles may be sent to the SM 132 for the SM to resolve whether or not the ray intersects a texture associated with the triangle and/or whether the texture blocks the ray. The SM may return the results of this determination to the TTU 700 and/or modify the query (e.g., shorten the ray if the ray is blocked by the texture) based on this determination.

Example Ray Tracing Shading Pipeline

Figure 10A:
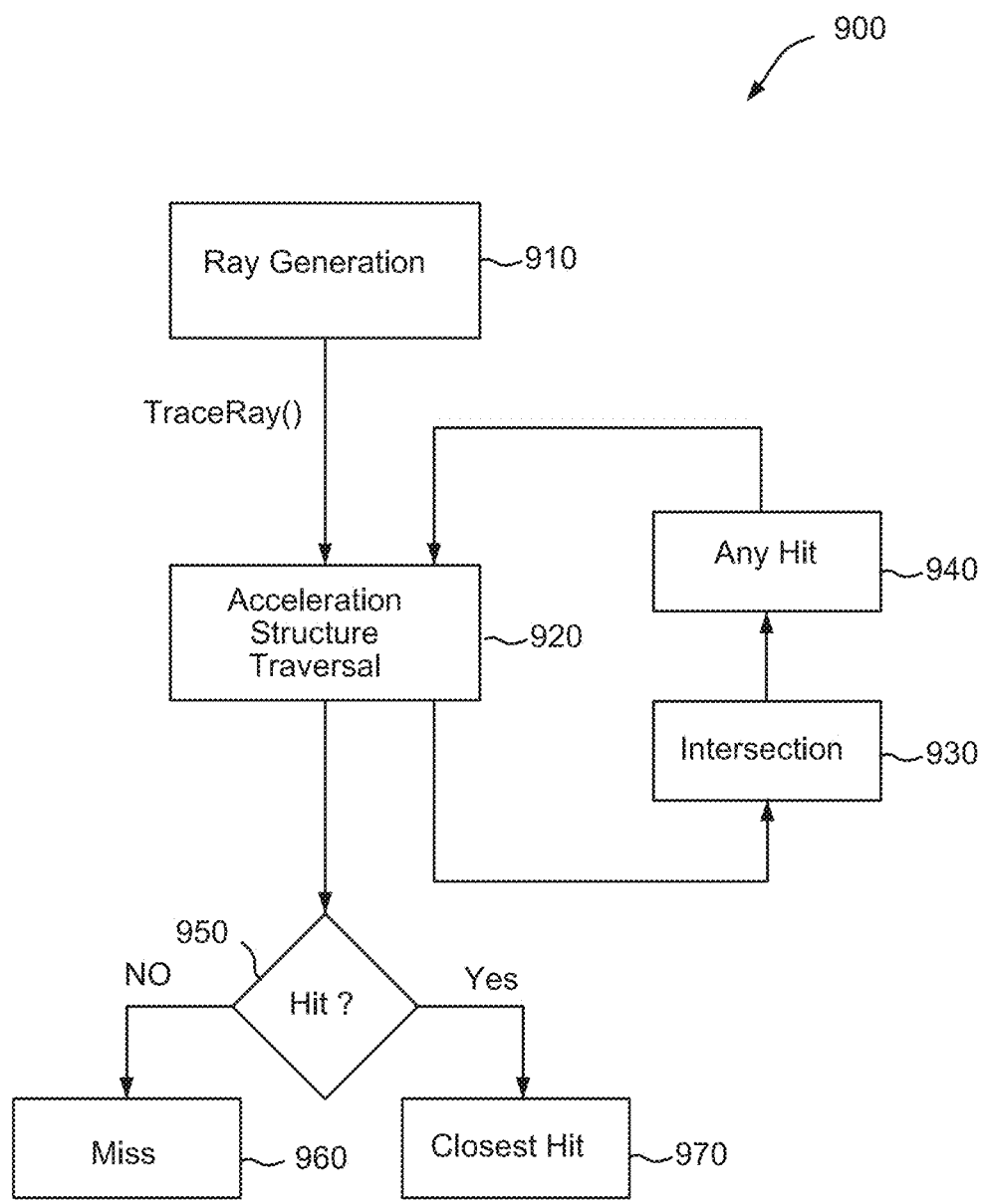
FIG. 10A illustrates an example non-limiting ray tracing shading pipeline flowchart.

FIG. 10A shows an exemplary ray tracing shading pipeline 900 that may be performed by SM 132 and accelerated by TTU 700. The ray tracing shading pipeline 900 starts by an SM 132 invoking ray generation 910 and issuing a corresponding ray tracing request to the TTU 700. The ray tracing request identifies a single ray cast into the scene and asks the TTU 700 to search for intersections with an acceleration data structure the SM 132 also specifies. The TTU 700 traverses (FIG. 10A block 920) the acceleration data structure to determine intersections or potential intersections between the ray and the volumetric subdivisions and associated triangles the acceleration data structure represents. Potential intersections can be identified by finding bounding volumes in the acceleration data structure that are intersected by the ray. Descendants of non-intersected bounding volumes need not be examined.

For triangles within intersected bounding volumes, the TTU 700 ray-primitive test block 720 performs an intersection 930 process to determine whether the ray intersects the primitives. The TTU 700 returns intersection information to the SM 132, which may perform an "any hit" shading operation 940 in response to the intersection determination. For example, the SM 132 may perform (or have other hardware perform) a texture lookup for an intersected primitive and decide based on the appropriate texel's value how to shade a pixel visualizing the ray. The SM 132 keeps track of such results since the TTU 700 may return multiple intersections with different geometry in the scene in arbitrary order.

Alternatively, primitives that the TTU 700 determines are intersected may be further processed to determine 950 whether they should be shaded as a miss 960 or as a closest hit 970. The SM 132 can for example instruct the TTU 700 to report a closest hit in the specified geometry, or it may instruct the TTU to report all hits in the specified geometry. For example, it may be up to the SM 132 to implement a "miss" shading operation for a primitive the TTU 700 determines is intersected based on implemented environment lookups (e.g., approximating the appearance of a reflective surface by means of a precomputed texture image) such as shown in FIGS. 6A & 6B. The SM 132 may perform a closest hit shading operation to determine the closest intersected primitive based on material evaluations and texture lookups in response to closest hit reports the TTU 700 provided for particular object geometry.

Figure 10B:
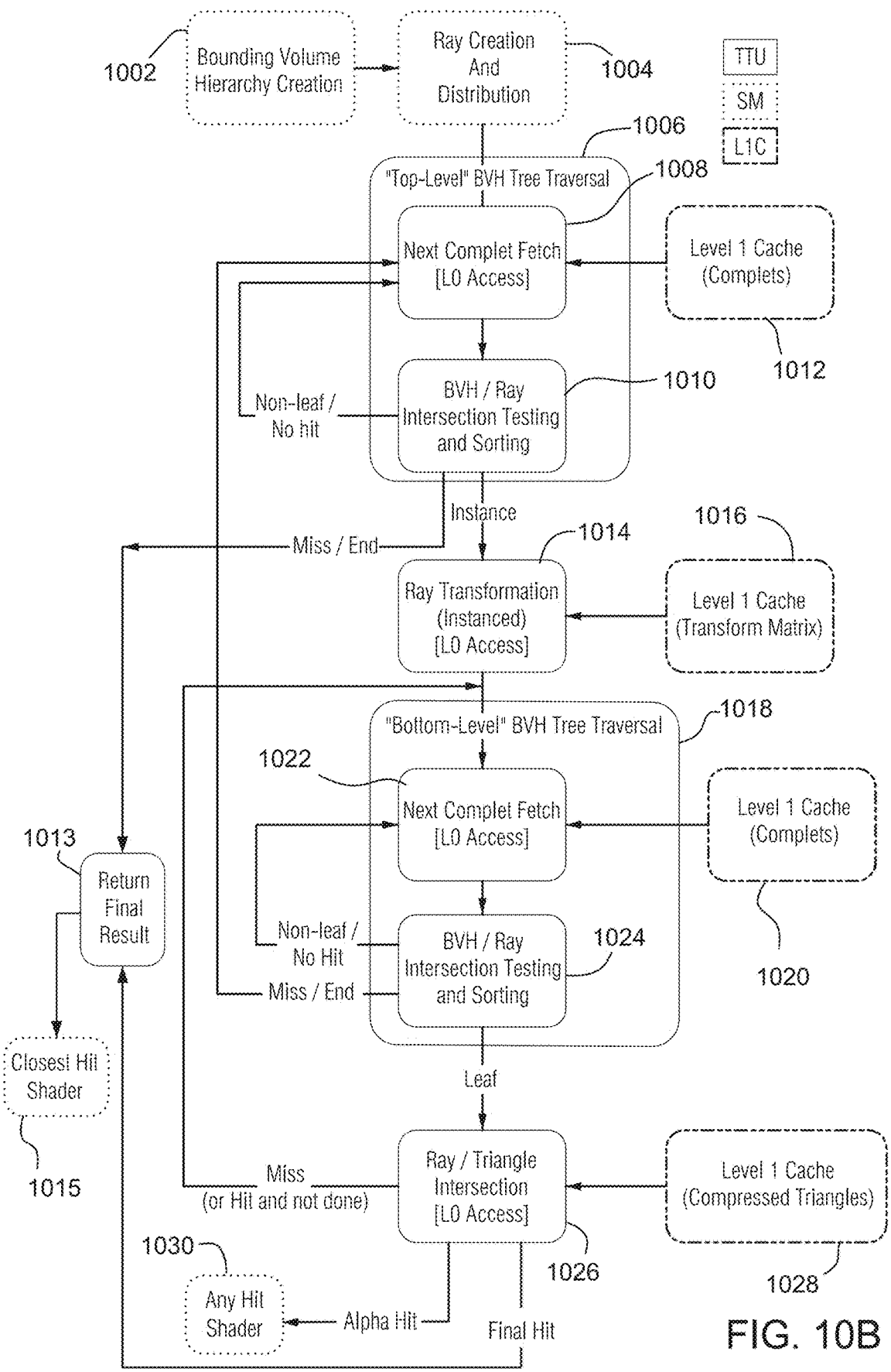
FIGS. 10B and 10C illustrate more detailed ray tracing pipelines.

The FIG. 10B more detailed diagram of ray-tracing pipeline flowchart shows the data flow and interaction between components for a representative use case: tracing rays against a scene containing geometric primitives, with instance transformations handled in hardware. In one example non-limiting embodiment, the ray-tracing pipeline of FIG. 10B is essentially software-defined (which in example embodiments means it is determined by the SMs 132) but makes extensive use of hardware acceleration by TTU 700. Key components include the SM 132 (and the rest of the compute pipeline), the TTU 700 (which serves as a coprocessor to SM), and the L1 cache and downstream memory system, from which the TTU fetches BVH and triangle data.

The pipeline shown in FIG. 10B shows that bounding volume hierarchy creation 1002 can be performed ahead of time by a development system. It also shows that ray creation and distribution 1004 are performed or controlled by the SM 132 or other software in the example embodiment, as is shading (which can include lighting and texturing). The example pipeline includes a "top level" BVH tree traversal 1006, ray transformation 1014, "bottom level" BVH tree traversal 1018, and a ray/triangle (or other primitive) intersection 1026 that are each performed by the TTU 700. These do not have to be performed in the order shown, as handshaking between the TTU 700 and the SM 132 determines what the TTU 700 does and in what order.

The SM 132 presents one or more rays to the TTU 700 at a time. Each ray the SM 132 presents to the TTU 700 for traversal may include the ray's geometric parameters, traversal state, and the ray's ray flags, mode flags and ray operations information. In an example embodiment, a ray operation (RayOp) provides or comprises an auxiliary arithmetic and/or logical test to suppress, override, and/or allow storage of an intersection. The traversal stack may also be used by the SM 132 to communicate certain state information to the TTU 700 for use in the traversal. A new ray query may be started with an explicit traversal stack. For some queries, however, a small number of stack initializers may be used instead of specifying an explicit stack for beginning the new query of a given type, such as, for example: traversal starting from a complet; intersection of a ray with a range of triangles; intersection of a ray with a range of triangles, followed by traversal starting from a complet; vertex fetch from a triangle buffer for a given triangle, etc. In some embodiments, using stack initializers instead of explicit stack initialization improves performance because stack initializers require fewer streaming processor registers and reduce the number of parameters that need to be transmitted from the streaming processor to the TTU.

In the example embodiment, a set of mode flags the SM 132 presents with each query (e.g., ray) may at least partly control how the TTU 700 will process the query when the query intersects the bounding volume of a specific type or intersects a primitive of a specific primitive type. The mode flags the SM 132 provides to the TTU 700 enable the ability by the SM and/or the application to e.g., through a RayOp, specify an auxiliary arithmetic or logical test to suppress, override, or allow storage of an intersection. The mode flags may for example enable traversal behavior to be changed in accordance with such aspects as, for example, a depth (or distance) associated with each bounding volume and/or primitive, size of a bounding volume or primitive in relation to a distance from the origin or the ray, particular instances of an object, etc. This capability can be used by applications to dynamically and/or selectively enable/disable sets of objects for intersection testing versus specific sets or groups of queries, for example, to allow for different versions of models to be used when application state changes (for example, when doors open or close) or to provide different versions of a model which are selected as a function of the length of the ray to realize a form of geometric level of detail, or to allow specific sets of objects from certain classes of rays to make some layers visible or invisible in specific views.

In addition to the set of mode flags which may be specified separately for the ray-complet intersection and for ray-primitive intersections, the ray data structure may specify other RayOp test related parameters, such as ray flags, ray parameters and a RayOp test. The ray flags can be used by the TTU 700 to control various aspects of traversal behavior, back-face culling, and handling of the various child node types, subject to a pass/fail status of an optional RayOp test. RayOp tests add flexibility to the capabilities of the TTU 700, at the expense of some complexity. The TTU 700 reserves a "ray slot" for each active ray it is processing, and may store the ray flags, mode flags and/or the RayOp information in the corresponding ray slot buffer within the TTU during traversal.

In the example shown in FIG. 10B, the TTU 700 performs a top level tree traversal 1006 and a bottom level tree traversal 1018. In the example embodiment, the two level traversal of the BVH enables fast ray tracing responses to dynamic scene changes.

Ray transformation 1014 provides the appropriate transition from the top level tree traversal 1006 to the bottom level tree traversal 1018 by transforming the ray, which may be used in the top level traversal in a first coordinate space (e.g., world space), to a different coordinate space (e.g., object space) of the BVH of the bottom level traversal. An example BVH traversal technique using a two level traversal is described in previous literature, see, e.g., Woop, "A Ray Tracing Hardware Architecture for Dynamic Scenes", Universität des Saarlandes, 2004, but embodiments are not limited thereto.

In some embodiments, the top level traversal (in world space) is made in a BVH that may be dynamically recalculated (e.g., by SM 132) in response to changes in the position or orientation of instanced objects, and the bottom level traversal is made in a BVH of bounding volumes that remain static or substantially static. Changes in the shape of geometry in the lower-level BVH which do not alter the bounding box of the root node of that lower-level BVH require no changes in the top-level BVH. The bounding volumes in the BVH used for the bottom level tree traversal 1018 (in object space) may encompass more detailed information regarding the scene geometry than the respective bounding volumes used in the top level tree traversal 1006, thereby avoiding or at least reducing the modification of the bottom level traversal BVH in response to scene changes. This helps to speed up ray tracing of dynamic scenes.

The top level tree traversal 1006 by TTU 700 receives complets from the L1 cache 1012, and provides an instance to the ray transformation 1014 for transformation or a miss/end output 1013 to the SM 132 for closest hit shader 1015 processing by the SM (this block can also operate recursively based on non-leaf nodes/no hit conditions). In the top level tree traversal 1006, a next complet fetch step 1008 fetches the next complet to be tested for ray intersection in step 1010 from the memory and/or cache hierarchy and ray-bounding volume intersection testing is done on the bounding volumes in the fetched complet. In example embodiments, instance nodes are considered leaf nodes and get processed in top-level traversal. The example non-limiting TTU is able to encounter and process primitive ranges and item ranges in the top-level BVH. Each traversal step of each ray starts with the stack management unit inspecting the currently active stack of an active ray. In top level tree traversal, the top-level stack is active, and thus the stack management unit inspects the top level stack. If the top-level stack is active and empty, then the ray and its result queue are returned to the SM. Otherwise, the Stack Management Unit obtains the address of the next complet or leaf to be processed by that ray and requests that complet/leaf from the memory subsystem via the L0/L1 caches. If bottom-level tree traversal, the bottom-level stack is active, and thus the stack management unit inspects the bottom level stack. If the bottom-level stack is active and empty, then the ray switches to top-level traversal and the top-level stack becomes the active stack. Traversal can thus continue in the bottom level (the continuation in the top level occurs when the bottom level stack becomes empty).

As described above, an instance node connects one BVH to another BVH which is in a different coordinate system. When a child of the intersected bounding volume is an instance node, the ray transformation 1014 is able to retrieve an appropriate transform matrix from the L1 cache 1016. The TTU 700, using the appropriate transform matrix, transforms the ray to the coordinate system of the child BVH. U.S. patent application Ser. No. 14/697,480, which is already incorporated by reference, describes transformation nodes that connect a first set of nodes in a tree to a second set of nodes where the first and second sets of nodes are in different coordinate systems. The instance nodes in example embodiments may be similar to the transformation nodes in U.S. application Ser. No. 14/697,480. In an alternative, non-instancing mode of TTU 700 shown in FIG. 10C, the TTU does not execute a "bottom" level tree traversal 1018 and noninstanced tree BVH traversals are performed by blocks 1008, 1010 e.g., using only one stack. The TTU 700 can switch between the FIG. 10B instanced operations and the FIG. 10C non-instanced operations based on what it reads from the BVH and/or query type. For example, a specific query type may restrict the TTU to use just the non-instanced operations. In such a query, any intersected instance nodes would be returned to the SM.

In some non-limiting embodiments, ray-bounding volume intersection testing in step 1010 is performed on each bounding volume in the fetched complet before the next complet is fetched. Other embodiments may use other techniques, such as, for example, traversing the top level traversal BVH in a depth-first manner. U.S. Pat. No. 9,582,607, already incorporated by reference, describes one or more complet structures and contents that may be used in example embodiments. U.S. Pat. No. 9,582,607 also describes an example traversal of complets.

When the RCT unit determines that a ray intersects a child bounding volume, the Tree Traversal unit records a pointer or reference to the corresponding child complet or leaf node for subsequent testing against the ray. In example embodiments, one or more stack data structures (e.g., the traversal stack illustrated in FIG. 12) is used for keeping track of complet or leaf nodes to be subsequently tested for intersection with the ray. In some example embodiments, a traversal stack of a small size may be used to keep track of complets to be traversed by operation of the top level tree traversal 1006, and primitives to be tested for intersection, and a larger local stack data structure can be used to keep track of the traversal state in the bottom level tree traversal 1018. In some example embodiments, the traversal stacks for both the top level traversal and the bottom level traversal may be short, i.e., limited to a small size (e.g., 4 entries each), to facilitate efficient passing of stack information between the traversal coprocessor and the SM. In some example embodiments, the top-level and bottom-level stacks are equivalently sized, and both leaf nodes and complets may be present in both the top-level and bottom-level BVHs. In some example embodiments, there is an option to limit the stack content exchanged between the traversal coprocessor and the SM (the number of stack entries that may be exchanged may be configurable independently of the stack depth). If the number of stack entries that can be exchanged between traversal coprocessor and the SM is limited, the entire stack may nevertheless be available for traversal, and the ways in which the stack is used may be limited. For example, a use limit could be that the leaf nodes pushed onto the stack may not exceed the stack limit minus one, except for the case of all opaque triangles which may be guaranteed to pop off the stack before the return from traversal.

In example embodiments, while bottom-level BVH traversal is active, the position and direction of the ray in the upper level BVH are stored separately from the transformed position and direction used for traversing the bottom level BVH. In the bottom level tree traversal 1018, a next complet fetch step 1022 fetches the next complet to be tested for ray intersection in step 1024 from the memory and/or cache hierarchy 1020 and ray-bounding volume intersection testing is done on the bounding volumes in the fetched complet. The bottom level tree traversal, as noted above, may include complets with bounding volumes in a different coordinate system than the bounding volumes traversed in the upper level tree traversal. The bottom level tree traversal also receives complets from the L1 cache and can operate recursively or iteratively within itself based on non-leaf/no-hit conditions and also with the top level tree traversal 1006 based on miss/end detection. Intersections of the ray with the bounding volumes in the lower level BVH may be determined with the ray transformed to the coordinate system of the lower level complet retrieved. The leaf bounding volumes found to be intersected by the ray in the lower level tree traversal are then provided to the ray/triangle intersection 1026.

As mentioned above, leaf nodes can be processed in both top-level and bottom-level traversal in example non-limiting embodiments. For example, the leaf outputs of the bottom level tree traversal 1018 can be provided to the ray/triangle intersection 1026 (which has L0 cache access as well as ability to retrieve triangles via the L1 cache 1028). The ray/triangle intersection 1026 may also receive leaf outputs from the top level tree traversal 1006 when certain leaf nodes are reached without traversing an instanced BVH. The L0 complet and triangle caches may be small read-only caches internal to the TTU 700.

After all the primitives in the primitive range have been processed, the Intersection Management Unit inspects the state of the result queue and crafts packets to send to the Stack Management Unit and/or Ray Management Unit to update the ray's attributes and traversal state, set up the ray's next traversal step, and/or return the ray to the SM 132 (if necessary). If the result queue contains opaque or alpha intersections found during the processing of the primitive range then the Intersection Management Unit signals the parametric length (t) of the nearest opaque intersection in the result queue to the ray management unit to record as the ray's tmax to shorten the ray. To update the traversal state to set up the ray's next traversal step the Intersection Management Unit signals to the Stack Management Unit whether an opaque intersection from the primitive range is present in the result queue, whether one or more alpha intersections are present in the result queue, whether the result queue is full, whether additional alpha intersections were found in the primitive range that have not been returned to the SM and which are not present in the result queue, and the index of the next alpha primitive in the primitive range for the ray to test after the SM consumes the contents of the result queue (the index of the next primitive in the range after the alpha primitive with the highest memory-order from the current primitive range in the result queue).

When the Stack Management Unit 740 receives the packet from Intersection Management Unit 722, the Stack Management Unit 740 inspects the packet to determine the next action required to complete the traversal step and start the next one. If the packet from Intersection Management Unit 722 indicates an opaque intersection has been found in the primitive range and the ray mode bits indicate the ray is to finish traversal once any intersection has been found the Stack Management Unit 740 returns the ray and its results queue to the SM with traversal state indicating that traversal is complete (a done flag set and/or an empty top level and bottom level stack). If the packet from Intersection Management Unit 722 indicates that there opaque or alpha intersection in the result queue and that there are remaining alpha intersections in the primitive range not present in the result queue that were encountered by the ray during the processing of the primitive range that have not already been returned to the SM, the Stack Management Unit 740 returns the ray and the result queue to the SM with traversal state modified to set the cull opaque bit to prevent further processing of opaque primitives in the primitive range and the primitive range starting index advanced to the first alpha primitive after the highest alpha primitive intersection from the primitive range returned to the SM in the ray's result queue. If the packet from Intersection Management Unit 722 indicates that no opaque or alpha intersections were found when the ray processed the primitive range the Stack Management Unit 740 pops the top of stack entry (corresponding to the finished primitive range) off the active traversal stack. If the packet from Stack Management Unit 740 indicates or that either there are opaque intersections in the result queue and the ray mode bits do not indicate that the ray is to finish traversal once any intersection has been found and/or there are alpha intersections in the result queue, but there were no remaining alpha intersections found in the primitive range not present in the result queue that have not already been returned to the SM the Stack Management Unit 740 pops the top of stack entry (corresponding to the finished primitive range) off the active traversal stack and modifies the contents of the result queue to indicate that all intersections present in the result queue come from a primitive range whose processing was completed.

If the active stack is the bottom stack, and the bottom stack is empty the Stack Management Unit 740 sets the active stack to the top stack. If the top stack is the active stack, and the active stack is empty, then the Stack Management Unit 740 returns the ray and its result queue to the SM with traversal state indicating that traversal is complete (a done flag set and/or an empty top level and bottom level stack). If the active stack contains one or more stack entries, then the Stack Management Unit 740 inspects the top stack entry and starts the next traversal step. Testing of primitive and/or primitive ranges for intersections with a ray and returning results to the SM 132 are described in co-pending U.S. application Ser. No. 16/101,148 entitled "Conservative Watertight Ray Triangle Intersection". U.S. application Ser. No. 16/101,066 entitled "Method for Continued Bounding Volume Hierarchy Traversal on Intersection without Shader Intervention" and U.S. application Ser. No. 16/101,196 entitled "Method for Handling Out-of-Order Opaque and Alpha Ray/Primitive Intersections", which are hereby incorporated by reference in their entireties.

While the above disclosure is framed in the specific context of computer graphics and visualization, ray tracing and the disclosed traversal coprocessor could be used for a variety of applications beyond graphics and visualization. Non-limiting examples include sound propagation for realistic sound synthesis, simulation of sonar systems, design of optical elements and systems, particle transport simulation (e.g., for medical physics or experimental high-energy physics), general wave propagation simulation, comparison to LIDAR data for purposes e.g., of robot or vehicle localization, and others. OptiX™ has already been used for some of these application areas in the past.

Rays are traced under different circumstances and for a variety of reasons. It is desirable to be able to trace different types of rays with constraints to limit traversal to specific subsets of the BVH or to only test rays against certain subsets of primitives for intersection. Examples of these circumstances might include changes in object states affecting geometry (e.g., gates or doors opening/closing) or shading (e.g., traffic lights changing), multiple versions of the same object with different geometric or shading level of detail being selected as a function of the number of bounces along a path or accumulated path length, omitting alpha primitives or items, or highlighting objects in specific "layers" of a CAD application.

However, changes in objects and/or the scene to be represented may often require the BVH or portions thereof to be modified and/or regenerated at runtime. Regenerating or even modifying the BVH corresponding to a scene may be time consuming. For example, as described above, each bounding volume in the BVH may encompass many other bounding volumes, and up to millions of geometric primitives. Thus, techniques are needed for improving the performance of ray tracing systems when dynamic scene changes are to be rendered.

In some applications, changes in a scene and/or aspects of visualization may not require all parts of the scene to be regenerated in the BVH. Although for many types of scene changes, rebuilding of the BVH or parts thereof may be required, in some instances the changes are such that rebuilding or modification of the BVH can be minimized or avoided in the interest of time. In some applications, a change in a scene, such as for example, the closing of an open door, and the resulting closing off from view an inside of a room that was earlier in view, may not require the BVH to be changed or regenerated if the ray can dynamically determine how to choose between different instances or configurations of the same object represented in the same BVH. Some example embodiments provide techniques to handle scene changes efficiently. Some other techniques, such as, for example, instancing of BVH nodes, help control changes to the BVH when scene changes occur. When instanced objects change position and/or orientation without changing shape, we only need to change the instance node's transformation coefficients and bounding box (and any ancestor complet bounding boxes that fail to bound the new bounding box for the instance node). This is less work than transforming each primitive and inserting it into a world-space BVH.

Conventional ray tracers perform traversal of the acceleration data structure solely on the basis of the geometric attributes of the ray, acceleration data structure, and primitives. While many ray tracers provide support for alpha primitives or transparency, they do so within the context of post-traversal shading. That is, although many ray tracers provide for certain types of objects (e.g., a cluster of leaves of a tree and like objects that are not entirely opaque throughout) to be modeled as transparent primitives, after an initial determination during traversal of the BVH that a transparent object may intersect a ray, the definitive determination is made outside of that traversal. In order to test further along that ray's path thereafter, those systems require the launching of a new ray originating at a point just beyond the transparent primitive starting a new traversal from the root of the BVH hierarchy. Such a requirement to have the system launch a new traversal each time a transparent primitive intersection is suspected, may incur a heavy performance penalty in terms of the speed with which a ray tracing system produces its outputs. One of the advantages of example embodiments is that tests such as, for example, the alpha test (e.g., test whether the transparent primitive intersects the ray) are treated as an extension of the ray intersection test, and as such only briefly interrupts traversal, rather than requiring the launch of a new ray for each encountered alpha intersection.

Example embodiments provide for a variety of enhancements to the basic or default traversal of a BVH and shading in ray tracing and provide mechanisms for instrumenting, augmenting, or overriding hardware-accelerated traversal of the BVH in a traversal coprocessor (e.g., TTU 700) with programmable capabilities running on a streaming multiprocessor (e.g., SM 132).

The TTU 700 as described above performs accelerated tree traversal for ray tracing. As described above, TTU 700 performs queries on behalf of threads running in SM 132, where, according to some example embodiments, each thread represents a respective ray. That is, in certain example embodiments, each thread determines the intersections of a respective ray with the BVH. Taking one or more rays (e.g., typically, in some embodiments, a respective ray from each thread in a group of threads such as a warp) from the SM 132 as input, TTU 700 accelerates traversal of the BVH in order to return ray-primitive intersection information (e.g., triangles or other primitives that are intersected) to be used in the shading processing that is subsequently performed by the SM 132 or another component of the GPU. Example non-limiting embodiments provide for performing such accelerated traversal in a manner that enables finer control by the application(s) (e.g., TTU-accelerated ray-traced rendering in a software application running on a GPU) for which the ray tracing is performed. Each ray declares how it will handle different types of primitives and nodes as a function of the mode bits and parameters specified with the ray and parameters specified within the nodes and primitives of the BVH.

Thus, example embodiments provide means for an application to fine-tune TTU-accelerated traversal for purposes such as, but not limited to, limiting traversal to a portion of the acceleration data structure or to allow software running on the SM to interrupt traversal to override or augment specific nodes or classes of nodes in the acceleration data structure.

In order to facilitate the query-specific dynamic and programmable change of the traversal process noted above, example embodiments provide a per-ray set of ray operations (each ray operation is referred to as a "RayOp"), associated ray parameters, ray flags and mode flags, based upon which the behavior of the TTU traversal can be changed on a per-ray and/or per-intersection basis. Some example embodiments extend the Tree Traversal Unit described in U.S. Pat. No. 9,582,607 (which is incorporated herein by reference in its entirety) to include, among other things, a set of per-ray RayOp tests to be performed on the intersections, associated ray parameters, ray flags and mode flags, and extends the tree structure described in U.S. patent application Ser. No. 14/697,480 (which is incorporated herein by reference in its entirety) to include, among other things, a per-child node parameter (referred to as the "real"

parameter) for use in the RayOp tests. The RayOp tests are in addition to ray intersection tests that are performed during traversal. For example, in one non-limiting embodiment the RayOp tests are only performed on child nodes and primitives that have been intersected by the ray. Whereas the ray intersection tests are based on geometric aspects (e.g., location coordinates, direction, length, size etc.) of the ray and the BVH, at least some RayOp tests may not be based upon geometric aspects of either the ray or the BVH.

The TTU performs a RayOp test for a ray by evaluating a predetermined RayOp test expression using the ray's RayOp identifier (referred to in this disclosure as the ray's RayOp opcode), ray parameters and the child node's rval parameter at each potential traversal step. According to an embodiment, the RayOp specifies a per-ray test to be performed for each child of each node tested during traversal using two per-query RayOp test parameters A, B and rval which is specified for each child of a node. An example RayOp test provides for testing a left hand side numerical value based on a ray parameter with respect to a particular arithmetic or logic operation, against a right hand side value based on a ray parameter and a parameter (e.g., rval parameter) of the intersected node. As described below, other forms of RayOp tests may be used in various embodiments.

Depending on the result of the RayOp test and the ray's mode flags, the TTU may determine how it would handle different node types and primitive hit types encountered during traversal—such as, for example, whether the child node should be traversed, ignored, or returned to the SM for special handling, or whether the primitive intersection should be suppressed, retained, or returned to the SM for special handling. The determination may also be made so as to be consistent with one or more ray flags. The ray's ray flags may specify, for example, an order of traversal for the bounding volumes (e.g., child bounding volumes), whether or not to pop a stack (e.g., a stack that represents the state of the traversal) on return from traversal, whether or not to report node references to the SM when ray's tmin . . . tmax interval starts inside the node's bounding box, whether or not to return at the first hit of an intersection, front-facing settings, and cull settings.

The mode flags specify the behavior of the TTU in how it should handle specific node types and primitive test outcomes as a function of whether the RayOp test passes or fails. The specified mode flags may be considered in two categories: mode flags which affect the traversal state passed to the stack management unit in response to the child bounding volumes intersected by the ray complet test (RCT) unit such as the ray complet test block 710, and mode flags which affect traversal state and passed to the stack management unit and values pushed to the result queue by the intersection management unit (e.g., block 722) as a consequence of primitives tested by the ray primitive test subunit (e.g., ray-triangle test block 720). The former may be referred to as RCT mode flags, and the latter may be referred to as RPT mode flags.

When the RCT unit 710 intersects a child bounding volume, the RCT unit performs the RayOp test specified by the ray's RayOp query parameters using the ray's A, B parameters and the complet child's rval parameter (and optionally, invert parameters). The RCT unit 710 performs the action enumerated by the appropriate RCT mode flags based on the result of the RayOp test (or the inverse of the result of the RayOp test, if the child node's invert flag is set). For example, if a ray with RayOp=EQUAL, A=0x0 and B=0xFF intersects a complet child node whose rval is 0x1 and whose invert field was set to FALSE, the RayOp test (e.g., 0x0==0x1 & 0xFF) will fail. Based upon the result of the RayOp test, the appropriate mode flag(s) are identified. If, for example, the identified mode flag(s) (e.g., ch_f mode flag) indicate that the complet child is to be culled when they RayOp test fails, then the TL 712 may not push a stack entry onto the ray's traversal stack for this complet child even though the ray intersected the complet child's bounding volume. In some embodiments, the RCT unit 710 performs the RayOp test, and passes the result of the test to the TL subunit 712 which uses the test result to choose between the available modes.

Figure 10C:
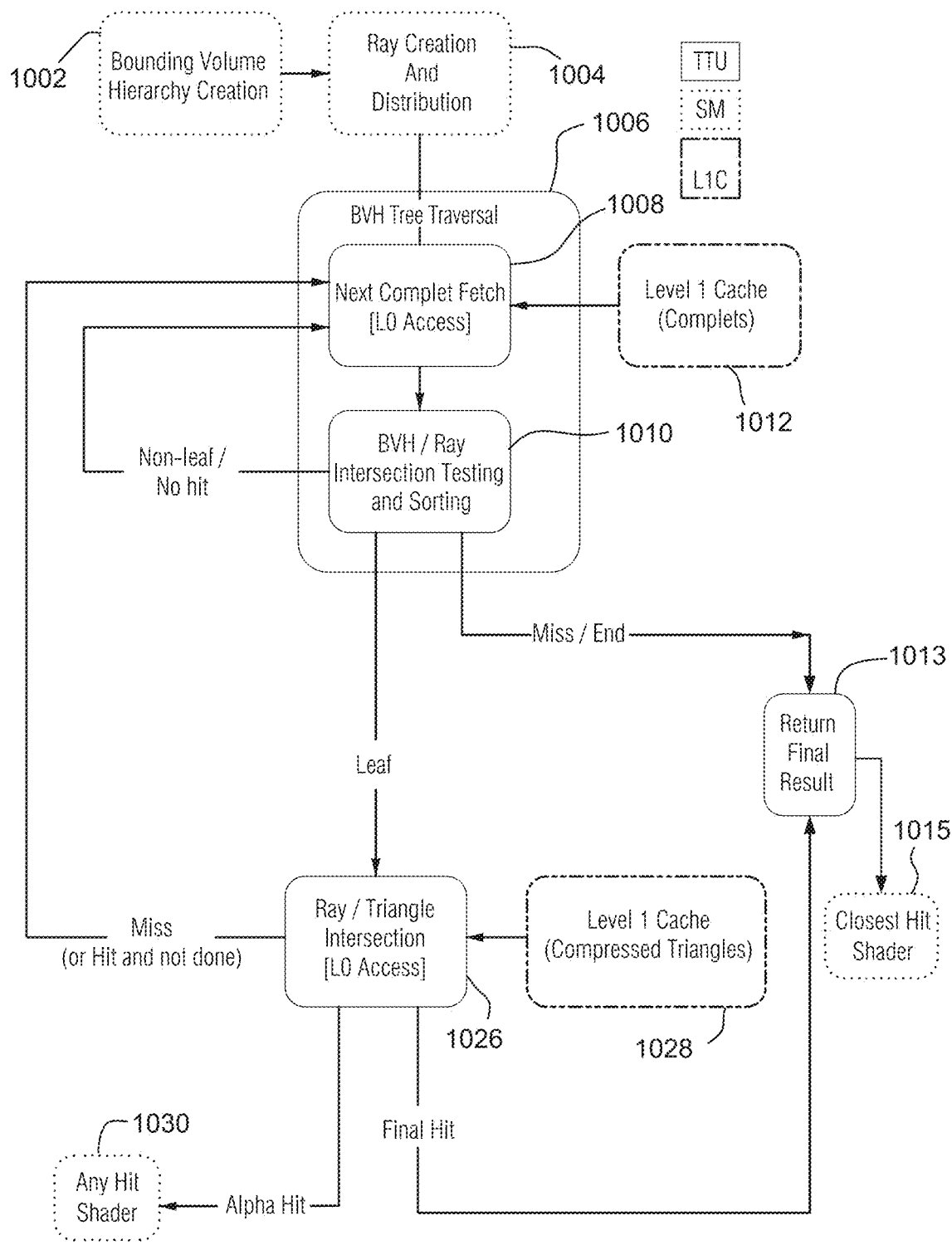
Figure 14:
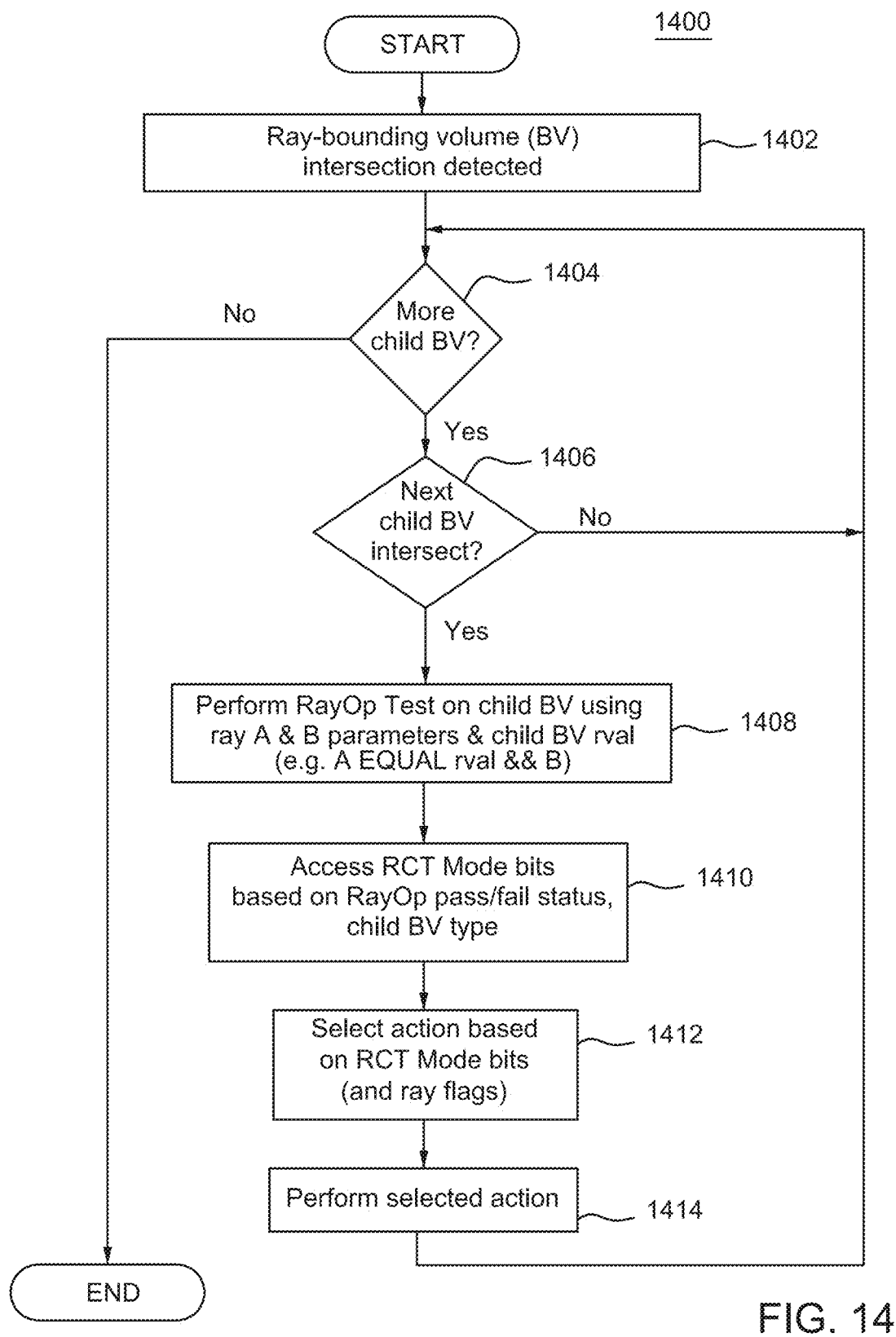
FIG. 14 illustrates a process showing the auxiliary ray operation test being performed for bounding volumes in the BVH during traversal, according to some embodiments.
Figure 15:
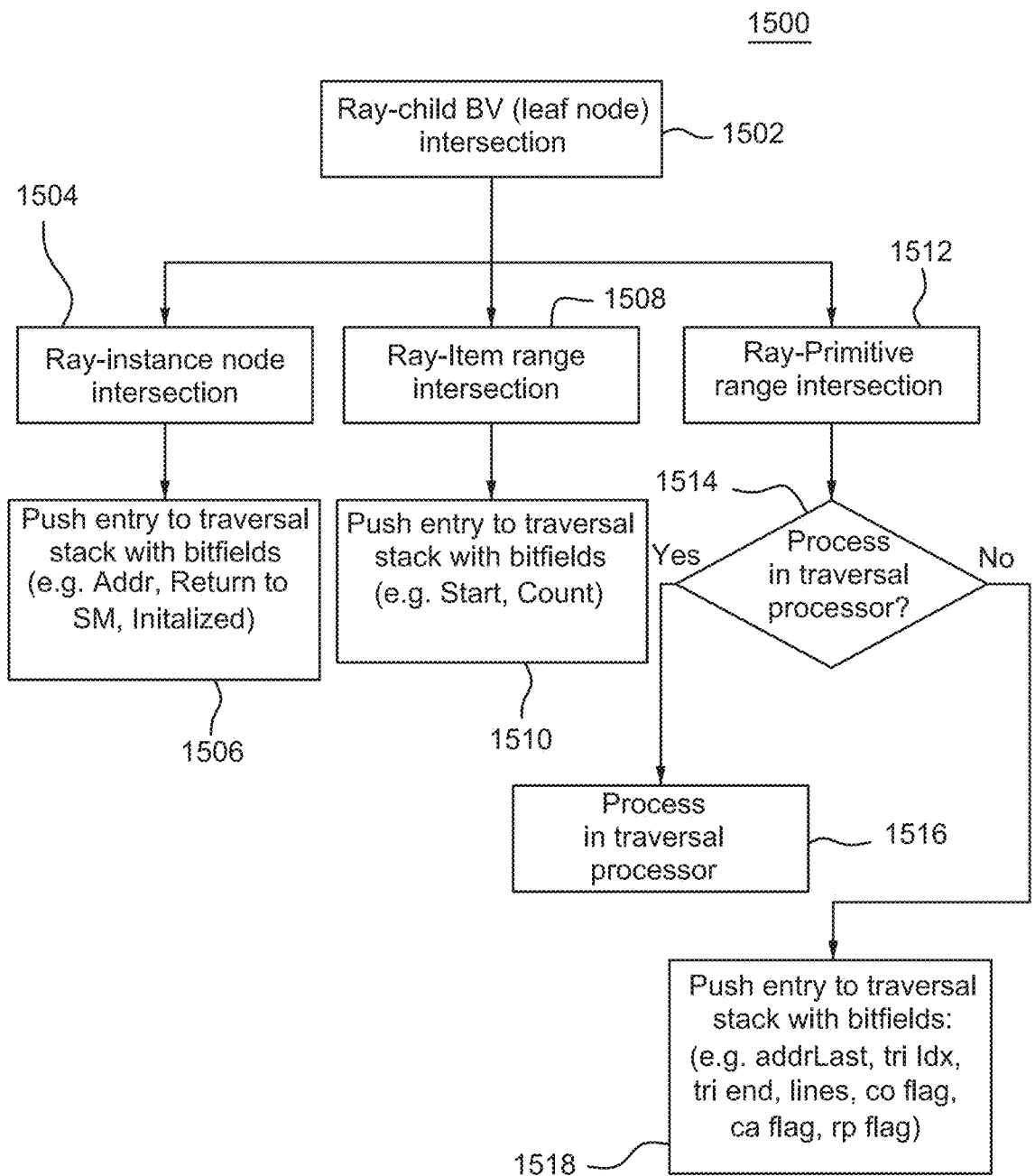
FIG. 15 illustrates a process showing the process of FIG. 14 when a leaf node is intersected, according to some example embodiments.
Figure 16:
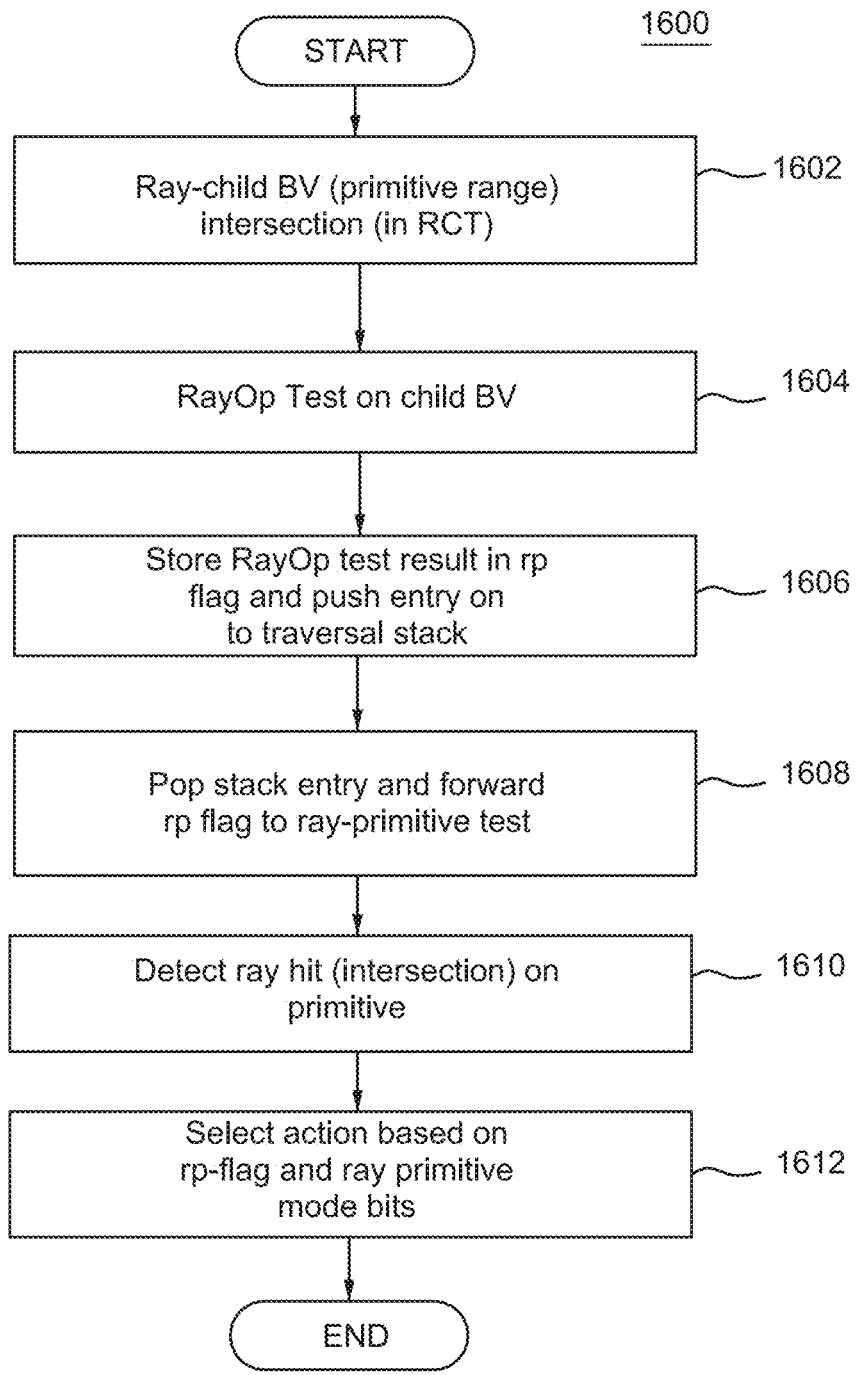
FIG. 16 illustrates a process showing the process of FIG. 14 when the ray operation test result is passed to the ray-primitive testing block, according to some example embodiments.

The mode flags described above are examples, and many more mode flags and their respective configuration are described in relation to FIGS. 10B and 10C and in relation to FIGS. 14-16.

In cases where the RayOp and mode flags indicate that the result is to be returned to the streaming processor for special handling, the ray, its traversal state, and its result queue contents may be returned to the SM in their entirety. The SM can perform additional processing as required (for example, interpolating texture coordinates and evaluating an alpha texture to determine whether an alpha intersection is to be ignored or not, etc.) or as specified, and if necessary, the SM may resubmit the query with the same or altered query parameters (for example, resubmit the query with a shortened ray) to the TTU.

In some embodiments, a mechanism is also provided to communicate the result of the RayOp test performed in the RCT test block 710 to the RTT test block 720 for subsequent use.

By providing a query structure and a BVH structure that can customize each ray's traversal and primitive intersection testing behavior in a traversal coprocessor such as, for example, TTU 700, applications can affect dynamic changes in ray-tracing rendering, in at least some cases, without requiring regeneration, modification, or duplication of BVH data. Changing the default behavior of the traversal may include changing a state of the traversal (e.g., selecting a different portion of the BVH for traversal or a different order or traversal from the default configured behavior) or changing an output returned (e.g., changing one or more of the intersections) returned to the SM.

The mechanism is described above in relation to FIGS. 10B and 10C, but a brief overview of the different types of nodes of a traversal tree that may be included within a BVH and encountered during traversal, as well as the various hit types that the TTU 700 can return to the SM is provided below.

The BVH, as described above, includes a hierarchically arranged (e.g., in a tree structure) set of bounding volumes, with each volume encompassing a three dimensional portion of a scene. Leaf nodes of the BVH tree may include ranges of geometric primitives (e.g., triangles), items, item ranges or instance nodes. As noted above, FIG. 8A shows an example 3D scene recursively-subdivided into bounding volumes, and FIG. 8B shows an example tree data structure that can represent the 3D scene in FIG. 8A.

The description here uses the terms "bounding volume hierarchy" (BVH) and "acceleration structure" interchangeably. Example embodiments are described primarily as using a BVH as the acceleration structure. However, persons of skill in the art will understand that certain example embodiments may include acceleration structures other than the type of BVH structures described in this disclosure.

In some example embodiments, the BVH is stored in one or more complets that are a compressed format for storing sets of nodes of the BVH in a tree structure. Each complet, as noted above, specifies a root, interior nodes and leaf nodes, with each node representing a respective bounding volume of the BVH. The nodes of each complet may be stored in contiguous memory.

During the traversal operation, the BVH is retrieved from memory to which it is written by application software to the TTU in complets. For efficient retrieval, the size of the complets may be configured to correspond to the cache and/or other memory access capabilities of the hardware. For example, in some embodiments, each complet is 128 B corresponding to the size of a cacheline. Since, as noted above, each complet includes a root node and child nodes, the stored BVH can be considered a tree of complets. For efficient traversal, child complets of a parent complet are preferably stored contiguously in memory, with pointers to the child complets being stored in the parent complet. The pointers may be stored in compressed form.

The complets of the BVH themselves being arranged in a tree structure, example child node types of a complet include complets, instance nodes, items or item ranges and primitives or primitive ranges.

When a child complet is encountered during traversal, the default behavior according to some configurations is for the TTU 700 to continue traversal by retrieving the child complet from memory and descending into the child complet to traverse the nodes of the child complet. The default behavior can also differ according to the node type of the complet child.

An instance node child of a complet may include one or more pointers to the hierarchy of nodes of the BVH, or more specifically to another complet, that is in a different coordinate space than the instance node and the complet that includes the instance node as a child node, and a transformation for transforming a ray from a world or other coordinate space to the coordinate space of the referenced complet. A BVH may include zero or more instance nodes, each of which provides a connection from a leaf node of one complet to the root of another. When a BVH is considered as comprising two or more smaller BVHs, an instance node may be considered to provide a connection from a first BVH in a first coordinate system to a second BVH, which is arranged as a child of the first BVH, that is in a second coordinate system. According to some embodiments, the instance node structure may contain, in addition to the one or more pointers to the referenced-complet or BVH, flags that can be used to affect behavior (e.g., back-face culling behavior) in the referenced-complet or BVH, and a transformation matrix (in homogeneous coordinates) from the coordinate system of the referencing-complet or BVH to that of the referenced-complet or BVH. The transformation may be from the world space to the object space of the referenced-complet or BVH, or from a first object space of the referencing-complet or BVH to a second object space of the referenced-complet or BVH. The local coordinate system of the object space of the referenced-complet or BVH may be defined as a translation applied to the coordinate system of the space (e.g., world space or another object space) of the referencing-complet or BVH. According to some embodiments, in addition to translating the origin of the global or other local coordinate system of the referencing-complet or BVH to a new origin of the local coordinate system, a rotation and/or scaling transformation may be applied to the global or other local coordinate system in order to define the local coordinate system of the referenced-complet or BVH.

An item range child of a complet specifies a group of one or more primitives of a type that is not tested for intersection by the TTU. According to some embodiments, the TTU delegates the intersection testing of an item range to software running on the SM. For example, when an item range, consisting of an index (e.g., which may be derived from a user or software-provided "item range base" stored in the complet) and a e.g., 6-bit count of items, is encountered during traversal, by default, item ranges are returned to SM 132 as an "ItemRange" hit type, consisting of for example an index (e.g., 47 bit index), count (e.g., 6 bit count), and the t-value (e.g., coordinates along the ray) of the intersection with the leaf bounding volume.

A primitive range (in one embodiment, a triangle range) of a complet specifies a group of one or more compressed or uncompressed alpha (e.g., transparent) or opaque primitives of the primitive type that the TTU can perform intersection tests for some or all types of query handled by the TTU stored in an array of contiguous blocks. Zero or more primitive buffers containing primitives stored as e.g., a triplet or other set of e.g., fp32 coordinates or parameters per vertex or in a lossless compressed format readable by the TTU 700. The primitive range parameters may include non-vertex parameters (e.g. radius). In addition, an alpha bit may be provided per primitive, indicating primitives that a user or software has determined as requiring special handling by software to determine whether the primitive is actually intersected by a particular ray. Primitive buffers may, in certain example embodiments, be organized into blocks that are memory and/or cache aligned, for example, 128 B in size and 128 B-aligned. In one embodiment, a triangle range specifies a group of one or more compressed or uncompressed alpha (e.g. transparent) or opaque triangles that the TTU can test for intersections against rays.

In one embodiment, when a triangle range, corresponding to a contiguous set of triangles within a triangle buffer, is encountered during traversal, by default in certain example embodiments, the triangle range encountered by a ray is handled natively by the TTU 700 by testing the triangles in the range for intersection and shortening the ray accordingly. If traversal completes and a triangle was intersected, the default behavior is for the triangle ID to be returned to SM 132, along with the t-value and barycentric coordinates of the intersection. This may be referred to as the "Triangle" hit type. In some embodiments, by default, intersected triangles with the alpha bit set are returned to SM 132 even if traversal has not completed. As described in more detail below, a traversal stack returned to the SM with the intersection may contain the state required to continue traversal if software determines that the triangle was actually transparent. Triangle intersection in some embodiments is not supported for beams, so encountered triangle ranges may, by default, be returned to SM 132 as a "TriRange" hit type, which includes a pointer to the first triangle block overlapping the range, parameters specifying the range, and the t-value (e.g. parametric distance(s) of the intersection) of the intersection with the leaf bounding volume.

Each ray presented for querying by the streaming processor (e.g., SM 132) to the tree traversal unit (e.g., TTU 700) includes: (1) ray geometric parameters such as, for example, the ray's position, direction vector, and the near and far parametric interval (tmin, tmax); (2) traversal state which may include a stack of one or more stack entries which reference blocks in the BVH tree structure which are to be fetched and tested against the ray for intersections; and (3) mode flags which describe how the ray is to handle specific types of interactions during traversal and RayOp information.

For each ray, the ray's geometric information such as, for example, the ray's origin, direction, and the near and far parametric interval, may be provided. The origin, direction, and the start and the end of the parametric interval may each be specified as coordinate tuples. The near and far parametric positions are referred to herein as tmin and tmax, respectively, and may be thought of as representing the segment of current interest along the ray. In some embodiments, a beam may be specified in the query. A beam is additionally specified by a second origin and direction.

An example query or ray data structure 1102 is shown in FIG. 11A. In some example embodiments, the ray information is communicated to the TTU by way of registers in the SM. In example embodiments in which ray data is passed to the TTU via memory, data structure 1102, or part thereof, may reside in a memory to be read by the TTU. Ray data structure 1102 may include a ray identifier 1104 which may be assigned by the TTU or the SM to uniquely identify rays that are concurrently being processed in the TTU, ray origin 1106, ray direction 1108, ray start (tmin) 1110 and end (tmax) 1112 parameters. According to some embodiments, the ray information 1102 may also include ray flags 1114, RCT mode flags 1116 (also referred to as RCT mode bits), RPT mode flags 1118 (also referred to as RPT mode bits) and one or more ray operation (RayOps) specifications. Each RayOps specification may include a ray operation opcode 1120 and ray test parameters (e.g., ray parameters A & B) 1121. These ray data attributes are described below.

As will be described below, a "RayOp" test is performed for each primitive or child bounding box intersected by a ray using the ray's RayOp opcode, mode bits, and parameters A and B as well as one or more parameters (e.g., ChildType, "rval" parameter or "alpha" flag) specified with each intersected complet child or primitive. In example embodiments, the ChildType and rval parameters used in RayOp tests described below are specified for each child in a complet, or for the complet as a whole, and the RayOp opcode, mode bits, and parameters A and B are specified for each ray. An example of a data structure 1122 may hold RayOp-related information or a complet or bounding volume according to some embodiments is shown in FIG. 11B. According to some embodiments, data structure 1122 may be stored in a memory by software, and the TTU may either access the data structure in the memory and/or may receive the data structure into the TTU internal memory. The data structure 1122 may include header information 1124, one or more override flags 1126 and an rval 1128. Header information may include geometric information, node type information etc., related to the node. Override flags 1226 and rval parameter 1128 are described below.

Figure 12:
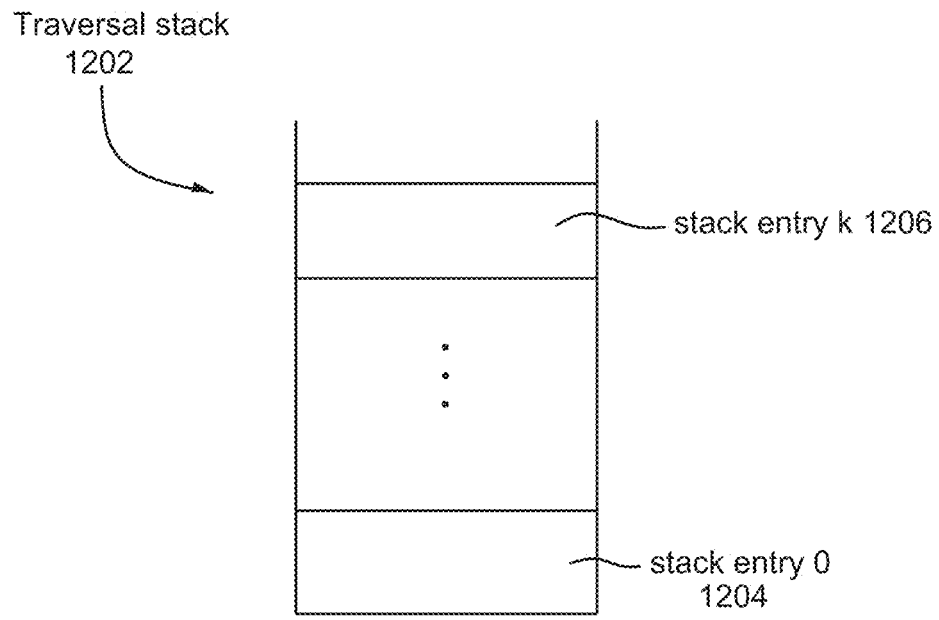
FIG. 12 illustrates an example traversal stack data structure, according to some embodiments.

During traversal of a BVH by a ray in the TTU, the traversal state for the ray is maintained in the TTU. The traversal state may include a stack of one or more entries which reference bounding volumes and/or complets in the tree structure which are to be fetched and tested against the ray. A traversal stack 1202 according to some embodiments is shown in FIG. 12. The traversal stack 1202 may include any number of stack entries. In some embodiments, the stack 1202 is limited to a small number of entries (e.g., a "short stack" of 4 entries) so that the exchange of the stack between the TTU and SM can be made more efficient. In FIG. 12, a bottom stack entry 1204 and a top stack entry 1206 are shown with one or more entries in between.

TTU 700, in at least some embodiments, is stateless. That is, no architectural state is maintained in the TTU between queries. The traversal stack enables the TTU to maintain state during a query, and pass that state to the SM as required. The software running on the SM can request continuation of a previous query by passing back to the TTU the state as contained in the traversal stack. The SM conveys traversal state for each query to the TTU using one or more stacks or other data structures of a specific size StackLimit (SL), and the TTU returns traversal state back to the SM using one or more stacks or other data structures of size SL. Within the TTU, each ray maintains one or more stacks or other data structures which may be of size>=SL.

Figure 13:
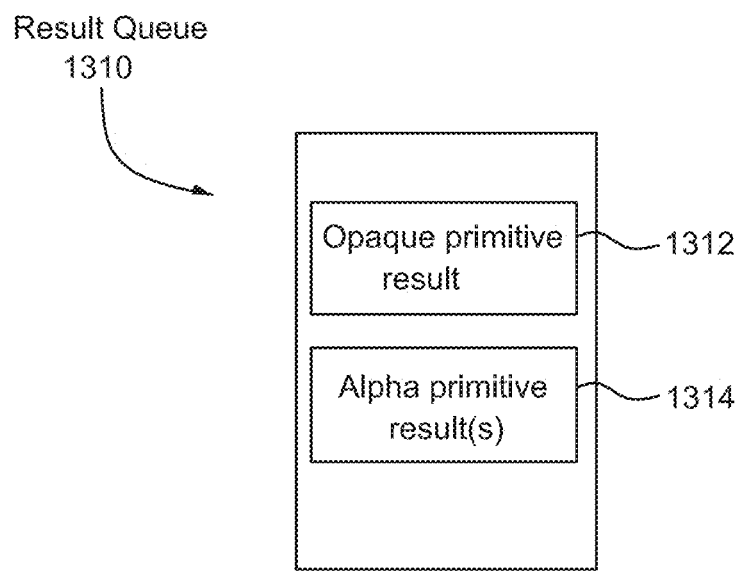
FIG. 13 shows an example result queue data structure, according to some embodiments.

FIG. 13 shows an example results queue according to some embodiments. A result queue, as described elsewhere, is used for the TTU to transmit information about the intersections detected so far to the SM. In some embodiments, the result queue 1310 is small and may only accommodate an opaque primitive intersection result 1312 and/or one or more alpha primitive intersection result 1314. However, in other embodiments, the result queue may accommodate more entries representing detected intersections.

The diagrams of FIGS. 10B and 10C above summarize the ray-tracing pipeline and shows the data flow and interaction between components for a representative use case: tracing rays against a scene containing primitives such as triangles, with instance transformations and certain intersection tests being handled in hardware. As described in relation to FIG. 10B, one or more rays can be presented to the TTU at a time for querying by the SM, and each ray presented to the TTU for traversal may include the ray's geometric parameters, traversal state, and the ray's ray flags, mode flags and RayOp information. The traversal operations of FIGS. 10B and 10C may use a ray data structure such as that shown in FIG. 11A, a node data structure such as that shown in FIG. 11B, one or more traversal stacks such as that shown in FIG. 12 and a result queue such as that shown in FIG. 13. A result queue can in some embodiments be a single entry that holds an opaque or an alpha result.

The mode flags enable traversal behavior to be changed by e.g., specifying an auxiliary arithmetic or logical test in the form of a RayOp to suppress, override, or allow storage of an intersection encountered during a traversal such as that shown in FIG. 10B. As noted in relation to FIG. 10B, this capability can be used by applications to dynamically and/or selectively enable/disable sets of objects for intersection testing versus specific sets or groups of queries, for example, to allow for different versions of models to be used when game state changes (for example, when doors open or close) or to provide different versions of a model which are selected as a function of the length of the ray to realize a form of geometric level of detail, or to allow specific sets of objects from certain classes of rays to make some layers visible or invisible in specific views. This capability also allows changing alpha to opaque and vice versa. The mode flags may enable traversal behavior to be changed in accordance with such aspects as, for example, a depth (or distance) associated with each bounding volume and/or primitive, size of a bounding volume or primitive in relation to a distance from the origin or the ray, particular instances of an object, etc.

The set of mode flags presented with each query (e.g., ray) may at least partly control how the TTU will process the query when the query intersects the bounding volume of a specific type or intersects a primitive of a specific primitive type. In addition to the set of mode flags which may be specified separately for the ray-complet intersection and for ray-primitive intersections, the ray data structure may specify other RayOp test related parameters, such as the ray flags, ray parameters and the RayOp test. The TTU reserves a "ray slot" for each active ray being processed in the TTU, and may store the ray flags, mode flags and/or the RayOp information in the corresponding ray slot buffer within the TTU during traversal.

The ray flags can be used by the TTU to control various aspects of traversal behavior, back-face culling, and handling of the various child node types, subject to a pass/fail status of an optional RayOp test. RayOp tests, therefore, add flexibility to the capabilities of the TTU, at the expense of some complexity.

FIG. 14 shows a flowchart of a process 1400 that may be performed when a ray-bounding volume intersection is detected during ray tracing pipeline processing. For example, process 1400 may be performed when a ray-bounding volume intersection is detected in step 1010 and/or 1024 shown in FIG. 10B (e.g., in the top level traversal and/or in the bottom level traversal) with respect to process shown in FIG. 10B. Ray-bounding volume intersection tests 1010 and/or 1024 may be performed in TTU 700 in the ray-complet test block 710.

The intersection detection at step 1402 may occur when testing a retrieved complet, or more specifically, testing a child bounding volume included in the retrieved complet. According to example embodiments, when a complet is processed, the TTU may optionally perform the RayOp test on each child. In some embodiments, the RayOp test is run only on the children whose corresponding bounding volume was intersected by the ray.

Thus at step 1404, it is determined that the fetched complet has at least one child, and at step 1406 the child bounding volumes are accessed and tested in parallel. In some embodiments, each retrieved complet has zero or one parent complet and zero or more complet children and zero or more leaf node children. In some embodiments, each fetched complet references its parent complet with a parent pointer or offset, encodes child pointers in compressed form, and provides a per-child struct containing a child bounding box and per-child data used by the RayOp test (e.g. Rval, invert RayOp result flag), and (in the case of leaf nodes) data used to address and process blocks of leaf nodes (e.g. item count, starting primitive index, number of blocks in leaf, a flag indicating the presence of alpha primitives). In some embodiments, processing steps 1408-1414 may be performed in parallel for all children bounding volumes. In yet other embodiments, processing steps 1408-1414 may be performed child-by-child, in parallel for groups of child bounding volumes. etc.

Each of the child bounding volumes of the intersected parent are potential traversal targets. In example embodiments, an instance node is a leaf node that points to the root node of another BVH. The RayOp test may be performed on the child nodes of an intersected parent based upon the child bounding volume information available in the already retrieved complet, before determining whether or not to retrieve the complets corresponding to the respective child nodes for traversal.

At step 1408, the RayOp test specified for the ray is performed with respect to the accessed child bounding volume. As noted above in relation to FIG. 11A, the RayOp opcode may be specified as part of the ray data provided to the TTU 700 from the SM 132. In example embodiments, when the ray-bounding volume intersection is detected at ray-complet test block 710, the traversal logic block 712 may perform the RayOp test based on the ray and the intersected bounding volume's child nodes. More specifically, the RayOp test specified by the particular RayOp opcode specified for the ray is performed using the ray's RayOp A, B parameters and the RayOp rval parameter specified for the child bounding volume. In some embodiments, the RayOp test is performed only for child bounding volumes that are themselves found to intersect the ray. For example, when the RCT unit tests a ray against a complet, each of the complet's child bounding volumes are also tested for intersection with the ray and, for each child that is found to intersect the ray, the RayOp test is performed.

An example RayOp test may provide for testing a left hand side numerical value based on a ray parameter with respect to a particular arithmetic or logic operation, against a right hand side value based on a ray parameter and a parameter of the intersected node. The RayOp test may be an arithmetic or a logical computation that results in a true/false output. The particular computation (e.g., the particular relationship between the RayOp A and B parameters, the RayOp opcode and the rval parameter) may be configurable, and/or may be preprogrammed in hardware. In some embodiments, each ray may specify one of a plurality of opcodes corresponding to respective RayOp tests. Thus, the RayOp test provides a highly flexible technique by which rays can change the default ray tracing behavior of the TTU 700 on an individual or group basis.

The RayOp tests may include any of, but are not limited to, the arithmetic and/or logic operations ALWAYS, NEVER, EQUAL, NOTEQUAL, LESS, LEQUAL, GREATER, GEQUAL, TMIN_LESS, TMIN_GEQUAL, TMAX_LESS, TMAX_GEQUAL, as opcodes. The opcode specified in a ray may, in some embodiments, be any logical or arithmetic operation.

For example, if the ray's RayOp opcode is defined in the ray information provided to the TTU as "EQUAL", and the RayOp A and B parameters are 0x0 and 0xFF, respectively, and the accessed child bounding volume's RayOp rval is 0x1, the RayOp test may be "A EQUAL rval && B". Thus, with the above noted values for the various parameters and opcode, the RayOp test yields "0x00==0x1 && 0xFF". Thus, (since this is false) the RayOp test in this example must return false. That is, in this particular example, the RayOp test fails for the ray and the accessed child bounding volume.

In some embodiments, the child bounding volume may also have an invert ("e.g., inv") parameter associated with the RayOp testing. If the ray also has an invert parameter associated with the RayOp, and the invert parameter is set to TRUE (e.g., 1), then the returned RayOp result may be the inverse of the actual RayOp test result. For example, if the ray's invert parameter was set to TRUE, then the RayOp test in the above example would return TRUE. RayOps may be comparable to the Stencil Test in raster graphics, except that Stencil Test has the ability to allow a fragment write to occur even when the fragment failed the Depth Test. In example embodiments, the RayOps do not have the capability to convert a missed complet child into a hit complet child, but in other embodiments the TTU could allow programmability so a RayOp could treat a miss as if it were a hit.

It is not necessary that the RayOp test has the parameters and the opcode arranged in a relationship such as "A EQUAL rval && B". Example embodiments may have the parameters and the opcode arranged in any logical or arithmetic relationship. In some embodiments, for example, the relationship may be of a form such as "TMIN_LESS rval" or "TMIN_LESS A & rval", expressing a relationship between a specified area of interest and either the node parameter alone or a combination of the ray parameters and the node parameter. The example opcodes TMIN_LESS, TMIN_GEQUAL, TMAX_LESS, TMAX_GEQUAL all enable the RayOp test to be based upon the intersection's start or end (e.g., TMIN and TMAX in the above opcodes may represent the t values at the ray's entry to and exit from the intersected volume (e.g., bbox.tmin, bbox.tmax below), respectively), and to include aspects of either the tested node alone or the tested node and the ray parameters A and/or B. For example, when rval is encoded with a distance value for the node, "TMIN_LESS rval" may represent a test such as "is the tested node at a distance less than the beginning of the area of interest?". Opcodes based on aspects of the ray other than start/end of the ray are also possible, and may be used for the RayOp in other embodiments. In contrast to opcodes that encode an aspect of the ray's geometric properties, example opcodes ALWAYS, NEVER, EQUAL, NOTEQUAL, LESS, LEQUAL, GREATER, GEQUAL enable an arbitrarily-specified left hand side value to be compared to an arbitrarily-specified right hand side value. Thus, example opcodes ALWAYS, NEVER, EQUAL, NOTEQUAL, LESS, LEQUAL, GREATER, GEQUAL may be used for RayOp tests that depend on some geometric aspects of either the ray or the tested node, and moreover may be used for RayOp tests that are independent of any geometric properties of either or both the ray and the tested node. Thus, in example non-limiting embodiments, "FLT_TMIN_LESS", "FLT_TMIN_GEQUAL" and "FLT_TMAX_LESS", and "FLT_TMAX_GEQUAL" RayOp tests actually evaluate the expressions bbox.tmin<A*rval+B, bbox tmin>=A*rval+B, bbox.tmax<A*rval+B, bbox.tmax>=A*rval+B, respectively. In one particular non-limiting embodiment, rval is an FP0.6.2 value and A and B are FP1.5.10 values for these operations. Moreover, in some non-limiting example embodiments, since the FLT_TMIN and FLT_TMAX tests operate on the bounding box tmin and bounding box tmax values which may be geometric values computed in the intersection test, these RayOps may be used for geometric level-of-detail (e.g., where A corresponds to the cosine of the angle of the cone subtends the image plane pixel and B corresponds to the accumulated length of the previous bounces of the ray and rval corresponds to the max length of the bounding box). In some embodiments, the opcodes (e.g., FLT_TMIN_LESS, FLT_TMAX_LESS) provides for comparing a value computed during the ray/acceleration data structure intersection test scaled by one geometric attribute associated with the ray and biased by another geometric attribute associated with the ray to at least one geometric parameter associated with the at least one node.

At step 1410, one or more mode flags corresponding to the RayOp test result are identified. Each mode flag may be specified, for example, in a predetermined bit position in a ray data structure, and may include any number of bits. Each mode flag maps a result of the RayOp test or a combination of the result of the RayOp test and a node type of the tested node, to a particular action to be taken by the TTU. In some embodiments, the mode flags are separately specified with the ray for ray-complet testing and ray-primitive testing respectively. Thus, in response to completing the RayOp test at step 1410, the applicable mode flag(s) may be found in the RCT mode flags specified for the ray.

In the above example, since the RayOp test failed, the applicable mode flag(s) include the "ch_f mode flag". As described above, "ch_f" represents that the RayOp test failed for intersected child of type complet.

At step 1412, an action to be performed based on the identified mode flag(s) and/or ray flags is identified, and at step 1414, the action is performed.

RCT mode flags express for each complet child type (e.g., complets, instance leaf nodes, item range leaf nodes, primitive range leaf nodes) how the TTU is to handle ray intersections with child-bounding-volumes for child nodes of that type for those rays that pass or fail the RayOp test. Example RCT mode flags include "In_f", "In_p", "Ir_f", "Ir_p", "pr_f", "pr_p", "ch_f", and "ch_p".

The mode flag "In_f" ("modeInstanceNodeFail") specifies an action to be performed when the RayOp test fails for intersected child of type instance node ("InstanceNode"). The supported actions may include processing in TTU, culling (e.g., suppress push of instance node onto traversal stack), return as node reference, or return to SM.

The mode flag "In_p" ("modeItemRangePass") specifies an action to be performed upon the RayOp test passing for an intersected child of type instance node. The supported actions may include processing in TTU, culling (e.g., suppress push of instance node onto traversal stack), return as node reference, or return to SM.

The mode flag "Ir_f" ("modeItemRangeFail") specifies an action to be performed upon the RayOp test failing for an intersected child of type item range ("ItemRange"). The supported actions may include returning to SM (e.g., push item range hit into the result queue), culling (e.g., suppress storage of item range hit in the result queue), or return as node reference.

The mode flag "Ir_p" ("modeItemRangePass") specifies an action to be performed upon the RayOp test passing for an intersected child of type item range. The supported actions may include return to SM (e.g., push item range hit into the result queue), cull (e.g., suppress storage of item range hit in the result queue), or return as node reference.

The mode flag "pr_f" ("modePrimitiveRangeFail") specifies an action to be performed upon the RayOp test failing for an intersected child of type primitive range ("PrimitiveRange"). The supported actions may include processing in TTU (e.g., push entry onto traversal stack), cull (e.g., suppress push of triangle range stack entry onto traversal stack), return as node reference, or return to SM.

The mode flag "pr_p" ("modePrimitiveRangePass") specifies an action to be performed upon the RayOp test passing for intersected child of type primitive range. The supported actions may include processing in TTU (e.g., push entry onto traversal stack), cull (e.g., suppress push of primitive range stack entry onto traversal stack), return as node reference, or return to SM.

The mode flag "ch_f" ("modeCompletFail") specifies an action to be performed when the RayOp test fails for an intersected child of type complet ("complet"). The supported actions may include traversing in TTU, cull, or return as node reference.

The mode flag "ch_p" ("modeCompletPass") specify an action to be performed when the RayOp test passes for an intersected child of type complet. The supported actions may include traversing in TTU, cull, or return as node reference.

In some embodiments, in addition to the mode flag(s) selected in accordance with the RayOp test result, the selected action may be performed in a manner consistent with one or more ray flags specified in the ray data. The ray flags, such as ray flags 1214, may specify behavior independent of any particular intersection.

In example embodiments, the ray flags may specify an order of traversal for the bounding volumes, whether or not to pop the stack on return, whether or not to report node references to the SM when the ray's tmin tmax interval starts inside the node's bounding box, whether or not to return at the first hit of an intersection, front-facing settings, cull settings and the like.

The ray flags for traversal order may specify any one of: traversal in order of parametric distance along the ray, traversal in memory order of the bounding volumes and/or primitives, decreasing x coordinate, increasing x coordinate, decreasing y coordinate, increasing y coordinate, decreasing z coordinate, and increasing z coordinate, etc. More specifically, the traversal order dictates the order that stack entries get pushed onto the traversal stack when complet child bounding volumes are intersected by the ray. In particular, when a node is intersected, the traversal order specified by the ray flags may be used by the TTU to determine in which order the child nodes of the intersected node are to be pushed into the traversal stack. It is useful for example for tracing shadow rays that are set to return on the first hit found and not specifically the nearest hit, where it is desirable for such rays to first test against larger primitives (and thus more likely to be hit). If the BVH is built in such a manner that the memory order of leaf node children is largest-first, then it is desirable to choose memory order over t-order for such rays because it is more likely to return quicker to the SM and t-ordering is immaterial for such rays.

One may desired to change traversal order (t-order) for any of several reasons. For example, when trying to find the closest triangle, one would typically want to use—order so that those primitives that might come earlier in parametric length are tested first. If those primitives are intersected, then primitives and complets farther along the ray may not need to be tested. When trying to find any intersection (e.g., to test if a point is in shadow from a light), then one may not care about which specific primitives are intersected and may want to test the primitives that are most likely to be intersected first. In that case, the BVH builder may put the largest triangles earlier in the tree such that memory order will find them first.

The x/y/z ordering of traversal each may be used to approximate t-ordering in the case when t-ordering may not be consistent. Specifically, the t-intersection for a beam traversal and a ray traversal may not be consistent because the queries are different shapes. (e.g., they may be similar, but not identical). The x/y/z ordering, however, are each based on the bounding volume positions alone, and are consistent. If the processing requires something like sharing the stack between a beam and a ray, then one may use the consistent x/y/z ordering to get performance close to t-order.

The ray flags for indicating whether to pop the traversal stack on return (e.g., "noPopOnReturn"), may specify whether the stack is to be popped, and/or whether to return the result of the traversal without popping the stack. Returning the result of the traversal without popping the traversal stack may enable the SM to rerun the same traversal or modify the stack before starting a new traversal.

The ray flags controlling the reporting of hits (e.g., "reportOnEnter" flag) may specify that the TTU is to only report a child hit if AABB intersection point t is greater than or equal to the ray's tmin, and to cull (and/or not report to the SM) otherwise. This flag enables a bounding volume to not be reported to the SM even if it is intersected, if that intersection point (upon the ray's entry to the bounding volume) occurs before the ray's specified area of interest. One example use of this flag is for ray marching where after finding an intersection, the tmin is advanced to be the start of that intersection. On relaunch one may want to find the next intersection, but typically would not want to report again the intersection that was just returned. By setting the reportOnEnter flag, returning the intersection again to the SM can be avoided because a relaunched ray does not enter the volume, but rather starts inside of it.

The ray flags controlling whether to terminate upon the first hit (e.g., "terminateOnHit") specifies whether the TTU is to return at the first hit for the ray found during traversal, or to keep on traversing until it can return the parametrically nearest hit found.

The ray flags(s) that indicate what triangles are to be considered front facing (e.g., "facingfrontFaceCW") may be used to specify certain treatment of intersected leafs. For example, these flags may specify treatment of counterclockwise winding triangles as front facing, or treatment of clockwise winding triangles as front facing assuming right-handed coordinate system.

Ray flags controlling culling of intersected primitives (e.g. "cullMode") may be specified to indicate no culling, cull back-facing primitives, cull front facing primitives, or to disable culling and primitive edge testing.

The traversal logic (e.g., traversal logic block 712) performs the action enumerated by the appropriate mode flag(s) based on the result of the RayOp test (or the inverse of the result of the RayOp test, if the child invert flag is set). In the above example, since the ch_f mode flag indicates that the child bounding volume is to be culled when they RayOp test fails, then the traversal logic will not push a stack entry onto the ray's traversal stack for this child bounding volume even though the ray may intersect the child's bounding volume and the default behavior for intersected child bounding volumes is for the child to be pushed into the traversal stack. Note that ray could have, instead of specifying a value for ch_f mode flag indicating that the child is to be culled if the RayOp test fails, indicated alternatively that the child is to be traversed in the TTU, or be returned as a node reference.

The action by the traversal logic may be performed in a manner consistent with ray flags of the ray. For example, where the ray flags indicate a particular traversal order, the child bounding volumes selected for traversal in accordance with the RayOp test may be pushed to the traversal stack in a manner consistent with the traversal order specified by the corresponding ray flag(s).

Steps 1404-1414 may be repeated for each child of the intersected bounding volume. When each of the child nodes, or at least each of the child nodes that are themselves found to intersect with the ray have had a RayOp performed, the parent bounding volume has completed its traversal step. That is, in the case where a complet includes only a root bounding volume and its child bounding volumes, the traversal of that complet has completed. More generally, as when the complet includes a root and more than one level of nodes, the traversal of the complet is complete when all the leaf nodes of the complet, or at least all those that have not been culled, have been subjected to the ray-bounding volume intersection test and/or the RayOp test.

FIG. 15 shows a flowchart of a process 1500 that may be performed at, for example, step 1414 in process 1400 when an intersected bounding volume is a leaf.

At step 1502, information regarding the ray-bounding volume intersection detection is received. The next step may be determined based on the type of scene geometry contained in the intersected leaf bounding volume. Instance nodes, item ranges, and primitive ranges are processed in steps 1504, 1508 and 1512, respectively.

If the scene geometry in the intersected bounding volume includes an instance node, at step 1504 ray-instance node intersection detection is performed. If the ray is determined to intersect the instance node, an entry is pushed to the traversal stack with the following information: an address of the instance node which specifies a transformation from the current (e.g., world) coordinate space to a different coordinate space and a pointer to the root of another BVH in another (e.g., object) coordinate space, a "returnToSM" flag indicating whether to return the query to the SM so that the SM can save off the traversal state of the query in the current BVH and apply the transformation, and an "initialized" flag indicating whether the ray (or another instance of the ray cloned from the world space ray) has already been initialized.

If the scene geometry in the intersected bounding volume includes an item range, at step 1506, ray-item range intersection detection is performed. Based on the intersection detection, an entry is pushed on to the traversal stack with the following information: a start address specifying the starting address of the item range data, and a count indicating the number of items in the range.

If the scene geometry in the intersected bounding volume includes a primitive range, at step 1512 ray-primitive range intersection detection is performed. At step 1514, it is determined whether to process the primitives/primitive range in the TTU, or to push an entry into the traversal stack with the following information: the address of the last block in the primitive range ("addrLast"), the index of the first primitive of the primitive range in the first cacheline ("triIdx"), the index of the last primitive in the last cacheline in the range, or zero indicating that the range ended in the last cacheline ("triEnd"), number of blocks that contain the primitive range ("lines"), a "co flag" indicating whether or not opaque primitives are to be culled, a "ca flag" indicating whether or not alpha primitives are to be culled, and a "rp flag" indicating whether or not the primitive range RayOp test was passed.

In cases where the RayOp and mode flags indicate that the result is to be returned to the streaming processor for special handling, the ray, its traversal state, and its result queue contents are returned to the streaming processor in their entirety. The streaming processor can perform whatever additional processing that may be required (for example, interpolating texture coordinates and evaluating an alpha texture to determine whether an alpha intersection is to be ignored or not) and if necessary, the streaming processor can resubmit the query with the same or altered query parameters (for example, the ray may be shortened when resubmitted by pulling tmax closer).

FIG. 16 shows a flowchart of a process 1600 that may be performed when, for example, in the operation of step 1502, a ray-bounding volume intersection 1602 is detected with respect to a leaf bounding volume that includes a primitive range (e.g., a triangle range) that can be resolved in the TTU.

At step 1604, the RayOp test for the ray is performed with respect to the bounding volume. When the RCT unit 710 intersects a child bounding volume which references a primitive range the TL subunit 712 performs the RayOp test specified by the ray's RayOp query parameters using the ray's A, B parameters and the complet child's rval parameter and stores the result of the RayOp test in the rp flag stored in the stack entry corresponding to the primitive range that gets pushed onto the top of the traversal stack, as described in relation to operation 1518 above.

When the stack management unit 740 pops that entry off the top of the stack and sends an activation to the primitive scheduler, the rp flag is forwarded by the primitive scheduler on to the RPT unit 720 along with that activation. When the RPT 720 detects an opaque intersection or alpha intersection the RPT 720 retrieves the mode flag(s) corresponding to the type of primitive hit and the rp flag and applies the appropriate action to handle the intersection. For example, if a ray with rp flag=TRUE intersects an opaque primitive, and the ray's "op_p" flag indicates that opaque primitive hits from passing RayOp tests are to be culled, then the RPT 720 will not push the opaque intersection to the result queue.

At step 1606, the result of the RayOp test is stored in the rp flag, and an entry including the rp flag is pushed on to the traversal stack.

At step 1608, the stack is popped and the rp flag is provided to the ray-primitive test block (e.g., ray/triangle test 1026 in FIG. 10B).

When the stack management unit pops that entry off the top of the stack and sends an activation to the primitive scheduler, the rp flag is forwarded by the primitive scheduler on to the RPT unit along with that activation.

At step 1610, in the ray-primitive testing, detect intersection between the ray and the primitive. When the RPT detects an opaque intersection or alpha intersection the RPT retrieves the mode flag(s) corresponding to the type of primitive hit and the rp flag and applies the appropriate action to handle the intersection.

RPT mode flags specify TTU behavior as a result of completed ray-primitive testing. Example RPT mode flag "at_f" ("modeAlphaFail") specify actions to be performed upon the RayOp test failing for an intersected alpha primitive. The supported actions may include pushing alpha hits to a result queue (e.g., result 1310) to be communicated to SM, cull alpha hit (suppress alpha primitive test), or push alpha hit to the result queue as an opaque hit. Another example RPT mode flags include mode flag "at_p" ("modeAlphaPass") which specify actions to be performed when the RayOp test passes for an intersected alpha primitive. The supported actions may include pushing the alpha primitive hit to result queue, culling alpha hit, and pushing alpha hit to the result queue as an opaque hit.

The mode flag "ot_f" ("modeOpaqueFail") specify an action to be performed when the RayOp test fails for an intersected opaque primitive. The supported actions may include pushing an opaque hit to the result queue, culling opaque hit, and pushing opaque hit to result queue as an alpha hit. The mode flag "op_p" ("modeAlphaPass") specify an action to be performed when the RayOp test passes for an intersected opaque primitive. Supported actions may include pushing opaque hit to result queue, culling an opaque hit, and pushing an opaque hit to result queue as an alpha hit.

Some nodes or leafs (e.g. instance nodes, primitive ranges) may also include flags which interact with and/or override the RayOp test and mode flags. For example, the instance node header has flags "foa" (force opaque to alpha), "fao" (force alpha to opaque), and "fnc" (force no cull) may override the values of mode flags "op_p", "op_f", "ap_f", "ap_p" of an object space ray to override the values copied from its corresponding world space ray. In example embodiments, the ray mode bits for lower-bvh traversal are copied from the upper-bvh ray mode bits.

At step 1612, the action is selected based on the rp flag and the ray primitive mode flags. For example, if a ray with rp flag=TRUE intersects an opaque primitive, and the ray's "op_p" flags indicate that opaque primitive hits from passing RayOp tests are to be culled, then the RPT will not push the opaque intersection to the result queue. The selection of the action may also consider any override parameters specified in the tested primitive(s) and/or other ray flags.

As described above, example embodiments provide a capability to programmatically change the default behavior of the traversal of an acceleration structure by a query. In some example embodiments, these capabilities are enabled within the chip-area constraints and other hardware constraints imposed upon hardware acceleration of the traversal. The capabilities enabled by embodiments provide, among other aspects, for an applications to selectively process geometric primitives of an object at certain depth levels for ray tracing, to select among multiple versions of an object in the BVH during ray tracing, selectively treat geometric primitives of objects based on level of geometric detail, selectively treat geometric primitives of objects based on level of resolution, selectively treat geometric primitives of objects based on type of material, selectively treat geometric primitives of objects based on how far along the ray they are intersected, etc. Example embodiments may also enable on a per-ray basis to perform operations such as, for example, back face culling, which provides for ignoring all primitives that are pointed away from the origin of the particular ray, and front face culling, which provides for ignoring all primitives that are pointed toward the origin of the particular ray. Moreover, some example embodiments, also provide for overriding per-ray behavior for particular intersections: for example, some nodes of the BVH, such as instance nodes, may have override flags that can override a per-ray behavior such as back face culling on an instance basis so that for objects such as foliage where a single triangle primitive represents a leaf, a ray is intersected with it regardless whether the triangle is back facing.

Although example embodiments were described with respect to a BVH as the acceleration structure and a ray as the query, embodiments are not limited thereto. For example, in some other embodiments, the query may comprise a beam or other geometric shape, rather than a ray, and/or hierarchical structures different from a BVH described above may be used as the acceleration structure. A person of skill will also understand that the specific mode flags, RayOp opcodes, ray parameter values, rval parameters are examples, and that embodiments may include any combination of those and/or other parameters to provide the query-specific behavior modification of the traversal of an acceleration structure.

The capabilities described above can be implemented in, or in association with, a parallel processing unit such as that described below in relation to FIGS. 17-23.

More Detailed TTU and GPU Architecture

More illustrative information will now be set forth regarding various optional architectures and features with which the foregoing framework may or may not be implemented, per the desires of the user. It should be strongly noted that the following information is set forth for illustrative purposes and should not be construed as limiting in any manner Any of the following features may be optionally incorporated with or without the exclusion of other features described.

Parallel Processing Architecture

Figure 17:
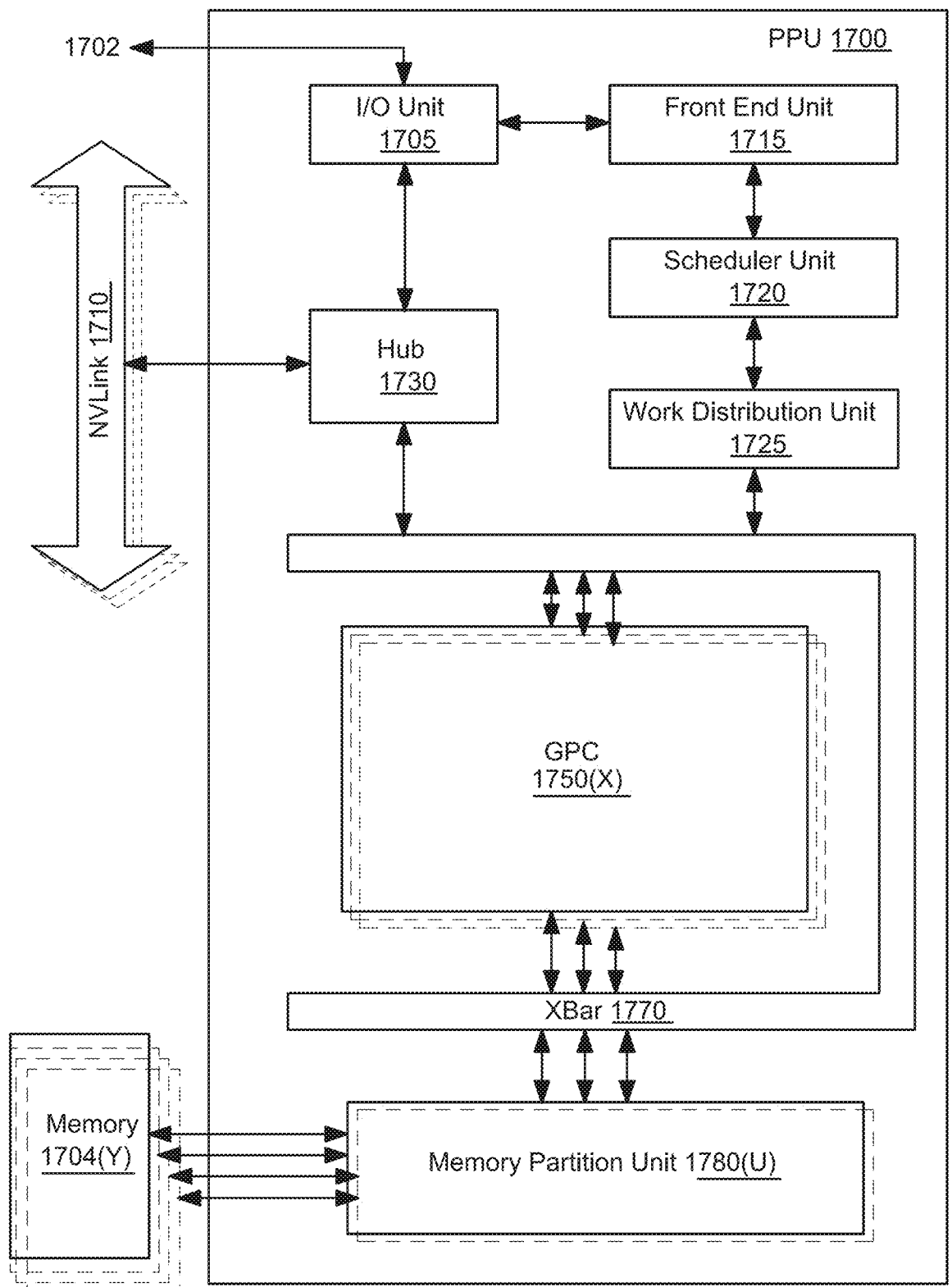
FIG. 17 illustrates an example parallel processing unit (PPU).

FIG. 17 illustrates a parallel processing unit (PPU) 1700, in accordance with an embodiment. In an embodiment, the PPU 1700 is a multi-threaded processor that is implemented on one or more integrated circuit devices. The PPU 1700 is a latency hiding architecture designed to process many threads in parallel. A thread (i.e., a thread of execution) is an instantiation of a set of instructions configured to be executed by the PPU 1700. In an embodiment, the PPU 1700 is a graphics processing unit (GPU, for example, such as that described in relation to FIG. 1) configured to implement a graphics rendering pipeline for processing three-dimensional (3D) graphics data in order to generate two-dimensional (2D) image data for display on a display device such as a liquid crystal display (LCD) device. In other embodiments, the PPU 1700 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

One or more PPUs 1700 may be configured to accelerate thousands of High Performance Computing (HPC), data center, and machine learning applications. The PPU 1700 may be configured to accelerate numerous deep learning systems and applications including autonomous vehicle platforms, deep learning, high-accuracy speech, image, and text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and the like.

As shown in FIG. 17, the PPU 1700 includes an Input/Output (I/O) unit 1705, a front end unit 1715, a scheduler unit 1720, a work distribution unit 1725, a hub 1730, a crossbar (Xbar) 1770, one or more general processing clusters (GPCs) 1750, and one or more partition units 1780. The PPU 1700 may be connected to a host processor or other PPUs 1700 via one or more high-speed NVLink 1710 interconnect. The PPU 1700 may be connected to a host processor or other peripheral devices via an interconnect 1702. The PPU 1700 may also be connected to a local memory comprising a number of memory devices 1704. In an embodiment, the local memory may comprise a number of dynamic random access memory (DRAM) devices. The DRAM devices may be configured as a high-bandwidth memory (HBM) subsystem, with multiple DRAM dies stacked within each device.

The NVLink 1710 interconnect enables systems to scale and include one or more PPUs 1700 combined with one or more CPUs, supports cache coherence between the PPUs 1700 and CPUs, and CPU mastering. Data and/or commands may be transmitted by the NVLink 1710 through the hub 1730 to/from other units of the PPU 1700 such as one or more copy engines, a video encoder, a video decoder, a power management unit, etc. (not explicitly shown). The NVLink 1710 is described in more detail in conjunction with FIG. 22.

The I/O unit 1705 is configured to transmit and receive communications (i.e., commands, data, etc.) from a host processor (not shown) over the interconnect 1702. The I/O unit 1705 may communicate with the host processor directly via the interconnect 1702 or through one or more intermediate devices such as a memory bridge. In an embodiment, the I/O unit 1705 may communicate with one or more other processors, such as one or more of the PPUs 1700 via the interconnect 1702. In an embodiment, the I/O unit 1705 implements a Peripheral Component Interconnect Express (PCIe) interface for communications over a PCIe bus and the interconnect 1702 is a PCIe bus. In alternative embodiments, the I/O unit 1705 may implement other types of well-known interfaces for communicating with external devices.

The I/O unit 1705 decodes packets received via the interconnect 1702. In an embodiment, the packets represent commands configured to cause the PPU 1700 to perform various operations. The I/O unit 1705 transmits the decoded commands to various other units of the PPU 1700 as the commands may specify. For example, some commands may be transmitted to the front end unit 1715. Other commands may be transmitted to the hub 1730 or other units of the PPU 1700 such as one or more copy engines, a video encoder, a video decoder, a power management unit, etc. (not explicitly shown). In other words, the I/O unit 1705 is configured to route communications between and among the various logical units of the PPU 1700.

In an embodiment, a program executed by the host processor encodes a command stream in a buffer that provides workloads to the PPU 1700 for processing. A workload may comprise several instructions and data to be processed by those instructions. The buffer is a region in a memory that is accessible (i.e., read/write) by both the host processor and the PPU 1700. For example, the I/O unit 1705 may be configured to access the buffer in a system memory connected to the interconnect 1702 via memory requests transmitted over the interconnect 1702. In an embodiment, the host processor writes the command stream to the buffer and then transmits a pointer to the start of the command stream to the PPU 1700. The front end unit 1715 receives pointers to one or more command streams. The front end unit 1715 manages the one or more streams, reading commands from the streams and forwarding commands to the various units of the PPU 1700.

The front end unit 1715 is coupled to a scheduler unit 1720 that configures the various GPCs 1750 to process tasks defined by the one or more streams. The scheduler unit 1720 is configured to track state information related to the various tasks managed by the scheduler unit 1720. The state may indicate which GPC 1750 a task is assigned to, whether the task is active or inactive, a priority level associated with the task, and so forth. The scheduler unit 1720 manages the execution of a plurality of tasks on the one or more GPCs 1750.

The scheduler unit 1720 is coupled to a work distribution unit 1725 that is configured to dispatch tasks for execution on the GPCs 1750. The work distribution unit 1725 may track a number of scheduled tasks received from the scheduler unit 1720. In an embodiment, the work distribution unit 1725 manages a pending task pool and an active task pool for each of the GPCs 1750. The pending task pool may comprise a number of slots (e.g., 32 slots) that contain tasks assigned to be processed by a particular GPC 1750. The active task pool may comprise a number of slots (e.g., 4 slots) for tasks that are actively being processed by the GPCs 1750. As a GPC 1750 finishes the execution of a task, that task is evicted from the active task pool for the GPC 1750 and one of the other tasks from the pending task pool is selected and scheduled for execution on the GPC 1750. If an active task has been idle on the GPC 1750, such as while waiting for a data dependency to be resolved, then the active task may be evicted from the GPC 1750 and returned to the pending task pool while another task in the pending task pool is selected and scheduled for execution on the GPC 1750.

The work distribution unit 1725 communicates with the one or more GPCs 1750 via XBar 1770. The XBar 1770 is an interconnect network that couples many of the units of the PPU 1700 to other units of the PPU 1700. For example, the XBar 1770 may be configured to couple the work distribution unit 1725 to a particular GPC 1750. Although not shown explicitly, one or more other units of the PPU 1700 may also be connected to the XBar 1770 via the hub 1730.

The tasks are managed by the scheduler unit 1720 and dispatched to a GPC 1750 by the work distribution unit 1725. The GPC 1750 is configured to process the task and generate results. The results may be consumed by other tasks within the GPC 1750, routed to a different GPC 1750 via the XBar 1770, or stored in the memory 1704. The results can be written to the memory 1704 via the partition units 1780, which implement a memory interface for reading and writing data to/from the memory 1704. The results can be transmitted to another PPU 1704 or CPU via the NVLink 1710. In an embodiment, the PPU 1700 includes a number U of partition units 1780 that is equal to the number of separate and distinct memory devices 1704 coupled to the PPU 1700. A partition unit 1780 will be described in more detail below in conjunction with FIG. 18.

In an embodiment, a host processor executes a driver kernel that implements an application programming interface (API) that enables one or more applications executing on the host processor to schedule operations for execution on the PPU 1700. In an embodiment, multiple compute applications are simultaneously executed by the PPU 1700 and the PPU 1700 provides isolation, quality of service (QoS), and independent address spaces for the multiple compute applications. An application may generate instructions (i.e., API calls) that cause the driver kernel to generate one or more tasks for execution by the PPU 1700. The driver kernel outputs tasks to one or more streams being processed by the PPU 1700. Each task may comprise one or more groups of related threads, referred to herein as a warp. In an embodiment, a warp comprises 32 related threads that may be executed in parallel. Cooperating threads may refer to a plurality of threads including instructions to perform the task and that may exchange data through shared memory. Threads and cooperating threads are described in more detail in conjunction with FIG. 20.

Figure 19:
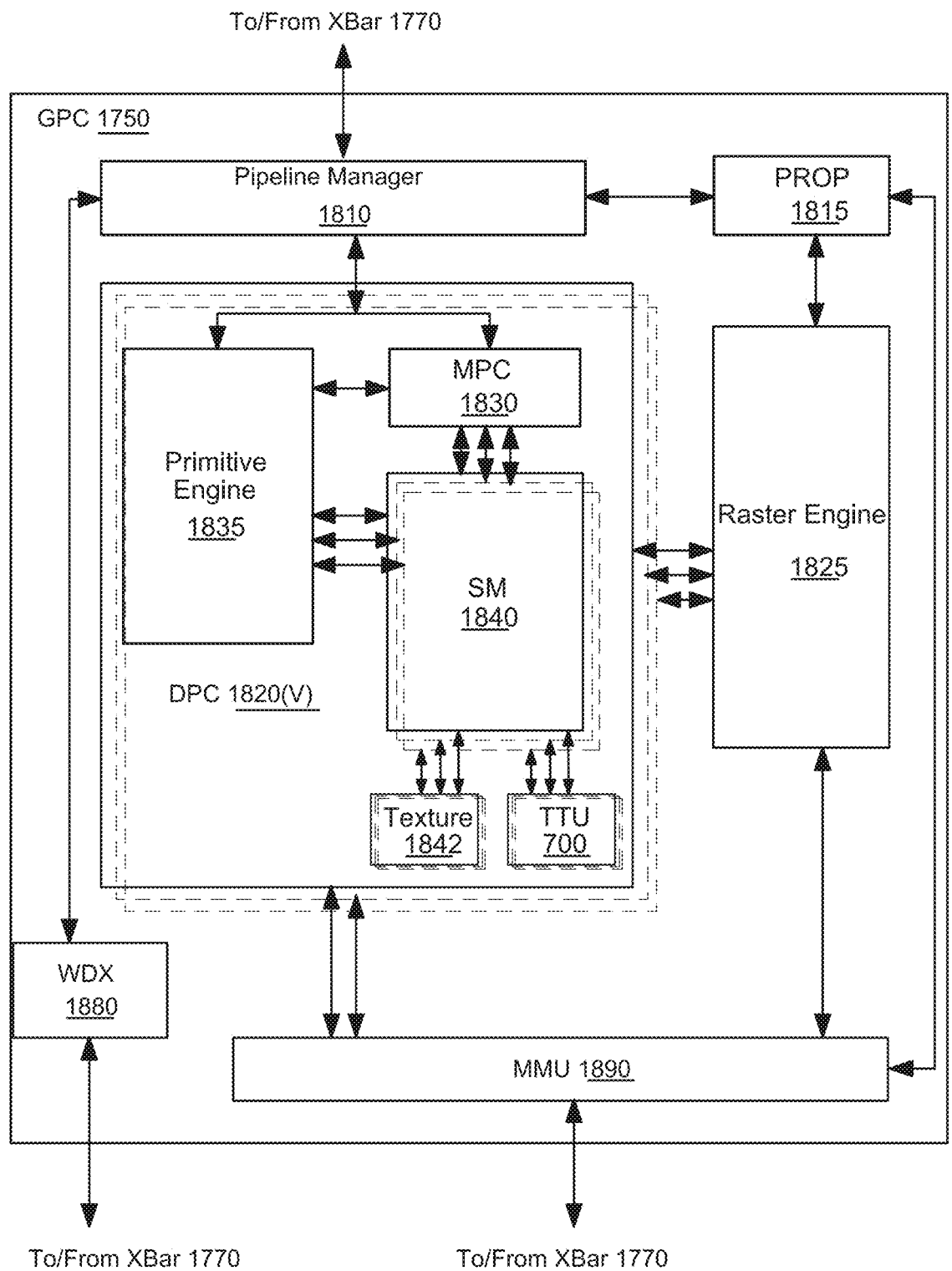
FIG. 19 illustrates an example general processing cluster (GPC) within the parallel processing unit of FIG. 17.

FIG. 19 illustrates a GPC 1750 of the PPU 1700 of FIG. 17, in accordance with an embodiment. As shown in FIG. 19, each GPC 1750 includes a number of hardware units for processing tasks. In an embodiment, each GPC 1750 includes a pipeline manager 1810, a pre-raster operations unit (PROP) 1815, a raster engine 1825, a work distribution crossbar (WDX) 1880, a memory management unit (MMU) 1890, and one or more Data Processing Clusters (DPCs) 1820. It will be appreciated that the GPC 1750 of FIG. 19 may include other hardware units in lieu of or in addition to the units shown in FIG. 19.

In an embodiment, the operation of the GPC 1750 is controlled by the pipeline manager 1810. The pipeline manager 1810 manages the configuration of the one or more DPCs 1820 for processing tasks allocated to the GPC 1750. In an embodiment, the pipeline manager 1810 may configure at least one of the one or more DPCs 1820 to implement at least a portion of a graphics rendering pipeline. For example, a DPC 1820 may be configured to execute a vertex shader program on the programmable streaming multiprocessor (SM) 1840. The pipeline manager 1810 may also be configured to route packets received from the work distribution unit 1725 to the appropriate logical units within the GPC 1750. For example, some packets may be routed to fixed function hardware units in the PROP 1815 and/or raster engine 1825 while other packets may be routed to the DPCs 1820 for processing by the primitive engine 1835 or the SM 1840. In an embodiment, the pipeline manager 1810 may configure at least one of the one or more DPCs 1820 to implement a neural network model and/or a computing pipeline.

Figure 18:
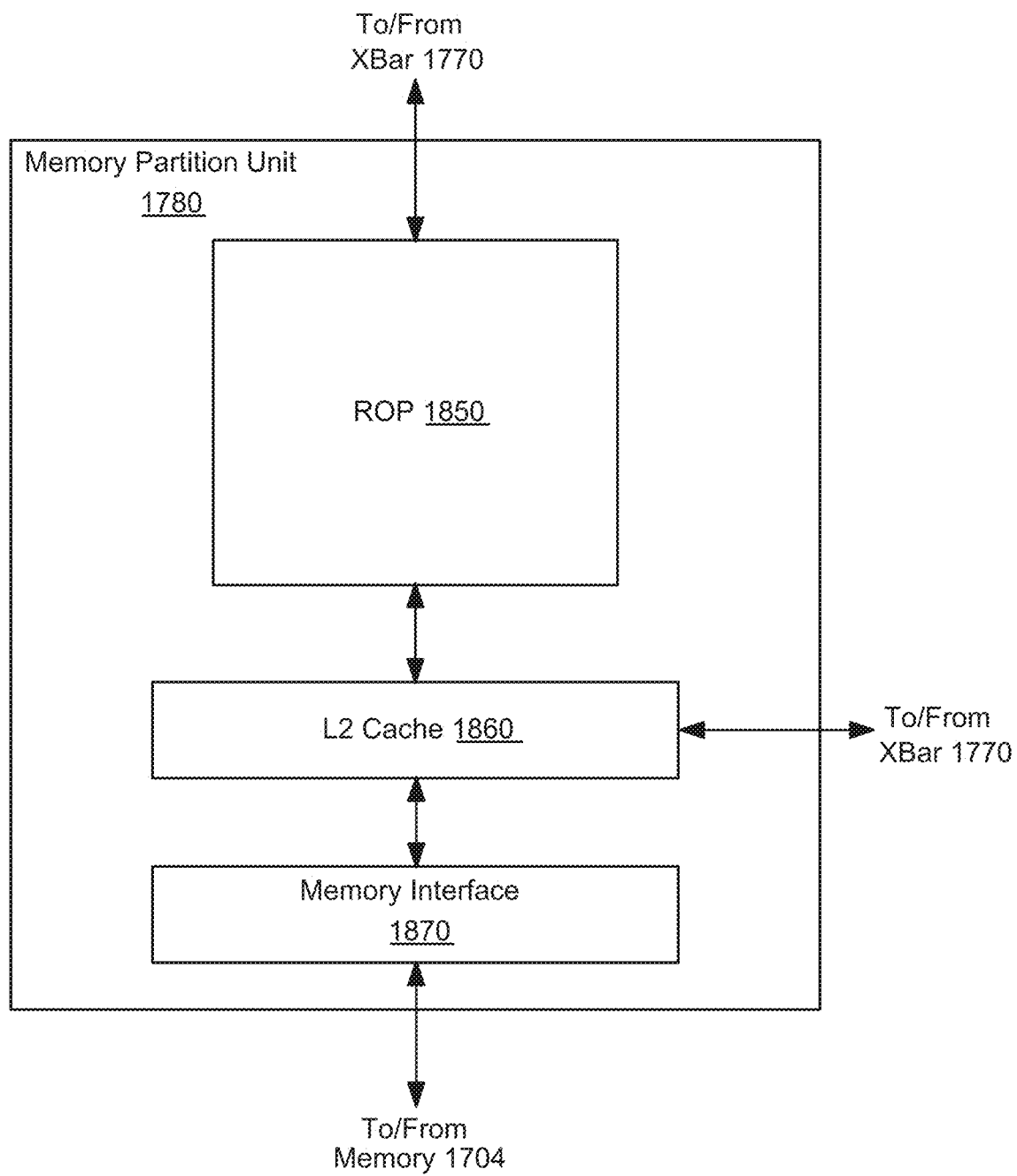
FIG. 18 illustrates an example memory partition unit.

The PROP unit 1815 is configured to route data generated by the raster engine 1825 and the DPCs 1820 to a Raster Operations (ROP) unit, described in more detail in conjunction with FIG. 18. The PROP unit 1815 may also be configured to perform optimizations for color blending, organize pixel data, perform address translations, and the like.

The raster engine 1825 includes a number of fixed function hardware units configured to perform various raster operations. In an embodiment, the raster engine 1825 includes a setup engine, a coarse raster engine, a culling engine, a clipping engine, a fine raster engine, and a tile coalescing engine. The setup engine receives transformed vertices and generates plane equations associated with the geometric primitive defined by the vertices. The plane equations are transmitted to the coarse raster engine to generate coverage information (e.g., an x,y coverage mask for a tile) for the primitive. The output of the coarse raster engine is transmitted to the culling engine where fragments associated with the primitive that fail a z-test are culled, and non-culled fragments are transmitted to a clipping engine where fragments lying outside a viewing frustum are clipped. Those fragments that survive clipping and culling may be passed to the fine raster engine to generate attributes for the pixel fragments based on the plane equations generated by the setup engine. The output of the raster engine 1825 comprises fragments to be processed, for example, by a fragment shader implemented within a DPC 1820.

Each DPC 1820 included in the GPC 1750 includes an M-Pipe Controller (MPC) 1830, a primitive engine 1835, one or more SMs 1840, one or more Texture Units 1842, and one or more TTU 1844. The TTU 1844 may operate similarly to TTU 700 described above. The MPC 1830 controls the operation of the DPC 1820, routing packets received from the pipeline manager 1810 to the appropriate units in the DPC 1820. For example, packets associated with a vertex may be routed to the primitive engine 1835, which is configured to fetch vertex attributes associated with the vertex from the memory 1704. In contrast, packets associated with a shader program may be transmitted to the SM 1840.

The SM 1840 comprises a programmable streaming processor that is configured to process tasks represented by a number of threads. Each SM 1840 is multi-threaded and configured to execute a plurality of threads (e.g., 32 threads) from a particular group of threads concurrently. In an embodiment, the SM 1840 implements a SIMD (Single-Instruction, Multiple-Data) architecture where each thread in a group of threads (i.e., a warp) is configured to process a different set of data based on the same set of instructions. All threads in the group of threads execute the same instructions. In another embodiment, the SM 1840 implements a SIMT (Single-Instruction, Multiple Thread) architecture where each thread in a group of threads is configured to process a different set of data based on the same set of instructions, but where individual threads in the group of threads are allowed to diverge during execution. In an embodiment, a program counter, call stack, and execution state is maintained for each warp, enabling concurrency between warps and serial execution within warps when threads within the warp diverge. In another embodiment, a program counter, call stack, and execution state is maintained for each individual thread, enabling equal concurrency between all threads, within and between warps. When execution state is maintained for each individual thread, threads executing the same instructions may be converged and executed in parallel for maximum efficiency. The SM 1840 will be described in more detail below in conjunction with FIGS. 20 and 21.

The MMU 1890 provides an interface between the GPC 1750 and the partition unit 1780. The MMU 1890 may provide translation of virtual addresses into physical addresses, memory protection, and arbitration of memory requests. In an embodiment, the MMU 1890 provides one or more translation lookaside buffers (TLBs) for performing translation of virtual addresses into physical addresses in the memory 1704.

FIG. 18 illustrates a memory partition unit 1780 of the PPU 1700 of FIG. 17, in accordance with an embodiment. As shown in FIG. 18, the memory partition unit 1780 includes a Raster Operations (ROP) unit 1850, a level two (L2) cache 1860, and a memory interface 1870. The memory interface 1870 is coupled to the memory 1704. Memory interface 1870 may implement 32, 64, 128, 1024-bit data buses, or the like, for high-speed data transfer. In an embodiment, the PPU 1700 incorporates U memory interfaces 1870, one memory interface 1870 per pair of partition units 1780, where each pair of partition units 1780 is connected to a corresponding memory device 1704. For example, PPU 1700 may be connected to up to Y memory devices 1704, such as high bandwidth memory stacks or graphics double-data-rate, version 5, synchronous dynamic random access memory, or other types of persistent storage.

In an embodiment, the memory interface 1870 implements an HBM2 memory interface and Y equals half U. In an embodiment, the HBM2 memory stacks are located on the same physical package as the PPU 1700, providing substantial power and area savings compared with conventional GDDR5 SDRAM systems. In an embodiment, each HBM2 stack includes four memory dies and Y equals 4, with HBM2 stack including two 128-bit channels per die for a total of 8 channels and a data bus width of 1024 bits.

In an embodiment, the memory 1704 supports Single-Error Correcting Double-Error Detecting (SECDED) Error Correction Code (ECC) to protect data. ECC provides higher reliability for compute applications that are sensitive to data corruption. Reliability is especially important in large-scale cluster computing environments where PPUs 1700 process very large datasets and/or run applications for extended periods.

In an embodiment, the PPU 1700 implements a multi-level memory hierarchy. In an embodiment, the memory partition unit 1780 supports a unified memory to provide a single unified virtual address space for CPU and PPU 1700 memory, enabling data sharing between virtual memory systems. In an embodiment the frequency of accesses by a PPU 1700 to memory located on other processors is traced to ensure that memory pages are moved to the physical memory of the PPU 1700 that is accessing the pages more frequently. In an embodiment, the NVLink 1710 supports address translation services allowing the PPU 1700 to directly access a CPU's page tables and providing full access to CPU memory by the PPU 1700.

In an embodiment, copy engines transfer data between multiple PPUs 1700 or between PPUs 1700 and CPUs. The copy engines can generate page faults for addresses that are not mapped into the page tables. The memory partition unit 1780 can then service the page faults, mapping the addresses into the page table, after which the copy engine can perform the transfer. In a conventional system, memory is pinned (i.e., non-pageable) for multiple copy engine operations between multiple processors, substantially reducing the available memory. With hardware page faulting, addresses can be passed to the copy engines without worrying if the memory pages are resident, and the copy process is transparent.

Data from the memory 1704 or other system memory may be fetched by the memory partition unit 1780 and stored in the L2 cache 1860, which is located on-chip and is shared between the various GPCs 1750. As shown, each memory partition unit 1780 includes a portion of the L2 cache 1860 associated with a corresponding memory device 1704. Lower level caches may then be implemented in various units within the GPCs 1750. For example, each of the SMs 1840 may implement a level one (L1) cache. The L1 cache is private memory that is dedicated to a particular SM 1840. Data from the L2 cache 1860 may be fetched and stored in each of the L1 caches for processing in the functional units of the SMs 1840. The L2 cache 1860 is coupled to the memory interface 1870 and the XBar 1770.

The ROP unit 1850 performs graphics raster operations related to pixel color, such as color compression, pixel blending, and the like. The ROP unit 1850 also implements depth testing in conjunction with the raster engine 1825, receiving a depth for a sample location associated with a pixel fragment from the culling engine of the raster engine 1825. The depth is tested against a corresponding depth in a depth buffer for a sample location associated with the fragment. If the fragment passes the depth test for the sample location, then the ROP unit 1850 updates the depth buffer and transmits a result of the depth test to the raster engine 1825. It will be appreciated that the number of partition units 1780 may be different than the number of GPCs 1750 and, therefore, each ROP unit 1850 may be coupled to each of the GPCs 1750. The ROP unit 1850 tracks packets received from the different GPCs 1750 and determines which GPC 1750 that a result generated by the ROP unit 1850 is routed to through the Xbar 1770. Although the ROP unit 1850 is included within the memory partition unit 1780 in FIG. 18, in other embodiment, the ROP unit 1850 may be outside of the memory partition unit 1780. For example, the ROP unit 1850 may reside in the GPC 1750 or another unit.

Example Streaming Multiprocessor

The SM 1840 comprises a programmable streaming processor that is configured to process tasks represented by a number of threads. Each SM 1840 is multi-threaded and configured to execute a plurality of threads (e.g., 32 threads comprising a warp) from a particular group of threads concurrently. In an embodiment, the SM 1840 implements a SIMD (Single-Instruction, Multiple-Data) architecture where each thread in a group of threads (i.e., a warp) is configured to process a different set of data based on the same set of instructions. All threads in the group of threads execute the same instructions. In another embodiment, the SM 1840 implements a SIMT (Single-Instruction, Multiple Thread) architecture where each thread in a group of threads is configured to process a different set of data based on the same set of instructions, but where individual threads in the group of threads are allowed to diverge during execution. In an embodiment, a program counter, call stack, and execution state is maintained for each warp, enabling concurrency between warps and serial execution within warps when threads within the warp diverge. In another embodiment, a program counter, call stack, and execution state is maintained for each individual thread, enabling equal concurrency between all threads, within and between warps. When execution state is maintained for each individual thread, threads executing the same instructions may be converged and executed in parallel for maximum efficiency.

Figure 20:
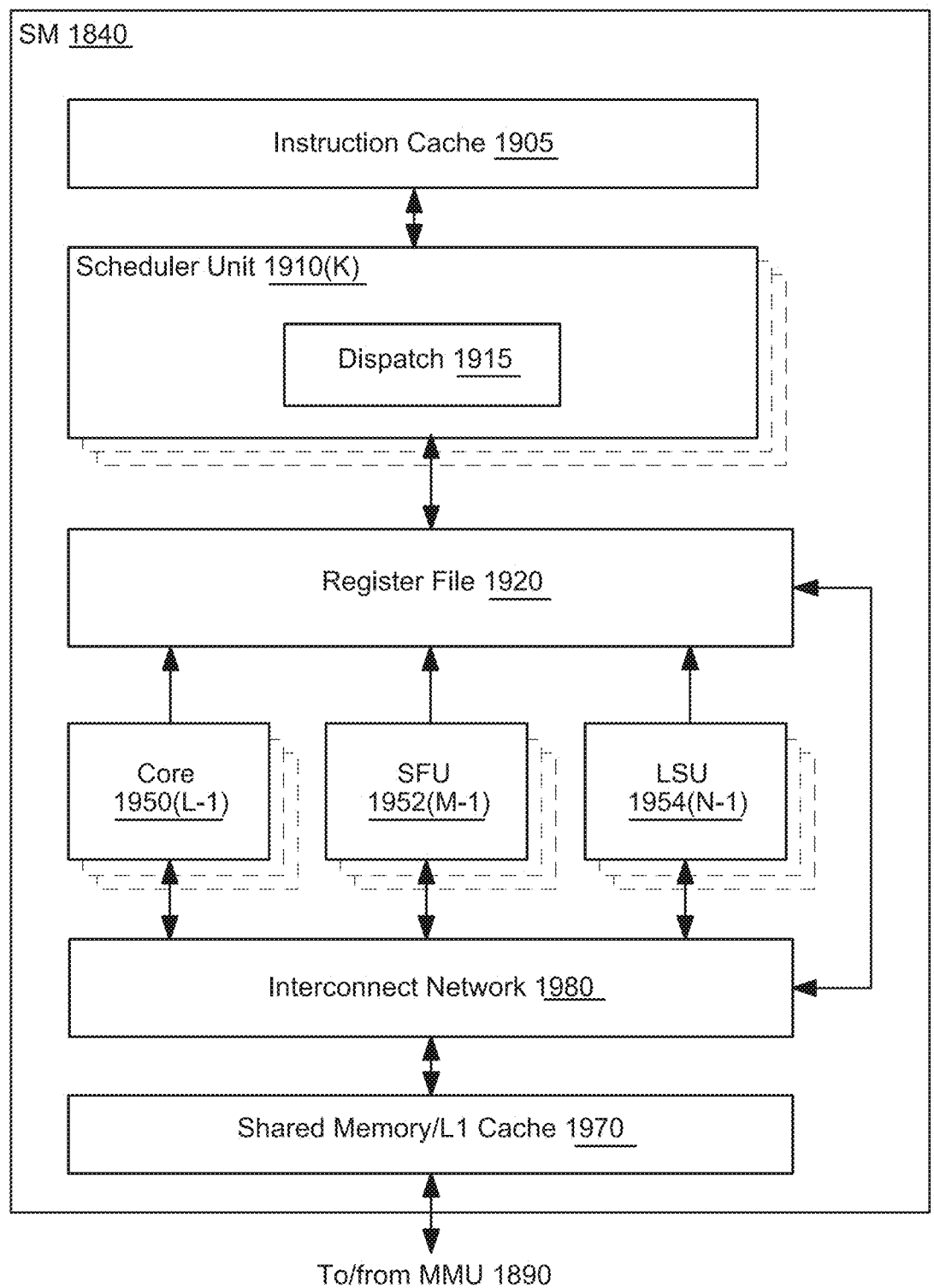
FIGS. 20 and 21 illustrate an example streaming multi-processor.

FIG. 20 illustrates the streaming multi-processor 1840 of FIG. 19, in accordance with an embodiment. As shown in FIG. 20, the SM 1840 includes an instruction cache 1905, one or more scheduler units 1910, a register file 1920, one or more processing cores 1950, one or more special function units (SFUs) 1952, one or more load/store units (LSUs) 1954, an interconnect network 1980, a shared memory/L1 cache 1970.

As described above, the work distribution unit 1725 dispatches tasks for execution on the GPCs 1750 of the PPU 1700. The tasks are allocated to a particular DPC 1820 within a GPC 1750 and, if the task is associated with a shader program, the task may be allocated to an SM 1840. The scheduler unit 1910 receives the tasks from the work distribution unit 1725 and manages instruction scheduling for one or more thread blocks assigned to the SM 1840. The scheduler unit 1910 schedules thread blocks for execution as warps of parallel threads, where each thread block is allocated at least one warp. In an embodiment, each warp executes 32 threads. The scheduler unit 1910 may manage a plurality of different thread blocks, allocating the warps to the different thread blocks and then dispatching instructions from the plurality of different cooperative groups to the various functional units (i.e., cores 1950, SFUs 1952, and LSUs 1954) during each clock cycle.

Cooperative Groups is a programming model for organizing groups of communicating threads that allows developers to express the granularity at which threads are communicating, enabling the expression of richer, more efficient parallel decompositions. Cooperative launch APIs support synchronization amongst thread blocks for the execution of parallel algorithms. Conventional programming models provide a single, simple construct for synchronizing cooperating threads: a barrier across all threads of a thread block (i.e., the syncthreads( ) function). However, programmers would often like to define groups of threads at smaller than thread block granularities and synchronize within the defined groups to enable greater performance, design flexibility, and software reuse in the form of collective group-wide function interfaces.

Cooperative Groups enables programmers to define groups of threads explicitly at sub-block (i.e., as small as a single thread) and multi-block granularities, and to perform collective operations such as synchronization on the threads in a cooperative group. The programming model supports clean composition across software boundaries, so that libraries and utility functions can synchronize safely within their local context without having to make assumptions about convergence. Cooperative Groups primitives enable new patterns of cooperative parallelism, including producer-consumer parallelism, opportunistic parallelism, and global synchronization across an entire grid of thread blocks.

A dispatch unit 1915 is configured to transmit instructions to one or more of the functional units. In the embodiment, the scheduler unit 1910 includes two dispatch units 1915 that enable two different instructions from the same warp to be dispatched during each clock cycle. In alternative embodiments, each scheduler unit 1910 may include a single dispatch unit 1915 or additional dispatch units 1915.

Figure 21:
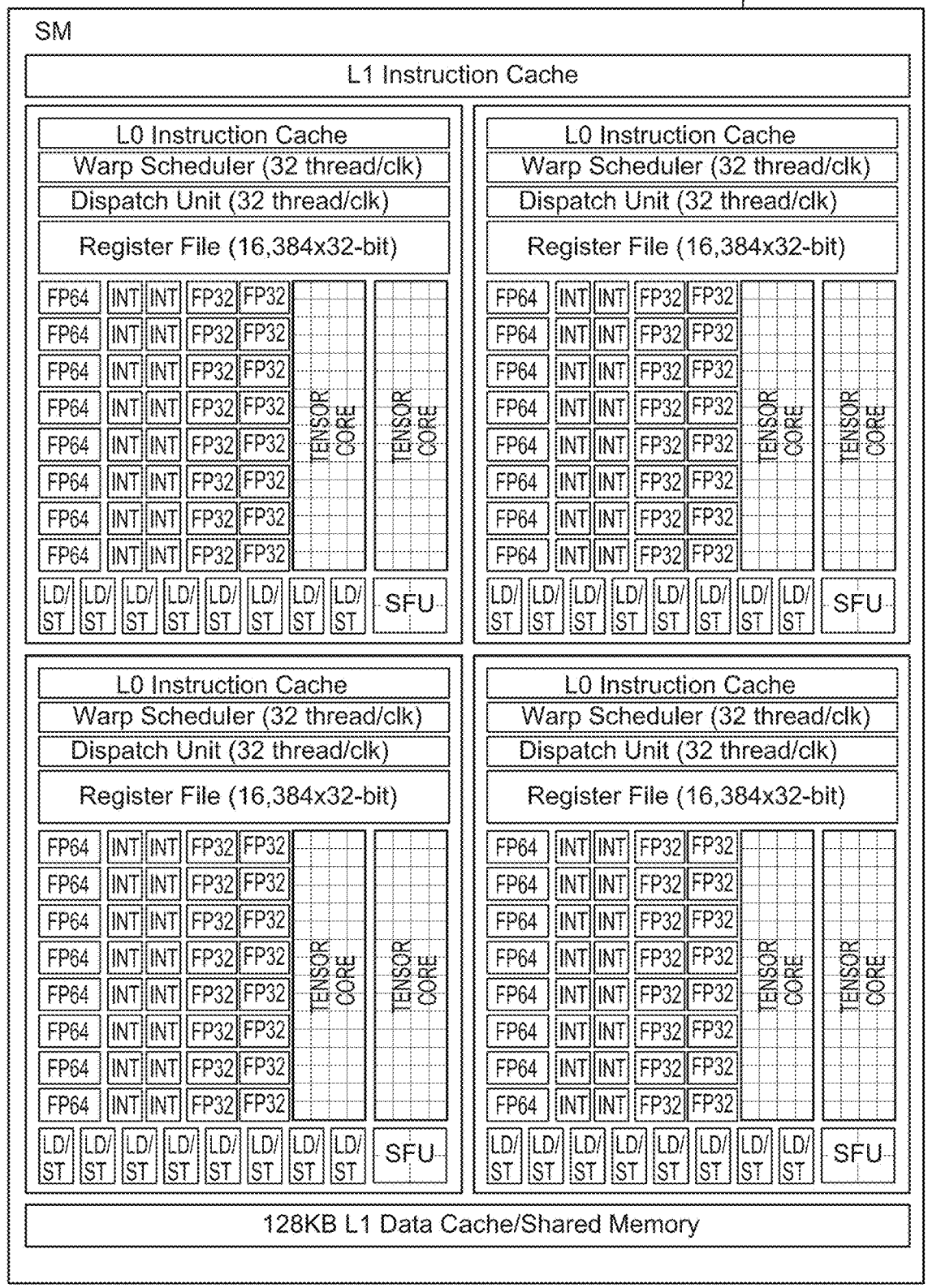

Each SM 1840 includes a register file 1920 that provides a set of registers for the functional units of the SM 1840. In an embodiment, the register file 1920 is divided between each of the functional units such that each functional unit is allocated a dedicated portion of the register file 1920. In another embodiment, the register file 1920 is divided between the different warps being executed by the SM 1840. The register file 1920 provides temporary storage for operands connected to the data paths of the functional units. FIG. 21 illustrates an example configuration of the registers files in the SM 1840.

Each SM 1840 comprises L processing cores 1950. In an embodiment, the SM 1840 includes a large number (e.g., 128, etc.) of distinct processing cores 1950. Each core 1950 may include a fully-pipelined, single-precision, double-precision, and/or mixed precision processing unit that includes a floating point arithmetic logic unit and an integer arithmetic logic unit. In an embodiment, the floating point arithmetic logic units implement the IEEE 754-2008 standard for floating point arithmetic. In an embodiment, the cores 1950 include 64 single-precision (32-bit) floating point cores, 64 integer cores, 32 double-precision (64-bit) floating point cores, and 8 tensor cores.

Tensor cores are configured to perform matrix operations, and, in an embodiment, one or more tensor cores are included in the cores 1950. In particular, the tensor cores are configured to perform deep learning matrix arithmetic, such as convolution operations for neural network training and inferencing. In an embodiment, each tensor core operates on a 4×4 matrix and performs a matrix multiply and accumulate operation D=A×B+C, where A, B, C, and D are 4×4 matrices.

In an embodiment, the matrix multiply inputs A and B are 16-bit floating point matrices, while the accumulation matrices C and D may be 16-bit floating point or 32-bit floating point matrices. Tensor Cores operate on 16-bit floating point input data with 32-bit floating point accumulation. The 16-bit floating point multiply requires 64 operations and results in a full precision product that is then accumulated using 32-bit floating point addition with the other intermediate products for a 4×4×4 matrix multiply. In practice, Tensor Cores are used to perform much larger two-dimensional or higher dimensional matrix operations, built up from these smaller elements. An API, such as CUDA 9 C++ API, exposes specialized matrix load, matrix multiply and accumulate, and matrix store operations to efficiently use Tensor Cores from a CUDA-C++ program. At the CUDA level, the warp-level interface assumes 16×16 size matrices spanning all 32 threads of the warp.

Each SM 1840 also comprises M SFUs 1952 that perform special functions (e.g., attribute evaluation, reciprocal square root, and the like). In an embodiment, the SFUs 1952 may include a tree traversal unit configured to traverse a hierarchical tree data structure. In an embodiment, the SFUs 1952 may include texture unit configured to perform texture map filtering operations. In an embodiment, the texture units are configured to load texture maps (e.g., a 2D array of texels) from the memory 1704 and sample the texture maps to produce sampled texture values for use in shader programs executed by the SM 1840. In an embodiment, the texture maps are stored in the shared memory/L1 cache 1970. The texture units implement texture operations such as filtering operations using mip-maps (i.e., texture maps of varying levels of detail). In an embodiment, each SM 1740 includes two texture units.

Each SM 1840 also comprises N LSUs 1954 that implement load and store operations between the shared memory/L1 cache 1970 and the register file 1920. Each SM 1840 includes an interconnect network 1980 that connects each of the functional units to the register file 1920 and the LSU 1954 to the register file 1920, shared memory/L1 cache 1970. In an embodiment, the interconnect network 1980 is a crossbar that can be configured to connect any of the functional units to any of the registers in the register file 1920 and connect the LSUs 1954 to the register file and memory locations in shared memory/L1 cache 1970.

The shared memory/L1 cache 1970 is an array of on-chip memory that allows for data storage and communication between the SM 1840 and the primitive engine 1835 and between threads in the SM 1840. In an embodiment, the shared memory/L1 cache 1970 comprises 128 KB of storage capacity and is in the path from the SM 1840 to the partition unit 1780. The shared memory/L1 cache 1970 can be used to cache reads and writes. One or more of the shared memory/L1 cache 1970, L2 cache 1860, and memory 1704 are backing stores.

Combining data cache and shared memory functionality into a single memory block provides the best overall performance for both types of memory accesses. The capacity is usable as a cache by programs that do not use shared memory. For example, if shared memory is configured to use half of the capacity, texture and load/store operations can use the remaining capacity. Integration within the shared memory/L1 cache 1970 enables the shared memory/L1 cache 1970 to function as a high-throughput conduit for streaming data while simultaneously providing high-bandwidth and low-latency access to frequently reused data.

FIG. 21 illustrates one example architecture for the SM 1840. As illustrated in FIG. 19, the SM 1840 may be coupled to one or more Texture Unit 1842 and/or one or more TTUs 700. As a compromise between performance and area, one example non-limiting embodiment may include a single Texture Unit 1842 and/or a single TTU 700 per groups of SMs 1840 (e.g., See FIG. 19). The TTU 700 may communicate with the SMs 1840 via a TTU input/output block in memory input-output and with a L1 cache via a dedicated read interface. In one example embodiment, the TTU 700 only reads from the main memory and does not write to the main memory.

Example More Detailed TTU Architecture

As discussed above, the TTU 700 may be a coprocessor to the SM 1840. Like a texture processor, it is exposed via a set of SM instructions, accesses memory as a read-only client of the L1 cache, and returns results into the SM register file. Unlike some texture processors, the amount of data that may need to be passed into and out of the TTU 700 for a typical query makes it difficult in some embodiments to specify all the source and destination registers in a single instruction (and because most of this data is unique per-thread, there is no TTU analogue of texture headers and samplers). As a consequence, the TTU 700 in some embodiments is programmed via a multi-instruction sequence. This sequence can be conceptualized as a single "macro-instruction" in some implementations.

Also like a Texture Units 1842, the TTU 700 in some implementations may rely on certain read-only data structures in memory that are prepopulated by software. These include:

One or more BVHs, where each BVH is for example a tree of axis-aligned bounding boxes, stored in a compressed format that greatly reduces memory traffic compared to an uncompressed representation. Each node in the BVH is stored as a complet structure, with size and alignment in some implementations matched to that of an L1 cache line. Child complets of a given parent are preferably stored contiguously in memory and child pointers are stored in compressed form.

Zero or more instance nodes, which provide a way to connect a leaf of one BVH to the root of another. An instance node may be a data structure that is also aligned. This structure may contain a pointer to the sub-BVH, flags that affect back-face culling behavior in the sub-BVH, and a matrix that corresponds to the first three rows of an arbitrary transformation matrix (in homogeneous coordinates) from the coordinate system of the top-level BVH (commonly "world space") to that of the sub-BVH (commonly "object space"). The final row of the matrix in some embodiments is in some implementations implicitly (0, 0, 0, 1).

Zero or more triangle or other primitive buffers, containing for example triangles stored either as a triplet of coordinates per vertex or in a lossless compressed format understood by the TTU 700. In addition, an alpha bit may be provided per triangle or other primitive, indicating triangles that require special handling by software to determine whether the triangle is actually intersected by a given ray. Triangle buffers can be organized into blocks. There may also be a per-triangle force-no-cull function bit. When set, that bit indicates that both sides of the triangle should be treated as front-facing or back-facing with respect to culling, i.e., the triangle should not be culled because the ray intersects the "back" instead of the "front". The simplest use case for this is a single triangle used to represent a leaf, where we can still see the leaf if the ray hits it on the back surface.

The TTU 700 in some embodiments is stateless, meaning that no architectural state is maintained in the TTU between queries. At the same time, it is often useful for software running on the SM 1840 to request continuation of a previous query, which implies that relevant state should be written to registers by the TTU 700 and then passed back to the TTU in registers (often in-place) to continue. This state may take the form of a traversal stack that tracks progress in the traversal of the BVH.

A small number of stack initializers may also be provided for beginning a new query of a given type, for example:
  Traversal starting from a complet
  Intersection of a ray with a range of triangles
  Intersection of a ray with a range of triangles, followed by traversal starting from a complet
  Vertex fetch from a triangle buffer for a given triangle
  Optional support for instance transforms in front of the "traversal starting from a complet" and "intersection of a ray with a range of triangles".

Vertex fetch is a simple query that may be specified with request data that consists of a stack initializer and nothing else. Other query types may require the specification of a ray or beam, along with the stack or stack initializer and various ray flags describing details of the query. A ray is given by its three-coordinate origin, three-coordinate direction, and minimum and maximum values for the t-parameter along the ray. A beam is additionally given by a second origin and direction.

Various ray flags can be used to control various aspects of traversal behavior, back-face culling, and handling of the various child node types, subject to a pass/fail status of an optional rayOp test. RayOps add considerable flexibility to the capabilities of the TTU. In some example embodiments, the RayOps portion introduces two Ray Flag versions can be dynamically selected based on a specified operation on data conveyed with the ray and data stored in the complet. To explore such flags, it's first helpful to understand the different types of child nodes allowed within a BVH, as well as the various hit types that the TTU 700 can return to the SM. Example node types are:

A child complet (i.e., an internal node)
  By default, the TTU 700 continues traversal by descending into child complets.
  A triangle range, corresponding to a contiguous set of triangles within a triangle buffer
  (1) By default, triangle ranges encountered by a ray are handled natively by the TTU 700 by testing the triangles for intersection and shortening the ray accordingly. If traversal completes and a triangle was hit, default behavior is for the triangle ID to be returned to SM 1840, along with the t-value and barycentric coordinates of the intersection. This is the "Triangle" hit type.
  (2) By default, intersected triangles with the alpha bit set are returned to SM 1840 even if traversal has not completed. The returned traversal stack contains the state required to continue traversal if software determines that the triangle was in fact transparent.
  (3) Triangle intersection in some embodiments is not supported for beams, so encountered triangle ranges are by default returned to SM 1840 as a "TriRange" hit type, which includes a pointer to the first triangle block overlapping the range, parameters specifying the range, and the t-value of the intersection with the leaf bounding box.

An item range, consisting of an index (derived from a user-provided "item range base" stored in the complet) and a count of items.
  By default, item ranges are returned to SM 1840 as an "ItemRange" hit type, consisting of for example an index, a count, and the t-value of the intersection with the leaf bounding box.
  An instance node.
  The TTU 700 in some embodiments can handle one level of instancing natively by transforming the ray into the coordinate system of the instance BVH. Additional levels of instancing (or every other level of instancing, depending on strategy) may be handled in software. The "InstanceNode" hit type is provided for this purpose, consisting of a pointer to the instance node and the tvalue of the intersection with the leaf bounding box. In other implementations, the hardware can handle two, three or more levels of instancing.

In addition to the node-specific hit types, a generic "NodeRef" hit type is provided that consists of a pointer to the parent complet itself, as well as an ID indicating which child was intersected and the t-value of the intersection with the bounding box of that child.

An "Error" hit type may be provided for cases where the query or BVH was improperly formed or if traversal encountered issues during traversal.

A "None" hit type may be provided for the case where the ray or beam misses all geometry in the scene.

How the TTU handles each of the four possible node types is determined by a set of node-specific mode flags set as part of the query for a given ray. The "default" behavior mentioned above corresponds to the case where the mode flags are set to all zeros.

Alternative values for the flags allow for culling all nodes of a given type, returning nodes of a given type to SM as a NodeRef hit type, or returning triangle ranges or instance nodes to SM using their corresponding hit types, rather than processing them natively within the TTU 700.

Additional mode flags may be provided for control handling of alpha triangles.

When configured for general purpose parallel computation, a simpler configuration can be used compared with graphics processing. Specifically, the fixed function graphics processing units shown in FIG. 17, are bypassed, creating a much simpler programming model. In the general purpose parallel computation configuration, the work distribution unit 1725 assigns and distributes blocks of threads directly to the DPCs 1820. The threads in a block execute the same program, using a unique thread ID in the calculation to ensure each thread generates unique results, using the SM 1840 to execute the program and perform calculations, shared memory/L1 cache 1970 to communicate between threads, and the LSU 1954 to read and write global memory through the shared memory/L1 cache 1970 and the memory partition unit 1780. When configured for general purpose parallel computation, the SM 1840 can also write commands that the scheduler unit 1720 can use to launch new work on the DPCs 1820. The TTU 700 can be used to accelerate spatial queries in the context of general purpose computation.

The PPU 1700 may be included in a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, and the like. In an embodiment, the PPU 1700 is embodied on a single semiconductor substrate. In another embodiment, the PPU 1700 is included in a system-on-a-chip (SoC) along with one or more other devices such as additional PPUs 1700, the memory 204, a reduced instruction set computer (RISC) CPU, a memory management unit (MMU), a digital-to-analog converter (DAC), and the like.

In an embodiment, the PPU 1700 may be included on a graphics card that includes one or more memory devices 1704. The graphics card may be configured to interface with a PCIe slot on a motherboard of a desktop computer. In yet another embodiment, the PPU 1700 may be an integrated graphics processing unit (iGPU) or parallel processor included in the chipset of the motherboard.

Exemplary Computing System

Systems with multiple GPUs and CPUs are used in a variety of industries as developers expose and leverage more parallelism in applications such as artificial intelligence computing. High-performance GPU-accelerated systems with tens to many thousands of compute nodes are deployed in data centers, research facilities, and supercomputers to solve ever larger problems. As the number of processing devices within the high-performance systems increases, the communication and data transfer mechanisms need to scale to support the increased data transmission between the processing devices.

Figure 22:
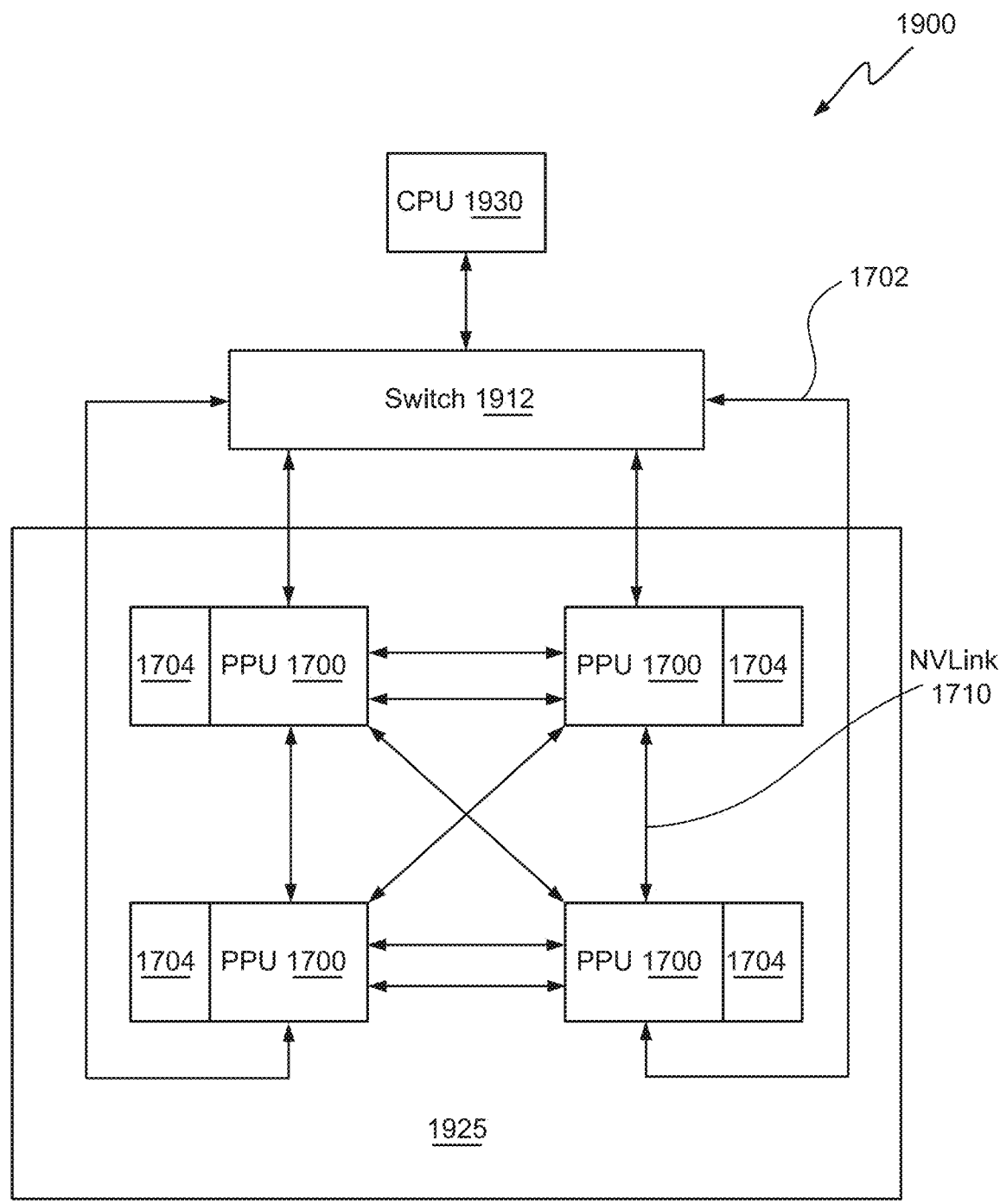
FIG. 22 is a conceptual diagram of a processing system implemented using PPUs of FIG. 17.

FIG. 22 is a conceptual diagram of a processing system 1900 implemented using the PPU 1700 of FIG. 17, in accordance with an embodiment. The exemplary system 1900 may be configured to implement one or more methods disclosed in this application. The processing system 1900 includes a CPU 1930, switch 1912, and multiple PPUs 1700 each and respective memories 1704. The NVLink 1710 provides high-speed communication links between each of the PPUs 1700. Although a particular number of NVLink 1710 and interconnect 1702 connections are illustrated in FIG. 22, the number of connections to each PPU 1700 and the CPU 1930 may vary. The switch 1912 interfaces between the interconnect 1702 and the CPU 1930. The PPUs 1700, memories 1704, and NVLinks 1710 may be situated on a single semiconductor platform to form a parallel processing module 1925. In an embodiment, the switch 1912 supports two or more protocols to interface between various different connections and/or links.

In another embodiment (not shown), the NVLink 1710 provides one or more high-speed communication links between each of the PPUs 1700 and the CPU 1930 and the switch 1912 interfaces between the interconnect 1702 and each of the PPUs 1700. The PPUs 1700, memories 1704, and interconnect 1702 may be situated on a single semiconductor platform to form a parallel processing module 1925. In yet another embodiment (not shown), the interconnect 1702 provides one or more communication links between each of the PPUs 1700 and the CPU 1930 and the switch 1912 interfaces between each of the PPUs 1700 using the NVLink 1710 to provide one or more high-speed communication links between the PPUs 1700. In another embodiment (not shown), the NVLink 1710 provides one or more high-speed communication links between the PPUs 1700 and the CPU 1930 through the switch 1912. In yet another embodiment (not shown), the interconnect 1702 provides one or more communication links between each of the PPUs 1700 directly. One or more of the NVLink 1710 high-speed communication links may be implemented as a physical NVLink interconnect or either an on-chip or on-die interconnect using the same protocol as the NVLink 1710.

In the context of the present description, a single semiconductor platform may refer to a sole unitary semiconductor-based integrated circuit fabricated on a die or chip. It should be noted that the term single semiconductor platform may also refer to multi-chip modules with increased connectivity which simulate on-chip operation and make substantial improvements over utilizing a conventional bus implementation. Of course, the various circuits or devices may also be situated separately or in various combinations of semiconductor platforms per the desires of the user. Alternately, the parallel processing module 1925 may be implemented as a circuit board substrate and each of the PPUs 1700 and/or memories 1704 may be packaged devices. In an embodiment, the CPU 1930, switch 1912, and the parallel processing module 1925 are situated on a single semiconductor platform.

In an embodiment, the signaling rate of each NVLink 1710 is 20 to 25 Gigabits/second and each PPU 1700 includes six NVLink 1710 interfaces (as shown in FIG. 22, five NVLink 1710 interfaces are included for each PPU 1700). Each NVLink 1710 provides a data transfer rate of 25 Gigabytes/second in each direction, with six links providing 1700 Gigabytes/second. The NVLinks 1710 can be used exclusively for PPU-to-PPU communication as shown in FIG. 22, or some combination of PPU-to-PPU and PPU-to-CPU, when the CPU 1930 also includes one or more NVLink 1710 interfaces.

In an embodiment, the NVLink 1710 allows direct load/store/atomic access from the CPU 1930 to each PPU's 1700 memory 1704. In an embodiment, the NVLink 1710 supports coherency operations, allowing data read from the memories 1704 to be stored in the cache hierarchy of the CPU 1930, reducing cache access latency for the CPU 1930. In an embodiment, the NVLink 1710 includes support for Address Translation Services (ATS), allowing the PPU 1700 to directly access page tables within the CPU 1930. One or more of the NVLinks 1710 may also be configured to operate in a low-power mode.

Figure 23:
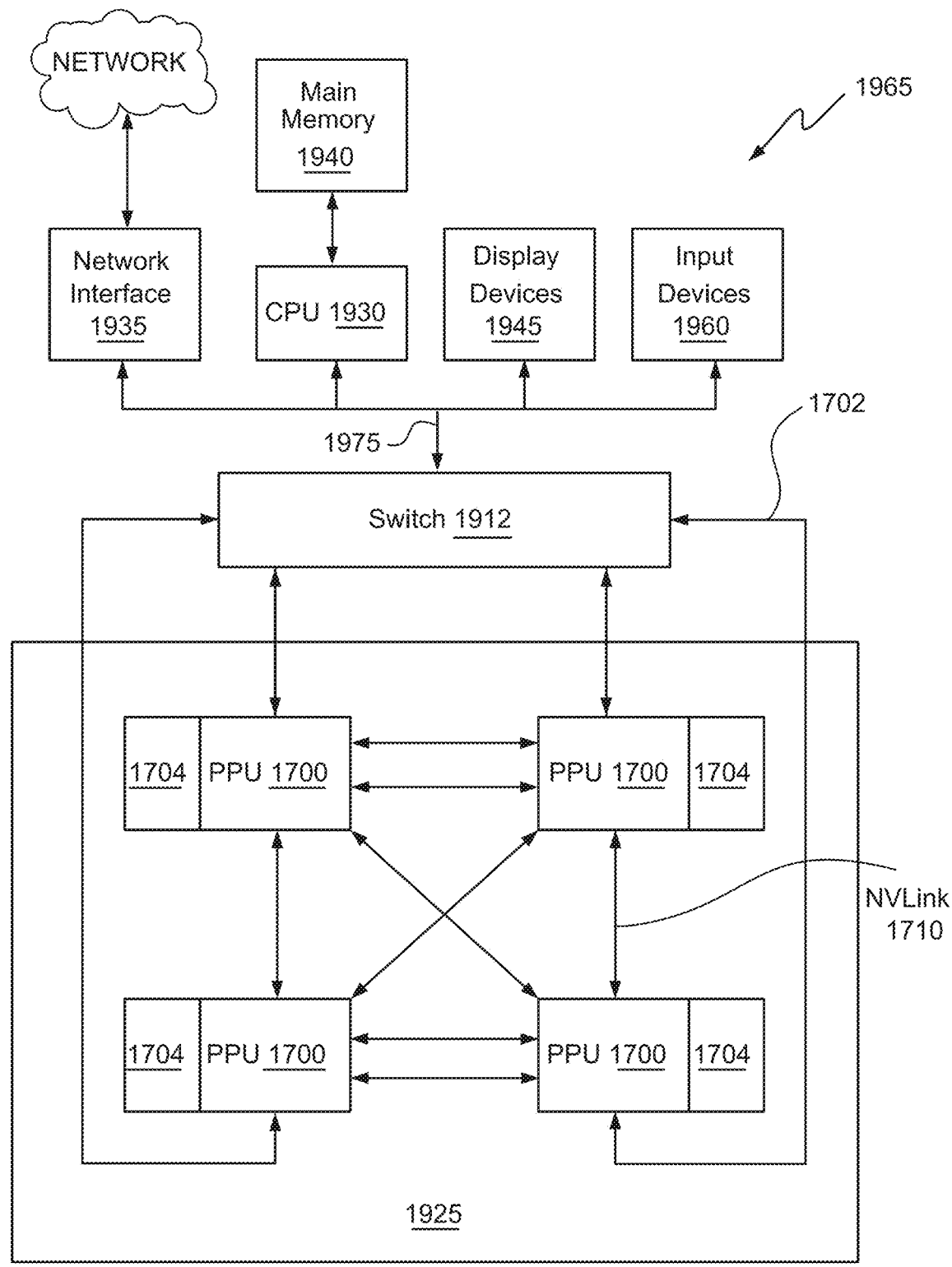
FIG. 23 expands FIG. 22 to show additional interconnected devices.

FIG. 23 illustrates an exemplary system 1965 in which the various architecture and/or functionality of the various previous embodiments may be implemented. The exemplary system 1965 may be configured to implement one or more methods disclosed in this application.

As shown, a system 1965 is provided including at least one central processing unit 1930 that is connected to a communication bus 1975. The communication bus 1975 may be implemented using any suitable protocol, such as PCI (Peripheral Component Interconnect), PCI-Express, AGP (Accelerated Graphics Port), HyperTransport, or any other bus or point-to-point communication protocol(s). The system 1965 also includes a main memory 1940. Control logic (software) and data are stored in the main memory 1940 which may take the form of random access memory (RAM).

The system 1965 also includes input devices 1960, the parallel processing system 1925, and display devices 1945, i.e. a conventional CRT (cathode ray tube), LCD (liquid crystal display), LED (light emitting diode), plasma display or the like. User input may be received from the input devices 1960, e.g., keyboard, mouse, touchpad, microphone, and the like. Each of the foregoing modules and/or devices may even be situated on a single semiconductor platform to form the system 1965. Alternately, the various modules may also be situated separately or in various combinations of semiconductor platforms per the desires of the user.

Further, the system 1965 may be coupled to a network (e.g., a telecommunications network, local area network (LAN), wireless network, wide area network (WAN) such as the Internet, peer-to-peer network, cable network, or the like) through a network interface 1935 for communication purposes.

The system 1965 may also include a secondary storage (not shown). The secondary storage includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 1940 and/or the secondary storage. Such computer programs, when executed, enable the system 1965 to perform various functions. The memory 1940, the storage, and/or any other storage are possible examples of computer-readable media.

The architecture and/or functionality of the various previous figures may be implemented in the context of a general computer system, a circuit board system, a game console system dedicated for entertainment purposes, an application-specific system, and/or any other desired system. For example, the system 1965 may take the form of a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, a mobile phone device, a television, workstation, game consoles, embedded system, and/or any other type of logic.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

Graphics Processing Pipeline

In an embodiment, the PPU 1700 comprises a graphics processing unit (GPU). The PPU 1700 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The PPU 1700 can be configured to process the graphics primitives to generate a frame buffer (i.e., pixel data for each of the pixels of the display).

An application writes model data for a scene (i.e., a collection of vertices and attributes) to a memory such as a system memory or memory 1704. The model data defines each of the objects that may be visible on a display. The application then makes an API call to the driver kernel that requests the model data to be rendered and displayed. The driver kernel reads the model data and writes commands to the one or more streams to perform operations to process the model data. The commands may reference different shader programs to be implemented on the SMs 1840 of the PPU 1700 including one or more of a vertex shader, hull shader, domain shader, geometry shader, a pixel shader, a ray generation shader, a ray intersection shader, a ray hit shader, and a ray miss shader (these correspond to the shaders defined by the DXR API, ignoring any distinction between "closest-hit" and "any-hit" shaders; see https://devblogs.nvidia.com/introduction-nvidia-rtx-directx-ray-tracing/). For example, one or more of the SMs 1840 may be configured to execute a vertex shader program that processes a number of vertices defined by the model data. In an embodiment, the different SMs 1840 may be configured to execute different shader programs concurrently. For example, a first subset of SMs 1840 may be configured to execute a vertex shader program while a second subset of SMs 1840 may be configured to execute a pixel shader program. The first subset of SMs 1840 processes vertex data to produce processed vertex data and writes the processed vertex data to the L2 cache 1860 and/or the memory 1704. After the processed vertex data is rasterized (i.e., transformed from three-dimensional data into two-dimensional data in screen space) to produce fragment data, the second subset of SMs 1840 executes a pixel shader to produce processed fragment data, which is then blended with other processed fragment data and written to the frame buffer in memory 1704. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

Figure 24:
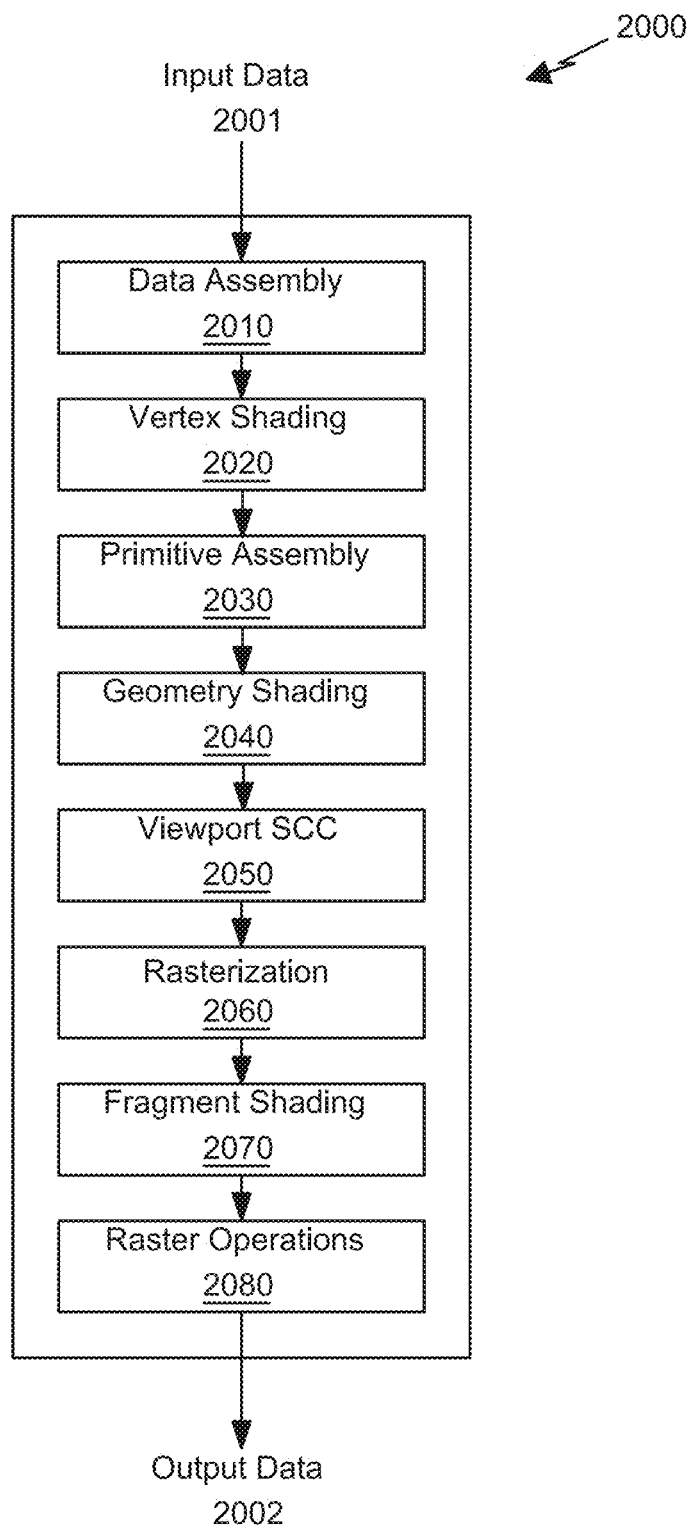
FIG. 24 is a conceptual diagram of a graphics processing pipeline implemented by the GPC of FIG. 19.

FIG. 24 is a conceptual diagram of a graphics processing pipeline 2000 implemented by the PPU 1700 of FIG. 17, in accordance with an embodiment. The graphics processing pipeline 2000 is an abstract flow diagram of the processing steps implemented to generate 2D computer-generated images from 3D geometry data. As is well-known, pipeline architectures may perform long latency operations more efficiently by splitting up the operation into a plurality of stages, where the output of each stage is coupled to the input of the next successive stage. Thus, the graphics processing pipeline 2000 receives input data 2001 that is transmitted from one stage to the next stage of the graphics processing pipeline 2000 to generate output data 2002. In an embodiment, the graphics processing pipeline 2000 may represent a graphics processing pipeline defined by the OpenGL® API. As an option, the graphics processing pipeline 2000 may be implemented in the context of the functionality and architecture of the previous Figures.

As shown in FIG. 24, the graphics processing pipeline 2000 comprises a pipeline architecture that includes a number of stages. The stages include, but are not limited to, a data assembly stage 2010, a vertex shading stage 2020, a primitive assembly stage 2030, a geometry shading stage 2040, a viewport scale, cull, and clip (VSCC) stage 2050, a rasterization stage 2060, a fragment shading stage 2070, and a raster operations stage 2080. In an embodiment, the input data 2001 comprises commands that configure the processing units to implement the stages of the graphics processing pipeline 2000 and geometric primitives (e.g., points, lines, triangles, quads, triangle strips or fans, etc.) to be processed by the stages. The output data 2002 may comprise pixel data (i.e., color data) that is copied into a frame buffer or other type of surface data structure in a memory.

The data assembly stage 2010 receives the input data 2001 that specifies vertex data for high-order surfaces, primitives, or the like. The data assembly stage 2010 collects the vertex data in a temporary storage or queue, such as by receiving a command from the host processor that includes a pointer to a buffer in memory and reading the vertex data from the buffer. The vertex data is then transmitted to the vertex shading stage 2020 for processing.

The vertex shading stage 2020 processes vertex data by performing a set of operations (i.e., a vertex shader or a program) once for each of the vertices. Vertices may be, e.g., specified as a 4-coordinate vector (i.e., <x, y, z, w>) associated with one or more vertex attributes (e.g., color, texture coordinates, surface normal, etc.). The vertex shading stage 2020 may manipulate individual vertex attributes such as position, color, texture coordinates, and the like. In other words, the vertex shading stage 2020 performs operations on the vertex coordinates or other vertex attributes associated with a vertex. Such operations commonly including lighting operations (i.e., modifying color attributes for a vertex) and transformation operations (i.e., modifying the coordinate space for a vertex). For example, vertices may be specified using coordinates in an object-coordinate space, which are transformed by multiplying the coordinates by a matrix that translates the coordinates from the object-coordinate space into a world space or a normalized-device-coordinate (NCD) space. The vertex shading stage 2020 generates transformed vertex data that is transmitted to the primitive assembly stage 2030.

The primitive assembly stage 2030 collects vertices output by the vertex shading stage 2020 and groups the vertices into geometric primitives for processing by the geometry shading stage 2040. For example, the primitive assembly stage 2030 may be configured to group every three consecutive vertices as a geometric primitive (i.e., a triangle) for transmission to the geometry shading stage 2040. In some embodiments, specific vertices may be reused for consecutive geometric primitives (e.g., two consecutive triangles in a triangle strip may share two vertices). The primitive assembly stage 2030 transmits geometric primitives (i.e., a collection of associated vertices) to the geometry shading stage 2040.

The geometry shading stage 2040 processes geometric primitives by performing a set of operations (i.e., a geometry shader or program) on the geometric primitives. Tessellation operations may generate one or more geometric primitives from each geometric primitive. In other words, the geometry shading stage 2040 may subdivide each geometric primitive into a finer mesh of two or more geometric primitives for processing by the rest of the graphics processing pipeline 2000. The geometry shading stage 2040 transmits geometric primitives to the viewport SCC stage 2050.

In an embodiment, the graphics processing pipeline 2000 may operate within a streaming multiprocessor and the vertex shading stage 2020, the primitive assembly stage 2030, the geometry shading stage 2040, the fragment shading stage 2070, and/or hardware/software associated therewith, may sequentially perform processing operations. Once the sequential processing operations are complete, in an embodiment, the viewport SCC stage 2050 may utilize the data. In an embodiment, primitive data processed by one or more of the stages in the graphics processing pipeline 2000 may be written to a cache (e.g. L1 cache, a vertex cache, etc.). In this case, in an embodiment, the viewport SCC stage 2050 may access the data in the cache. In an embodiment, the viewport SCC stage 2050 and the rasterization stage 2060 are implemented as fixed function circuitry.

The viewport SCC stage 2050 performs viewport scaling, culling, and clipping of the geometric primitives. Each surface being rendered to is associated with an abstract camera position. The camera position represents a location of a viewer looking at the scene and defines a viewing frustum that encloses the objects of the scene. The viewing frustum may include a viewing plane, a rear plane, and four clipping planes. Any geometric primitive entirely outside of the viewing frustum may be culled (i.e., discarded) because the geometric primitive will not contribute to the final rendered scene. Any geometric primitive that is partially inside the viewing frustum and partially outside the viewing frustum may be clipped (i.e., transformed into a new geometric primitive that is enclosed within the viewing frustum. Furthermore, geometric primitives may each be scaled based on a depth of the viewing frustum. All potentially visible geometric primitives are then transmitted to the rasterization stage 2060.

The rasterization stage 2060 converts the 3D geometric primitives into 2D fragments (e.g. capable of being utilized for display, etc.). The rasterization stage 2060 may be configured to utilize the vertices of the geometric primitives to setup a set of plane equations from which various attributes can be interpolated. The rasterization stage 2060 may also compute a coverage mask for a plurality of pixels that indicates whether one or more sample locations for the pixel intercept the geometric primitive. In an embodiment, z-testing may also be performed to determine if the geometric primitive is occluded by other geometric primitives that have already been rasterized. The rasterization stage 2060 generates fragment data (i.e., interpolated vertex attributes associated with a particular sample location for each covered pixel) that are transmitted to the fragment shading stage 2070.

The fragment shading stage 2070 processes fragment data by performing a set of operations (i.e., a fragment shader or a program) on each of the fragments. The fragment shading stage 2070 may generate pixel data (i.e., color values) for the fragment such as by performing lighting operations or sampling texture maps using interpolated texture coordinates for the fragment. The fragment shading stage 2070 generates pixel data that is transmitted to the raster operations stage 2080.

The raster operations stage 2080 may perform various operations on the pixel data such as performing alpha tests, stencil tests, and blending the pixel data with other pixel data corresponding to other fragments associated with the pixel. When the raster operations stage 2080 has finished processing the pixel data (i.e., the output data 2002), the pixel data may be written to a render target such as a frame buffer, a color buffer, or the like.

It will be appreciated that one or more additional stages may be included in the graphics processing pipeline 2000 in addition to or in lieu of one or more of the stages described above. Various implementations of the abstract graphics processing pipeline may implement different stages. Furthermore, one or more of the stages described above may be excluded from the graphics processing pipeline in some embodiments (such as the geometry shading stage 2040). Other types of graphics processing pipelines are contemplated as being within the scope of the present disclosure. Furthermore, any of the stages of the graphics processing pipeline 2000 may be implemented by one or more dedicated hardware units within a graphics processor such as PPU 200. Other stages of the graphics processing pipeline 2000 may be implemented by programmable hardware units such as the SM 1840 of the PPU 1700.

The graphics processing pipeline 2000 may be implemented via an application executed by a host processor, such as a CPU. In an embodiment, a device driver may implement an application programming interface (API) that defines various functions that can be utilized by an application in order to generate graphical data for display. The device driver is a software program that includes a plurality of instructions that control the operation of the PPU 1700. The API provides an abstraction for a programmer that lets a programmer utilize specialized graphics hardware, such as the PPU 1700, to generate the graphical data without requiring the programmer to utilize the specific instruction set for the PPU 1700. The application may include an API call that is routed to the device driver for the PPU 1700. The device driver interprets the API call and performs various operations to respond to the API call. In some instances, the device driver may perform operations by executing instructions on the CPU. In other instances, the device driver may perform operations, at least in part, by launching operations on the PPU 1700 utilizing an input/output interface between the CPU and the PPU 1700. In an embodiment, the device driver is configured to implement the graphics processing pipeline 2000 utilizing the hardware of the PPU 1700.

Various programs may be executed within the PPU 1700 in order to implement the various stages of the graphics processing pipeline 2000. For example, the device driver may launch a kernel on the PPU 1700 to perform the vertex shading stage 2020 on one SM 1840 (or multiple SMs 1840). The device driver (or the initial kernel executed by the PPU 1800) may also launch other kernels on the PPU 1800 to perform other stages of the graphics processing pipeline 2000, such as the geometry shading stage 2040 and the fragment shading stage 2070. In addition, some of the stages of the graphics processing pipeline 2000 may be implemented on fixed unit hardware such as a rasterizer or a data assembler implemented within the PPU 1800. It will be appreciated that results from one kernel may be processed by one or more intervening fixed function hardware units before being processed by a subsequent kernel on an SM 1840.

Machine Learning

Deep neural networks (DNNs) developed on processors, such as the PPU 1700 have been used for diverse use cases, from self-driving cars to faster drug development, from automatic image captioning in online image databases to smart real-time language translation in video chat applications. Deep learning is a technique that models the neural learning process of the human brain, continually learning, continually getting smarter, and delivering more accurate results more quickly over time. A child is initially taught by an adult to correctly identify and classify various shapes, eventually being able to identify shapes without any coaching. Similarly, a deep learning or neural learning system needs to be trained in object recognition and classification for it get smarter and more efficient at identifying basic objects, occluded objects, etc., while also assigning context to objects.

At the simplest level, neurons in the human brain look at various inputs that are received, importance levels are assigned to each of these inputs, and output is passed on to other neurons to act upon. An artificial neuron or perceptron is the most basic model of a neural network. In one example, a perceptron may receive one or more inputs that represent various features of an object that the perceptron is being trained to recognize and classify, and each of these features is assigned a certain weight based on the importance of that feature in defining the shape of an object.

A deep neural network (DNN) model includes multiple layers of many connected perceptrons (e.g., nodes) that can be trained with enormous amounts of input data to quickly solve complex problems with high accuracy. In one example, a first layer of the DLL model breaks down an input image of an automobile into various sections and looks for basic patterns such as lines and angles. The second layer assembles the lines to look for higher level patterns such as wheels, windshields, and mirrors. The next layer identifies the type of vehicle, and the final few layers generate a label for the input image, identifying the model of a specific automobile brand.

Once the DNN is trained, the DNN can be deployed and used to identify and classify objects or patterns in a process known as inference. Examples of inference (the process through which a DNN extracts useful information from a given input) include identifying handwritten numbers on checks deposited into ATM machines, identifying images of friends in photos, delivering movie recommendations to over fifty million users, identifying and classifying different types of automobiles, pedestrians, and road hazards in driverless cars, or translating human speech in real-time.

During training, data flows through the DNN in a forward propagation phase until a prediction is produced that indicates a label corresponding to the input. If the neural network does not correctly label the input, then errors between the correct label and the predicted label are analyzed, and the weights are adjusted for each feature during a backward propagation phase until the DNN correctly labels the input and other inputs in a training dataset. Training complex neural networks requires massive amounts of parallel computing performance, including floating-point multiplications and additions that are supported by the PPU 1700. Inferencing is less compute-intensive than training, being a latency-sensitive process where a trained neural network is applied to new inputs it has not seen before to classify images, translate speech, and generally infer new information.

Neural networks rely heavily on matrix math operations, and complex multi-layered networks require tremendous amounts of floating-point performance and bandwidth for both efficiency and speed. With thousands of processing cores, optimized for matrix math operations, and delivering tens to hundreds of TFLOPS of performance, the PPU 1700 is a computing platform capable of delivering performance required for deep neural network-based artificial intelligence and machine learning applications.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A method of ray tracing, comprising:
   accessing ray data corresponding to a ray and an acceleration data structure corresponding to a scene, wherein the accessed ray data includes (a) a ray parameter, (b) an opcode and (c) one or more mode flags;
   traversing the acceleration data structure in accordance with the ray data including performing for at least one node in the acceleration data structure (a) an intersection test based upon geometric attributes of the ray and the acceleration data structure and (b) an auxiliary ray operation test comprising:
   comparing, based upon the opcode, a node parameter of the at least one node with the ray parameter or a value derived from the ray parameter; and select at least one mode flag from the one or more mode flags based at least on a result of the comparison;

the traversing further comprising, based on results of the intersection test and the auxiliary ray operation test, performing at least one of changing a state of the traversing or selecting an output data corresponding to one or more nodes of the acceleration data structure intersected by the ray based on the selected at least one mode flag; and providing output data from the traversing to a rendering process for rendering at least a portion of the scene.

2. The method according to claim 1, wherein the performing an intersection test and an auxiliary ray operation test comprises selecting the auxiliary ray operation test based upon the opcode.

3. The method according to claim 2, wherein the performing an intersection test and an auxiliary ray operation test further comprises performing the selected ray operation test based upon at least one parameter each from the ray data and the at least one node.

4. The method according to claim 3, wherein the at least one parameter from the ray data is configurable per ray and the at least one parameter from the at least one node is configurable per node.

5. The method according to claim 3, wherein the performing an intersection test and an auxiliary ray operation test further comprises performing the selected ray operation test based on non-geometric attributes of the ray and the acceleration data structure.

6. The method according to claim 2, wherein the performing an intersection test and an auxiliary ray operation test further comprises performing the selected ray operation test based upon one parameter from the at least one node and the opcode.

7. The method according to claim 2, wherein the performing at least one of changing a state of the traversing or selecting an output data comprises choosing said at least one of changing a state of the traversing or selecting an output data based at least on one or more mode flags specified in the ray data.

8. The method according to claim 2, wherein said one or more mode flags are selected based on a node type of the at least one node.

9. The method according to claim 2, wherein the perform at least one of changing a state of the traversing or selecting an output data further comprises changing, based on said one or more mode flags, an order in which respective nodes in the accelerated data structure are traversed during said traversing.

10. The method according to claim 2, wherein the perform at least one of changing a state of the traversing or selecting an output data further comprises dynamically changing, based on said one or more mode flags, a structure of the accelerated data structure by culling a portion of the accelerated data structure.

11. The method according to claim 2, wherein the performing for at least one node in the acceleration data structure (a) an intersection test based upon geometric attributes associated with the ray and geometric attributes associated with the acceleration data structure and (b) an auxiliary ray operation test further comprises performing the auxiliary ray operation test based on said opcode, wherein said opcode provides for comparing a value computed during the intersection test scaled by one geometric attribute associated with the ray and biased by another geometric attribute associated with the ray to at least one geometric parameter associated with the at least one node.

12. The method according to claim 2, wherein the performing for at least one node in the acceleration data structure (a) an intersection test based upon geometric attributes of the ray and the acceleration data structure and (b) an auxiliary ray operation test further comprises performing the auxiliary ray operation test based on said opcode, wherein said opcode provides for comparing a distance associated with the ray to at least one parameter of the at least one node.

13. The method according to claim 2, wherein the performing for at least one node in the acceleration data structure (a) an intersection test based upon geometric attributes of the ray and the acceleration data structure and (b) an auxiliary ray operation test comprises performing the auxiliary ray operation test based on said opcode, wherein said opcode provides for comparing a first value based on at least one parameter in the ray data to a second value based on at least one parameter of the at least one node.

14. The method according to claim 2, wherein the performing for at least one node in the acceleration data structure (a) an intersection test based upon geometric attributes of the ray and the acceleration data structure and (b) an auxiliary ray operation test further comprises performing the auxiliary ray operation test based on said opcode, wherein said opcode provides for comparing a size of a surface area represented in the at least one node based upon at least one parameter from the at least one node with a distance along the ray at which an intersection occurs.

15. The method according to claim 1, further comprising rendering, by a parallel processor, the scene to a display based at least in part on the output data provided by a traversal processor executing said traversing.

16. A method of ray tracing, comprising:
accessing ray data corresponding to a ray and an acceleration data structure corresponding to a scene;
traversing the acceleration data structure in accordance with the ray data, including performing for at least one node in the acceleration data structure (a) an intersection test based upon geometric attributes of the ray and the acceleration data structure and (b) an auxiliary ray operation test selected based upon an opcode in the ray data;
the traversing further comprising, based on results of the intersection test and the auxiliary ray operation test, performing at least one of changing a state of the traversing and selecting an output data corresponding to one or more nodes of the acceleration data structure intersected by the ray, wherein the choosing said at least one of changing a state of the traversing or selecting an output data based on one or more mode flags specified in the ray data further comprises choosing in accordance with one or more override flags in the at least one node; and
providing output data from the traversing to a rendering process for rendering at least a portion of the scene.

17. The method according to claim 16, wherein the at least one node is an instance node.

18. The method according to claim 16, wherein the at least one node represents a primitive and at least one of the override flags is configured to override a culling configuration specified in the ray data.

19. A system comprising a traversal coprocessor comprising hardware processing circuitry for traversing acceleration data structures, configured to:
access ray data corresponding to a ray and an acceleration data structure corresponding to a scene, wherein the accessed ray data includes (a) a ray parameter, (b) an opcode and (c) one or more mode flags;
traverse the acceleration data structure in accordance with the ray data, the traversing including performing for at least one node in the acceleration data structure (a) an intersection test based upon geometric attributes of the ray and the acceleration data structure and (b) an auxiliary ray operation test comprising:
 comparing, based upon the opcode, a node parameter of the at least one node with the ray parameter or a value derived from the ray parameter; and
 select at least one mode flag from the one or more mode flags based at least on a result of the comparison;
the traversing further comprising, based on results of the intersection test and the auxiliary ray operation test, performing at least one of changing a state of the traversing or selecting an output data corresponding to one or more nodes of the acceleration data structure intersected by the ray based on the selected at least one mode flag; and
provide output data from the traversing to a rendering process for rendering at least a portion of the scene.

20. The system according to claim 19, further comprising a parallel processor configured to generate said ray data corresponding to the ray and the acceleration data structure corresponding to a model of the scene.

21. A coprocessor for accelerating traversal of a tree data structure, comprising:
 interface circuitry configured to communicate with a multiprocessor and a memory to receive a plurality of query data structures, the tree data structure, and a query command, wherein each query data structure includes query test parameters, a test opcode and mode flags, and wherein a node in the tree data structure includes a node test parameter; and
 tree traversal circuitry configured to:
  in response to the query command, traverse the tree data structure in accordance with each of the query data structures; and
  determine for each of the query data structures:
   a result of tests based upon the opcode and the query test parameters of the respective query data structures and the node test parameter of the node in the tree data structure; and
   changing the traversing or one or more outputs returned based upon the result and the mode flags of the respective query data structures.

22. A method of ray tracing, comprising:
accessing ray data corresponding to a ray and an acceleration data structure corresponding to a scene;
traversing the acceleration data structure in accordance with the ray data, including performing for at least one node in the acceleration data structure (a) an intersection test based upon geometric attributes of the ray and the acceleration data structure and (b) an auxiliary ray operation test selected based upon an opcode in the ray data,
wherein said opcode provides for at least one of:
 comparing a value computed during the intersection test scaled by one geometric attribute associated with the ray and biased by another geometric attribute associated with the ray to at least one geometric parameter associated with the at least one node;
 comparing a distance associated with the ray to at least one parameter of the at least one node;
 comparing a first value based on at least one parameter in the ray data to a second value based on at least one parameter of the at least one node; or
 comparing a size of a surface area represented in the at least one node based upon at least one parameter from the at least one node with a distance along the ray at which an intersection occurs;
based on results of the intersection test and the auxiliary ray operation test, during the traversing, performing at least one of changing a state of the traversing or selecting an output data corresponding to one or more nodes of the acceleration data structure intersected by the ray; and
providing output data from the traversing to a rendering process for rendering at least a portion of the scene.

23. The method according to claim 22, wherein said opcode provides for comparing a value computed during the intersection test scaled by one geometric attribute associated with the ray and biased by another geometric attribute associated with the ray to at least one geometric parameter associated with the at least one node.

24. The method according to claim 22, wherein said opcode provides for comparing a distance associated with the ray to at least one parameter of the at least one node.

25. The method according to claim 22, wherein said opcode provides for comparing a first value based on at least one parameter in the ray data to a second value based on at least one parameter of the at least one node.

26. The method according to claim 22, wherein said opcode provides for comparing a size of a surface area represented in the at least one node based upon at least one parameter from the at least one node with a distance along the ray at which an intersection occurs.

* * * * *